US012650401B2

(12) United States Patent
McCanless et al.

(10) Patent No.: US 12,650,401 B2
(45) Date of Patent: Jun. 9, 2026

(54) BIOSENSORS WITH HYDROPHILIC POLYURETHANE MEMBRANES

(71) Applicant: ABBOTT DIABETES CARE INC., Alameda, CA (US)

(72) Inventors: Jonathan D. McCanless, Oakland, CA (US); Tianmei Ouyang, Saratoga, CA (US); Stephen M. Oja, Reno, NV (US); Yagya Raj Ojha, Alameda, CA (US); Rifat Emrah Ozel, San Jose, CA (US); Cade B. Fox, Burlingame, CA (US); Zenghe Liu, Alameda, CA (US); Benjamin J. Feldman, Berkeley, CA (US)

(73) Assignee: ABBOTT DIABETES CARE INC., Alameda, CA (US)

( * ) Notice: Subject to any disclaimer, the term of this patent is extended or adjusted under 35 U.S.C. 154(b) by 41 days.

(21) Appl. No.: 18/407,099

(22) Filed: Jan. 8, 2024

(65) Prior Publication Data

US 2024/0328989 A1 Oct. 3, 2024

Related U.S. Application Data

(60) Provisional application No. 63/521,508, filed on Jun. 16, 2023, provisional application No. 63/479,812, filed on Jan. 13, 2023.

(51) Int. Cl.

| | |
|---|---|
| ***G01N 27/327*** | (2006.01) |
| ***C08L 39/08*** | (2006.01) |
| ***C08L 75/04*** | (2006.01) |

(52) U.S. Cl.

CPC .......... *G01N 27/3277* (2013.01); *C08L 39/08* (2013.01); *C08L 75/04* (2013.01); *C08L 2203/206* (2013.01)

(58) Field of Classification Search

None

See application file for complete search history.

(56) References Cited

U.S. PATENT DOCUMENTS

| | | | |
|---|---|---|---|
| 5,322,063 A | 6/1994 | Allen et al. | |
| 5,428,123 A | 6/1995 | Ward et al. | |

(Continued)

FOREIGN PATENT DOCUMENTS

| | | | |
|---|---|---|---|
| EP | 4481002 A1 * | 12/2024 | .......... A61B 5/1486 |
| KR | 10-2389269 B1 † | 4/2022 | |

(Continued)

OTHER PUBLICATIONS

International Search Report and Written Opinion for International Application No. PCT/US2024/010721, Commissioner for Patents, United States, mailed Jun. 21, 2024, 9 pages.

(Continued)

*Primary Examiner* — J. Christopher Ball

(74) *Attorney, Agent, or Firm* — Sterne, Kessler, Goldstein & Fox P.L.L.C.

(57) ABSTRACT

The present disclosure provides an analyte sensor comprising a working electrode, a sensing layer disposed on at least a portion of the working electrode, and a hydrophilic polyurethane membrane overcoating at least the sensing layer, wherein the hydrophilic polyurethane is aliphatic, aromatic, or both aliphatic and aromatic. The hydrophilic polyurethane membrane limits the transport of mass to the sensing layer without the need to be crosslinked. With such membrane, the analyte sensor can provide consistent analyte measurements over a temperature range of about 22-42° C. The present disclosure is further related to a method of forming an analyte sensor comprising providing a working electrode, disposing a sensing layer on at least a portion of the working electrode, and coating at least the sensing layer with a hydrophilic polyurethane membrane, wherein the (Continued)

hydrophilic polyurethane is aliphatic, aromatic, or both aliphatic and aromatic.

28 Claims, 19 Drawing Sheets

(56) References Cited

U.S. PATENT DOCUMENTS

| | | | |
|---|---|---|---|
| 6,134,461 | A | 10/2000 | Say et al. |
| 6,350,524 | B1 | 2/2002 | Lee et al. |
| 6,605,200 | B1 | 8/2003 | Mao et al. |
| 6,605,201 | B1 | 8/2003 | Mao et al. |
| 6,702,857 | B2 | 3/2004 | Brauker et al. |
| 6,736,957 | B1 | 5/2004 | Forrow et al. |
| 6,932,894 | B2 | 8/2005 | Mao et al. |
| 7,192,450 | B2 | 3/2007 | Brauker et al. |
| 7,364,592 | B2 | 4/2008 | Carr-Brendel et al. |
| 7,379,765 | B2 | 5/2008 | Petisce et al. |
| 7,501,053 | B2 | 3/2009 | Karinka et al. |
| 7,613,491 | B2 | 11/2009 | Boock et al. |
| 7,754,093 | B2 | 7/2010 | Forrow et al. |
| 8,060,174 | B2 | 11/2011 | Simpson et al. |
| 8,268,143 | B2 | 9/2012 | Liu et al. |
| 8,364,229 | B2 | 1/2013 | Simpson et al. |
| 8,444,834 | B2 | 5/2013 | Liu et al. |
| 8,560,039 | B2 | 10/2013 | Simpson et al. |
| 8,682,408 | B2 | 3/2014 | Boock et al. |
| 9,014,774 | B2 | 4/2015 | Mao et al. |
| 9,737,250 | B2 | 8/2017 | Hughes et al. |
| 9,788,765 | B2 | 10/2017 | Boock et al. |
| 10,327,677 | B2 | 6/2019 | Hoss et al. |
| 11,596,332 | B2 | 3/2023 | Shults et al. |
| 11,685,806 | B2 † | 6/2023 | Makal |
| 2005/0173245 | A1 * | 8/2005 | Feldman ................ C12Q 1/005 204/403.01 |
| 2011/0213225 | A1 | 9/2011 | Bernstein et al. |
| 2019/0320947 | A1 | 10/2019 | Chen et al. |
| 2020/0237275 | A1 | 7/2020 | Feldman et al. |
| 2020/0237277 | A1 | 7/2020 | Ouyang et al. |
| 2020/0241015 | A1 | 7/2020 | Ouyang et al. |
| 2021/0079216 | A1 | 3/2021 | Shinohara et al. |
| 2021/0219885 | A1 | 7/2021 | Wang et al. |
| 2022/0202326 | A1 | 6/2022 | Latour et al. |

FOREIGN PATENT DOCUMENTS

| | | | |
|---|---|---|---|
| WO | WO 1998013685 | A1 | 4/1998 |
| WO | WO 2017117468 | A1 | 7/2017 |
| WO | WO 2017117469 | A1 | 7/2017 |
| WO | WO 2017117472 | A1 | 7/2017 |
| WO | WO 2017117565 | A1 | 7/2017 |

OTHER PUBLICATIONS

Ward, Robert S. et al., "Development of a Hybrid Artificial Pancreas with a Dense Polyurethane Membrane," ASAIO Journal, vol. 39 (3), Jul. 1993; pp. M261-M267.

Wilson, George S. et al., "Enzyme-Based Biosensors for In Vivo Measurements," Chem. Rev. 2000, vol. 100, pp. 2693-2704.

Yang, Saipeng et al., "Glucose Biosensors on Oxygen Electrode with Sandwich-Type Membranes," Annals of Biomedical Engineering, vol. 23, 1995; pp. 833-839.

* cited by examiner
† cited by third party

Day 1:

Day 14:

BIOSENSORS WITH HYDROPHILIC POLYURETHANE MEMBRANES

BACKGROUND

Analyte sensors typically use a crosslinked diffusion-limiting membrane, such as a crosslinked poly(4-vinylpyridine) membrane, that overcoats an enzyme-containing analyte sensing layer. Both the membrane diffusivity and enzyme kinetics are temperature dependent and produce exponentially higher signals at higher temperature values. This undesirable temperature dependence can result in incorrect analyte measurements due to temperature shifts and the difference between the actual temperature and the temperature at which the calibration was conducted. Some analyte sensors attempt to correct for this error through an algorithm signal processing approach. For example, some analyte sensors employ a thermistor located near the skin surface that estimates the temperature at the sensing layer embedded within the skin on the senor tail so that the algorithm can attempt to correct for temperature at the time an analyte measurement is taken. With the thermistor only able to estimate the temperature at the sensing layer, the reported measurements will inherently include error from the temperature effects and the algorithm itself.

Additionally, and to achieve the desired properties of a membrane, it is often necessary to blend multiple polymers and/or include additional processing steps such as curing and quenching to avoid biphasic formations in membranes. Post dip curing can be deleterious to sensing layers.

Thus, there is a need for a biosensor with reduced temperature effects for sensing analytes with improved accuracy to monitor the health of patients. Moreover, there is a need in the art to provide membranes for biosensors that not only provide improved sensor functionality, but also require reduced processing.

BRIEF SUMMARY

The present disclosure relates to an analyte sensor comprising

- a working electrode,
- a sensing layer disposed on at least a portion of the working electrode, and
- a hydrophilic polyurethane membrane (e.g., a mass transport limiting membrane) overcoating at least the sensing layer, wherein the hydrophilic polyurethane is aliphatic, aromatic, or both aliphatic and aromatic.

In some embodiments, the hydrophilic polyurethane comprises an aliphatic hydrophilic polyurethane comprising a reaction product of an aliphatic organic diisocyanate and a diol.

In some embodiments, the aliphatic organic diisocyanate is selected from the group consisting of isophorone diisocyanate (IPDI), 1,4-cyclohexyl diisocyanate (CHDI), decane-1,10-diisocyanate, lysine diisocyanate (LDI), 1,4-butane diisocyanate (BDI), 1,5-pentanediisocyanate (PDI), hydrogenated xylene diisocyanate (HXDI), 2,2,4-trimethylhexamethylene diisocyanate (TMDI), hexamethylene diisocyanate (HDI), dicyclohexylmethane-4,4'-diisocyanate ($H_{12}$MDI), 1,3-bis(isocyanatemethyl)cyclohexane (BIMC), biuret, and combinations thereof.

In some embodiments, the hydrophilic polyurethane comprises an aromatic hydrophilic polyurethane comprising a reaction product of an aromatic organic diisocyanate and a diol.

In some embodiments, the aromatic organic diisocyanate is selected from the group consisting of methylene diphenyl diisocyanate (MDI), toluene diisocyanate (TDI), o-toluidine diisocyanate (TODI), 4,4'-diphenylmethane diisocyanate, p-phenylene diisocyanate (PPDI), xylene diisocyanate, hexamethylene diisocyanate, toluene diisocyanate, 1,5-naphthalene diisocyanate (NDI), polymeric MDI, and combinations thereof.

In some embodiments, the diol is selected from the group consisting of a polyether polyol, polylactide diol, polyglycolide diol, poly(lactide-b-glycolide), poly(lactide-co-caprolactone) diol, poly(hexamethylene carbonate) diol, polycarbonate diol, poly(ethylene terephthalate diol), poly(ethylene adipate) diol, poly(butylene adipate) diol, fatty acid-based linear diol, castor oil-based diol, soybean oil-based diol, ethylene glycol, diethylene glycol, propylene glycol, dipropylene glycol, 1,4-butanediol (BDO), 1,6-hexanediol (HDO), 1,3-butanediol, 2-methyl-1,3-propanediol, 1,5-pentanediol, neopentylglycol, 1,4-cyclohexanedimethanol (CHDM), 2,2-bis[4-(2-hydroxyethoxy) phenyl] propane (HEPP), hexamethylenediol, heptanediol, nonanediol, dodecanediol, 3-methyl-1,5-pentanediol, glycerine, sorbitol, sucrose, xylitol, pentaerythritol, ethylenediamine, butanediamine, hexamethylenediamine, hydroxyethyl resorcinol (HER), poly(tetramethylene ether) glycol (PTMG), poly(polytetrahydrofuran carbonate) diol, bis(2-hydroxyethyl)terephthalate (BHET), and a combination thereof.

In some embodiments, the diol is a polyether polyol, including a hydroxyl-terminated polyether polyol derived from a diol or polyol having a total of from 2 to 15 carbon atoms. In some embodiments, the diol is a polyether polyol selected from the group consisting of polycaprolactone diol, poly(hydroxybutyrate) diol, poly(butyleneglycol) diol, polypropylene oxide diol, poly(ethylene glycol diol), poly(tetramethylene oxide diol), and a combination thereof.

In some embodiments, the polyurethane comprises a reaction product of a diisocyanate, a diol, and a chain extender. In some embodiments, the chain extender comprises a diol or polyol, each comprising 2 to 20 carbon atoms. In some embodiments, the chain extender is selected from the group consisting of ethylene glycol, diethylene glycol, propylene glycol, dipropylene glycol, 1,4-butanediol (BDO), 1,6-hexanediol (HDO), 1,3-butanediol, 2-methyl-1,3-propanediol, 1,5-pentanediol, neopentylglycol, 1,4-cyclohexanedimethanol (CHDM), 2,2-bis[4-(2-hydroxyethoxy) phenyl]propane (HEPP), hexamethylenediol, heptanediol, nonanediol, dodecanediol, 3-methyl-1,5-pentanediol, glycerine, sorbitol, sucrose, xylitol, pentaerythritol, ethylenediamine, butanediamine, hexamethylenediamine, hydroxyethyl resorcinol (HER), poly(tetramethylene ether) glycol (PTMG), poly(polytetrahydrofuran carbonate) diol, bis(2-hydroxyethyl)terephthalate (BHET), and combinations thereof.

In some embodiments, the hydrophilic polyurethane is a thermoplastic polyurethane elastomer.

In some embodiments, the hydrophilic polyurethane consists of a single polyurethane polymer or a single copolymer comprising a polyurethane. In some embodiments, the copolymer comprises a polyurethane and a second polymer (e.g., a hydrophilic polymer). In some embodiments, the hydrophilic polyurethane membrane comprises a blend of the polyurethane and a second polymer (e.g., a hydrophilic polymer).

In some embodiments, the second polymer is a hydrophilic polymer selected from the group consisting of a polyether, a polyester, a polyalkene, a polyamine, a polyalkylene oxide, a polyalkylene glycol, a polyacrylate, a polymethacrylate, a thiolene polymer, alginate, chitosan, polyvinylpyrrolidone, polyvinyl alcohol, polyvinyl acetate, polysorbate, a hydrophilic polyurethane, a polyvinylpyridine-based polymer, and a pluronic. In some embodiments, the second polymer is a polyvinylpyridine-based polymer, such as a polyvinylpyridine polymer, a poly(4-vinylpyridine-co-styrene) polymer, and/or a poly(4-vinylpyridine-co-styrene) copolymer derivatized with propylsulfonate and poly(ethyleneoxide) moieties.

In some embodiments, the hydrophilic polyurethane has a Shore A hardness of at least about 60A (e.g., as measured in accordance with ASTM D2240). In some embodiments, the hydrophilic polyurethane can have a hardness from about 70 to about 93 Shore A. In some embodiments, the hydrophilic polyurethane can have a Shore A hardness of at most about 90A (e.g., as measured in accordance with ASTM D2240).

In some embodiments, the hydrophilic polyurethane is capable of absorbing from about 5% to about 95% of its weight in water. In some embodiments, the hydrophilic polyurethane is capable of absorbing about 5%-25% by weight of water.

In some embodiments, the hydrophilic polyurethane membrane limits the transport of mass to the sensing layer.

In some embodiments, the hydrophilic polyurethane membrane is not crosslinked.

In some embodiments, the analyte sensor provides consistent analyte measurements over a temperature range of about 22-42° C.

In some embodiments, the analyte sensor further comprises a reference electrode, a counter electrode, or both a reference electrode and a counter electrode.

In some embodiments, the analyte sensor further comprises a sensor housing.

In some embodiments, the analyte sensor further comprises a sensor tail configured for implantation into a tissue, wherein the working electrode is disposed on the sensor tail.

In some embodiments, the analyte sensor further comprises at least one insulation layer.

In some embodiments, the analyte sensor further comprises a substrate, wherein the working electrode is disposed on the substrate.

In some embodiments, the hydrophilic polyurethane membrane overcoats at least the sensing layer and working electrode.

In some embodiments, the hydrophilic polyurethane membrane overcoats the analyte sensor (e.g., sensor tail) in its entirety.

In some embodiments, the sensing layer comprises an analyte responsive enzyme and a redox mediator. In some embodiments, the analyte responsive enzyme comprises one or more enzymes selected from the group consisting of: (a) glucose oxidase or glucose dehydrogenase for detecting glucose; (b) glutamate oxidase or glutamate dehydrogenase for detecting glutamate; (c) lactate dehydrogenase or lactate oxidase for detecting lactate; (d) β-hydroxybutyrate dehydrogenase for detecting ketones; (e) alcohol dehydrogenase for detecting alcohol; and (f) amidohydrolase, creatine amidinohydrolase, and sarcosine oxidase for detecting creatinine.

In some embodiments, the sensing layer further comprises an albumin (e.g., a stabilizer) and optionally a pH buffer. In some embodiments, the sensing layer further comprises a coenzyme.

In some embodiments, the redox mediator comprises a polymer and an electron transfer agent. In some of these embodiments, the redox mediator polymer comprises poly (vinylpyridine), poly(thiophene), poly(aniline), poly(pyrrole), or poly(acetylene). In some embodiments, the polymer comprises a polymer or copolymer repeat unit comprising at least one pendant pyridinyl group, imidazolyl group, or both a pyridinyl and imidazolyl group.

In some embodiments, the electron transfer agent comprises a transition metal complex.

In some embodiments, the transition metal complex comprises osmium, ruthenium, iron, cobalt, vanadium, or a combination thereof.

In some embodiments, the transition metal complex is an osmium transition metal complex comprising one or more ligands, wherein at least one ligand comprises a nitrogen-containing heterocycle.

In some embodiments, the redox mediator comprises an osmium complex bonded to a poly(vinylpyridine)-based polymer.

In some embodiments, the redox mediator further comprises a cross linking agent. In some embodiments, the cross linking agent is a polyepoxide, cyanuric chloride, N-hydroxysuccinimide, an imidoester, epichlorohydrin, or a combination thereof. In some embodiments, the cross linking agent is a polyethylene glycol diglycidylether (PEGDGE).

In some embodiments, the analyte responsive enzyme is attached to the redox mediator.

In some embodiments, the sensing layer is continuous on the working electrode. In some embodiments, the sensing layer is discontinuous on the working electrode.

In some embodiments, the analyte to be detected is selected from the group consisting of glucose, glutamate, creatinine, alcohol, sarcosine, creatine, ketones, lactate and a combination thereof.

In some embodiments, the analyte is directly oxidized at the first working electrode. In some embodiments, the analyte is ascorbate.

In some embodiments, the analyte sensor further comprises a second working electrode configured for detecting a second analyte or for detecting a background signal, wherein a second portion of the mass transport limiting membrane overcoats the second working electrode and/or a second mass transport limiting membrane overcoats the second working electrode.

The present disclosure further relates to a method for detecting an analyte comprising:

(i) exposing an analyte sensor to a first analyte, wherein the sensor tail comprises (a) a sensor tail comprising a first working electrode configured for detecting the first analyte; and (b) a mass transport limiting membrane (e.g., a hydrophilic polyurethane membrane) permeable to the first analyte that overcoats at least a portion of the working electrode, wherein the mass transport limiting membrane comprises a polyurethane or a copolymer comprising a polyurethane;

(ii) applying a potential to the first working electrode;

(iii) obtaining a first signal from the first working electrode, the first signal being proportional to a concentration of the first analyte in a fluid contacting the first working electrode; and (iv) correlating the first signal to the concentration of the first analyte in the fluid.

In certain embodiments, the analyte sensor can further include a second working electrode configured for detecting a second analyte or for detecting a background signal. In certain embodiments, a second portion of the mass transport limiting membrane can overcoat the second working electrode and/or a second mass transport limiting membrane can overcoat the second working electrode. In certain embodiments, the second mass transport limiting membrane includes a polymer that is different from the first mass transport limiting membrane. In certain embodiments, a method of the present disclosure can further include subtracting the background signal obtained from the second working electrode from the first signal obtained from the first working electrode to obtain the concentration of the first analyte in the fluid.

The present disclosure further relates to a method of forming an analyte sensor comprising disposing a sensing layer on at least a portion of a working electrode, and coating at least the sensing layer with a hydrophilic polyurethane membrane, wherein the hydrophilic polyurethane is aliphatic, aromatic, or both aliphatic and aromatic.

In some embodiments, the coating comprises dipping the analyte sensor comprising the sensing layer into a solution comprising the hydrophilic polyurethane and at least one solvent to provide a dipped analyte sensor.

In some embodiments, the method further comprises heating the dipped analyte sensor to dry and/or condition the hydrophilic polyurethane membrane.

In some embodiments, the solvent comprises 2-methyltetrahydrofuran, ethanol, 1,4-dioxane, water, or mixtures thereof.

In some embodiments, the solution is formed by combining the hydrophilic polyurethane and solvent until the polyurethane absorbs the solvent and forms a polyurethane-solvent mixture, heating the polyurethane-solvent mixture until the polyurethane is dissolved in the solvent, and optionally removing any solids that form.

In certain embodiments, the manufacturing method comprises dip-coating a working electrode configured for detecting an analyte with a solution comprising a polyurethane and a solvent system. In certain embodiments, the solution includes a single polyurethane polymer or a single copolymer comprising a polyurethane. In certain embodiments, the solution is processed, e.g., centrifuged, prior to dip-coating the working electrode in the solution. In certain embodiments, the solution following centrifugation comprises impurities at an amount of less than about 5% w/v, less than about 4% w/v, less than about 3% w/v, less than about 2% w/v, less than about 1% w/v, less than about 0.9% w/v, less than about 0.8% w/v, less than about 0.7% w/v, less than about 0.6% w/v, less than about 0.5% w/v, less than about 0.4% w/v, less than about 0.3% w/v, less than about 0.2% w/v or less than about 0.1% w/v. In certain embodiments, the solvent system comprises an alcohol. In certain embodiments, the solvent system further comprises a second component. In certain embodiments, the second component comprises a solvent that is miscible with the alcohol of the solvent. In certain embodiments, the second component comprises water. In certain embodiments, the second component comprises a cyclic compound. In certain embodiments, the second component comprises water and a cyclic compound. In certain embodiments, the cyclic compound is methyl-tetrahydrofuran, cyclopentyl methyl ether, 1,4-dioxane, or any combination thereof. In certain embodiments, the ratio of the alcohol solvent to the second component in the solvent system is about 1:1 to about 9:1. In certain embodiments, the alcohol is ethanol. In certain embodiments, the solvent system comprises water and 1,4-dioxane. In certain embodiments, the solvent system comprises a ratio of water to 1,4-dioxane of about 1:5 to about 1:15. In certain embodiments, the polyurethane or the copolymer comprising a polyurethane is present in the solution at a concentration of about 50 mg/ml to about 100 mg/ml. In certain embodiments, the method for manufacturing an analyte sensor further comprises depositing a composition comprising an enzyme onto a surface of the working electrode to generate at least one active area on the working electrode prior to dip-coating. In certain embodiments, the at least one active area further comprises one or more of the following: an electron transfer agent, a stabilizer, and a coenzyme. In certain embodiments, the analyte is selected from the group consisting of glucose, glutamate, creatinine, alcohol, sarcosine, creatine, ketones, lactate, ascorbate and a combination thereof. In certain embodiments, the polyurethane is capable of absorbing from about 5% to about 95% of its weight in water. In certain embodiments, the polyurethane can have a hardness from about 70 to about 93 Shore A. In certain embodiments, the copolymer comprises a polyurethane and a second polymer. In certain embodiments, the second polymer is a hydrophilic polymer. In certain embodiments, the hydrophilic polymer is selected from the group consisting of a polyether, a polyester, a polyalkene, a polyamine, a polyalkylene oxide, a polyalkylene glycol, a polyacrylate, a polymethacrylate, a thiolene polymer, alginate, chitosan, polyvinylpyrrolidone, polyvinyl alcohol, polyvinyl acetate, polysorbate, a hydrophilic polyurethane, a polyvinylpyridine-based polymer, and a pluronic. In certain embodiments, the polyvinylpyridine-based polymer is a polyvinylpyridine polymer, a poly(4-vinylpyridine-co-styrene) polymer, and/or a poly(4-vinylpyridine-co-styrene) copolymer derivatized with propylsulfonate and poly(ethyleneoxide) moieties.

The present disclosure provides analyte sensors generated by the methods disclosed herein.

Additional embodiments and advantages of the disclosure will be set forth, in part, in the description that follows, and will flow from the description, or can be learned by practice of the disclosure.

It is to be understood that both the foregoing summary and the following detailed description are exemplary and explanatory only, and do not restrict the scope of the claims.

BRIEF DESCRIPTION OF THE DRAWINGS/FIGURES

The following figures are included to illustrate certain aspects of the present disclosure and should not be viewed as exclusive embodiments. The subject matter disclosed is capable of considerable modifications, alterations, combinations, and equivalents in form and function, without departing from the scope of this disclosure.

Figure 12A:
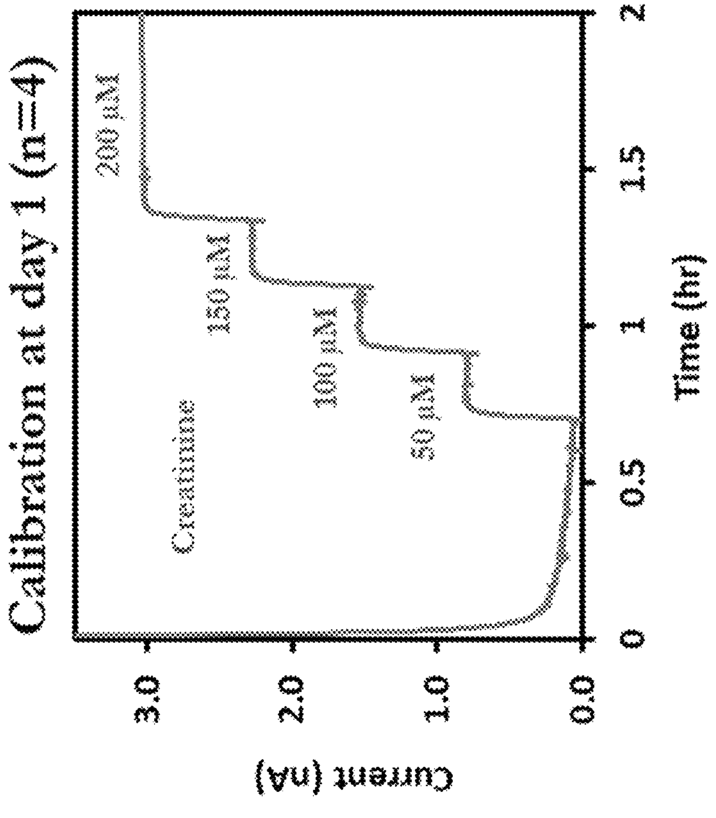
Figure 12B:
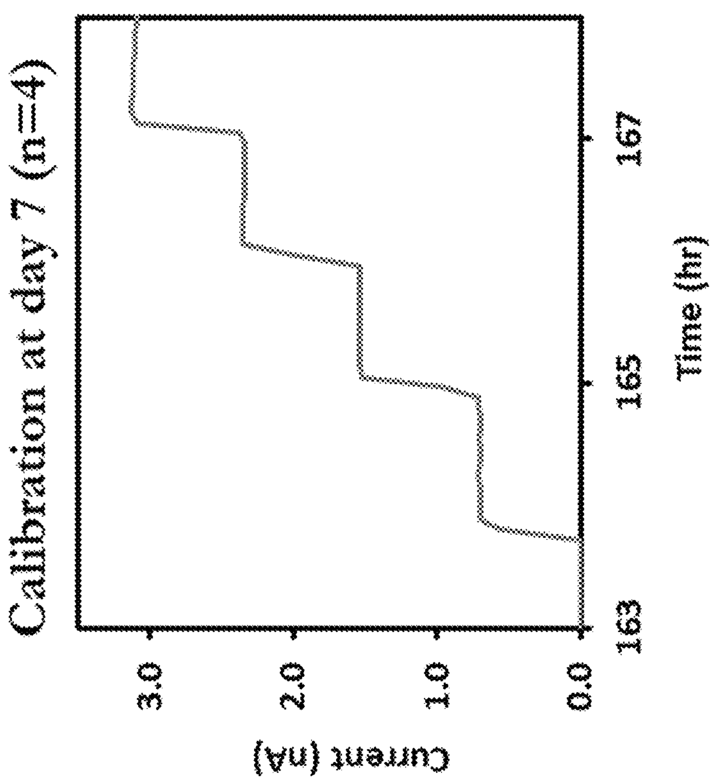
Figure 12D:
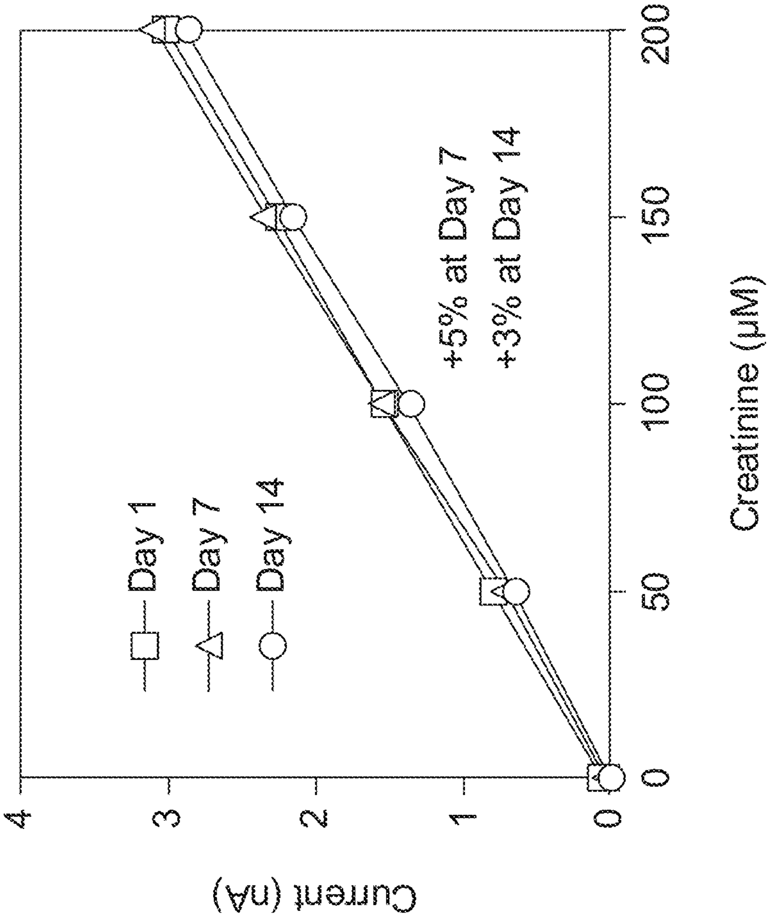
Figure 12C:
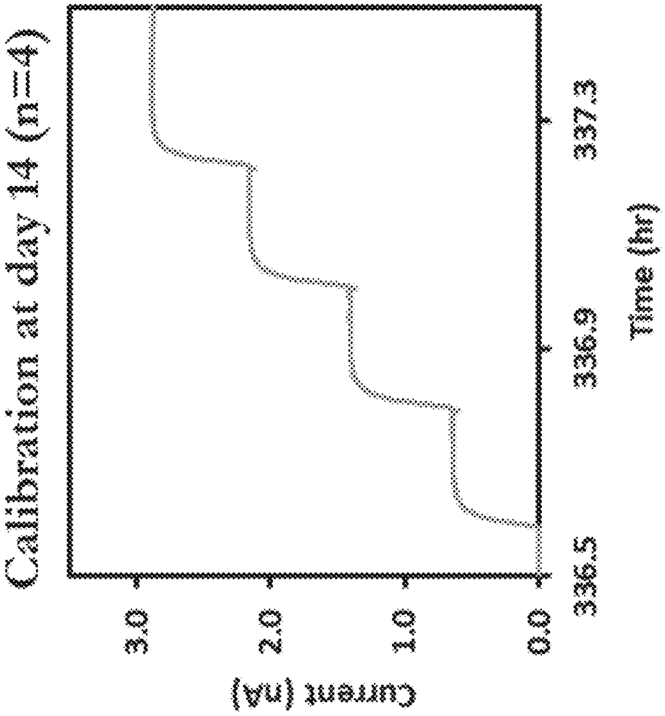

FIGS. 12A-12C provide calibration data on days 1, 7, and 14, respectively, of creatinine sensors according to certain embodiments of the present disclosure. FIG. 12D provides a sensitivity measurement of said sensors on days 1, 7, and 14.

Figure 13A:
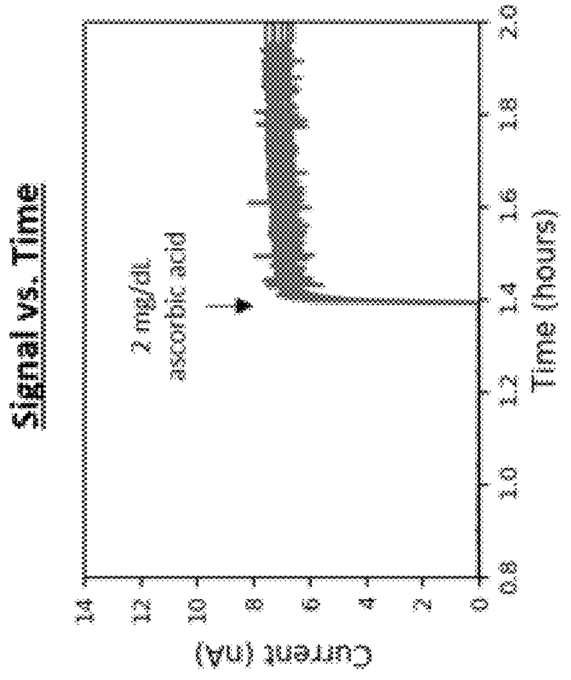
Figure 13B:
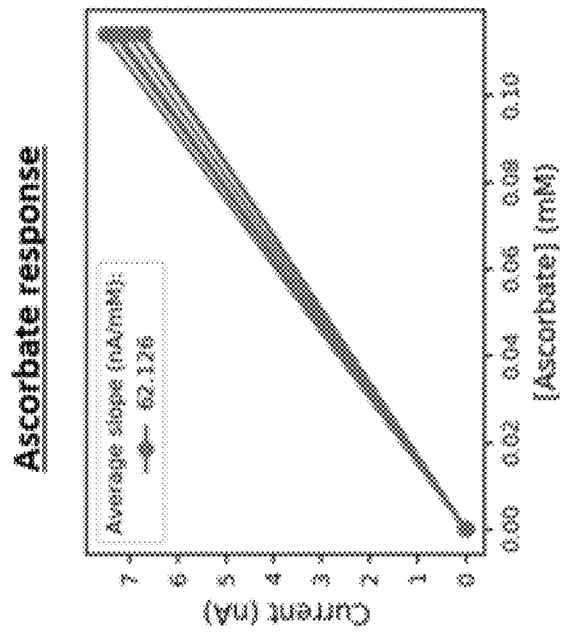
Figure 13C:
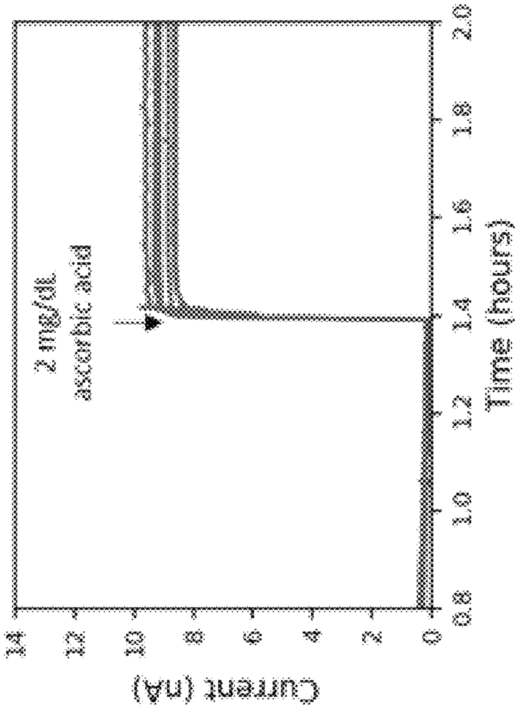
Figure 13D:
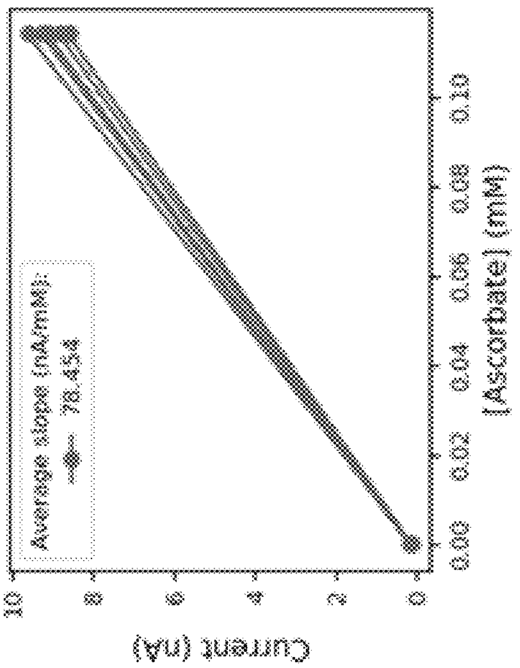

FIGS. 13A and 13C provide sensor signal over time during addition of 2 mg/dL ascorbate of sensors according to certain embodiments of the present disclosure. FIGS. 13B and 13D provide ascorbate response for calibrations of these sensors on days 1 and 14.

Figure 14:
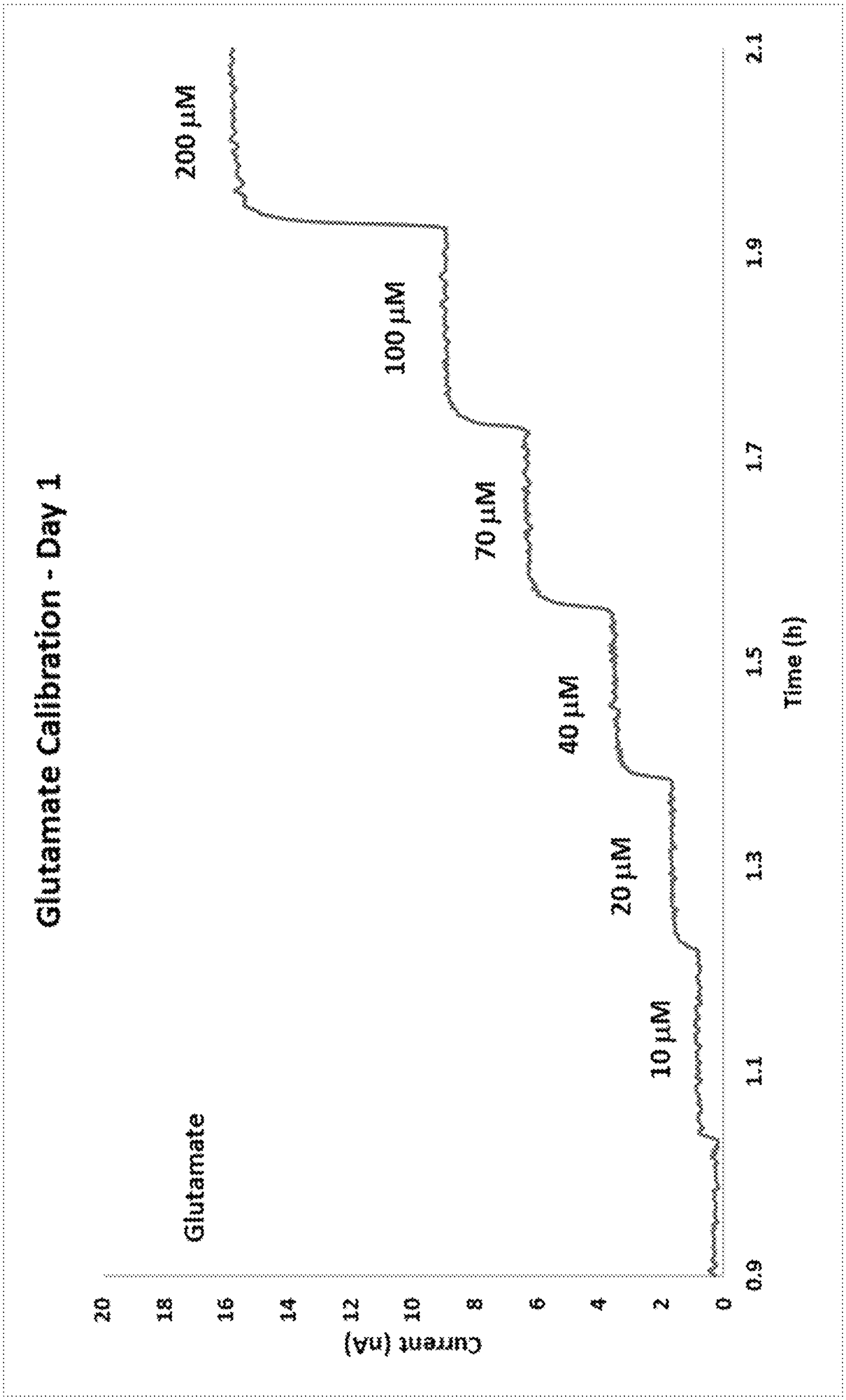
Figure 15:
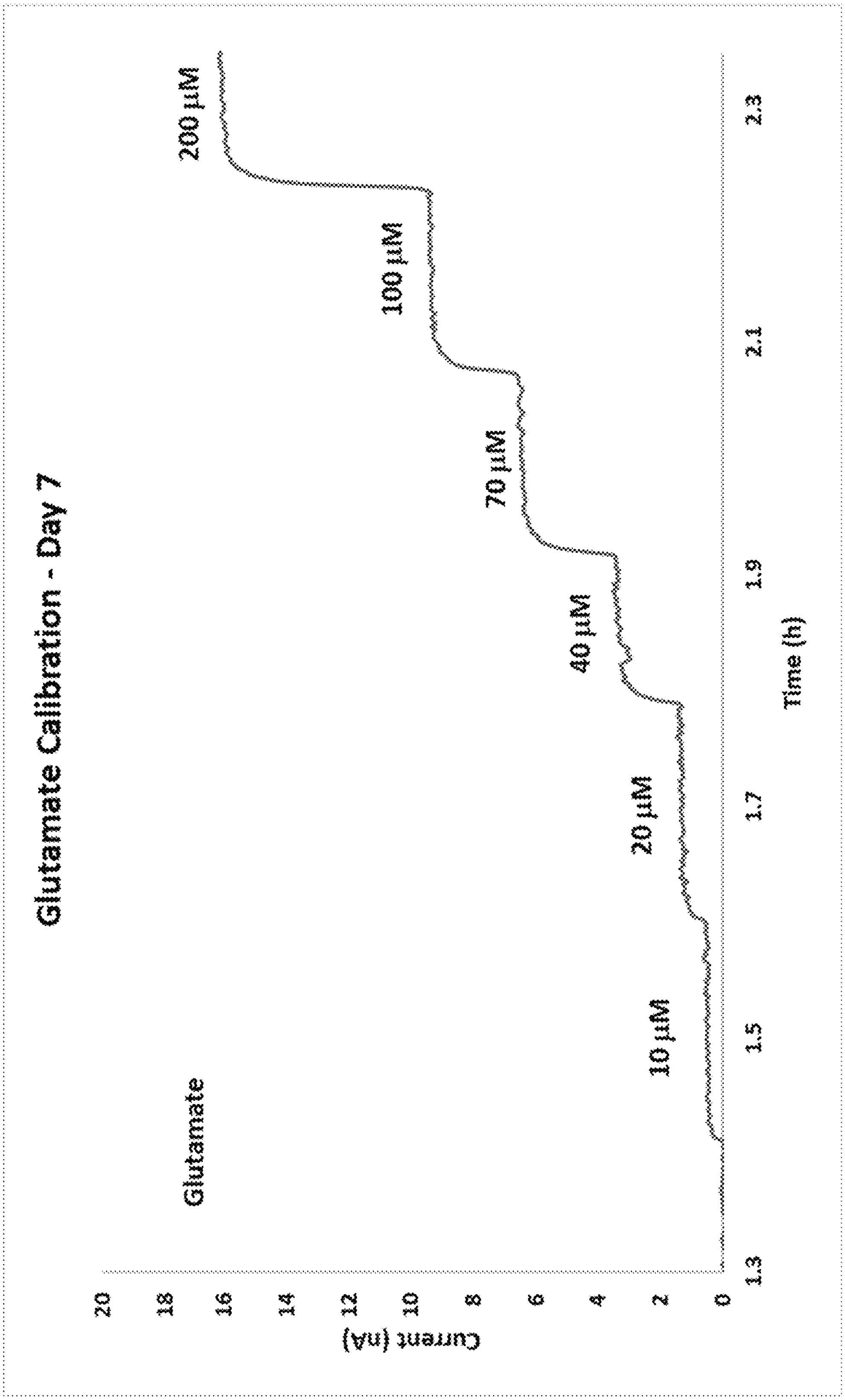
Figure 16:
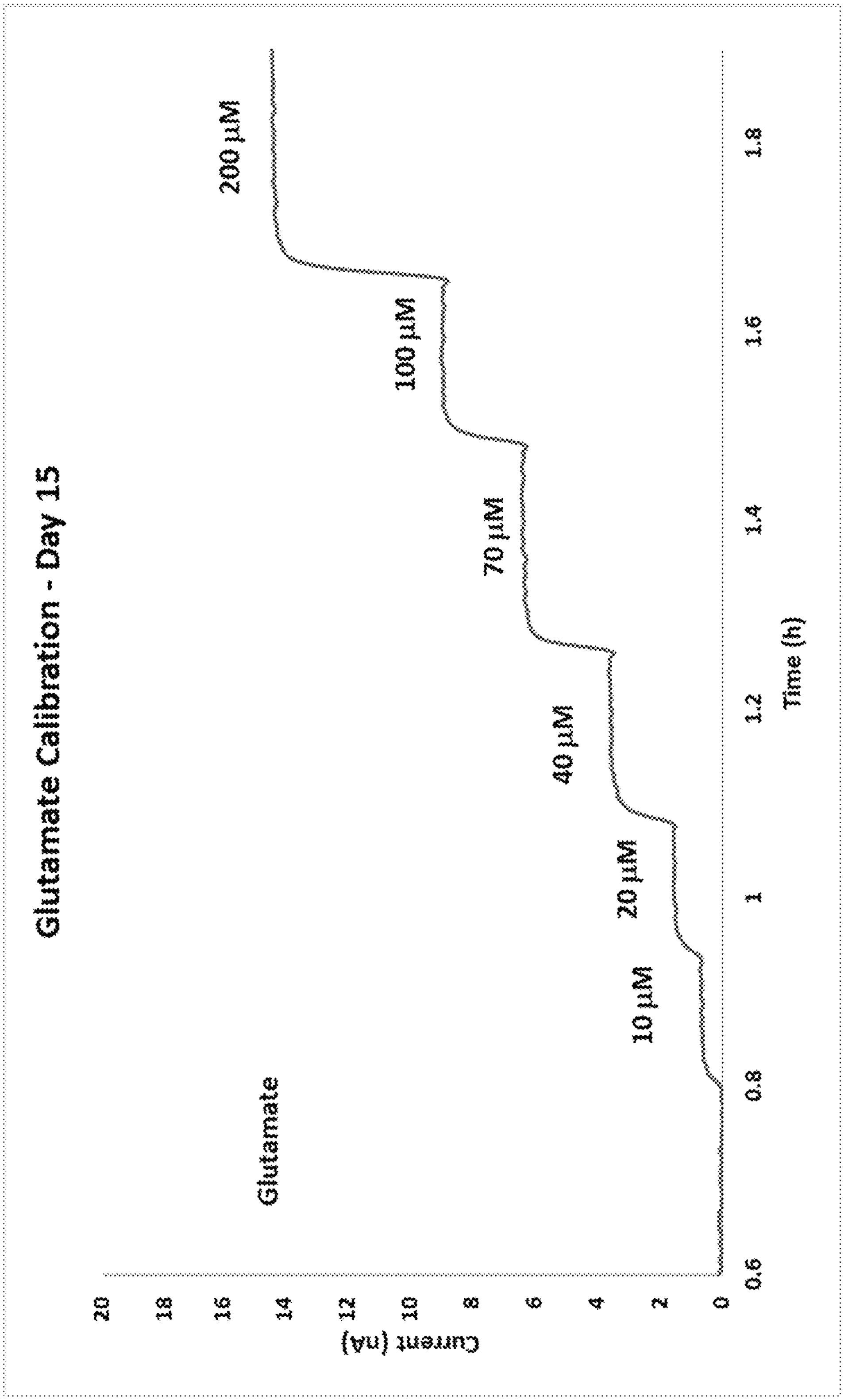

FIGS. 14-16 provide chronoamperometric current response vs time curves of a coated glutamate sensor on day 1 (FIG. 14), day 7 (FIG. 15), and day 15 (FIG. 16) according to certain embodiments of the present disclosure.

Figure 17:
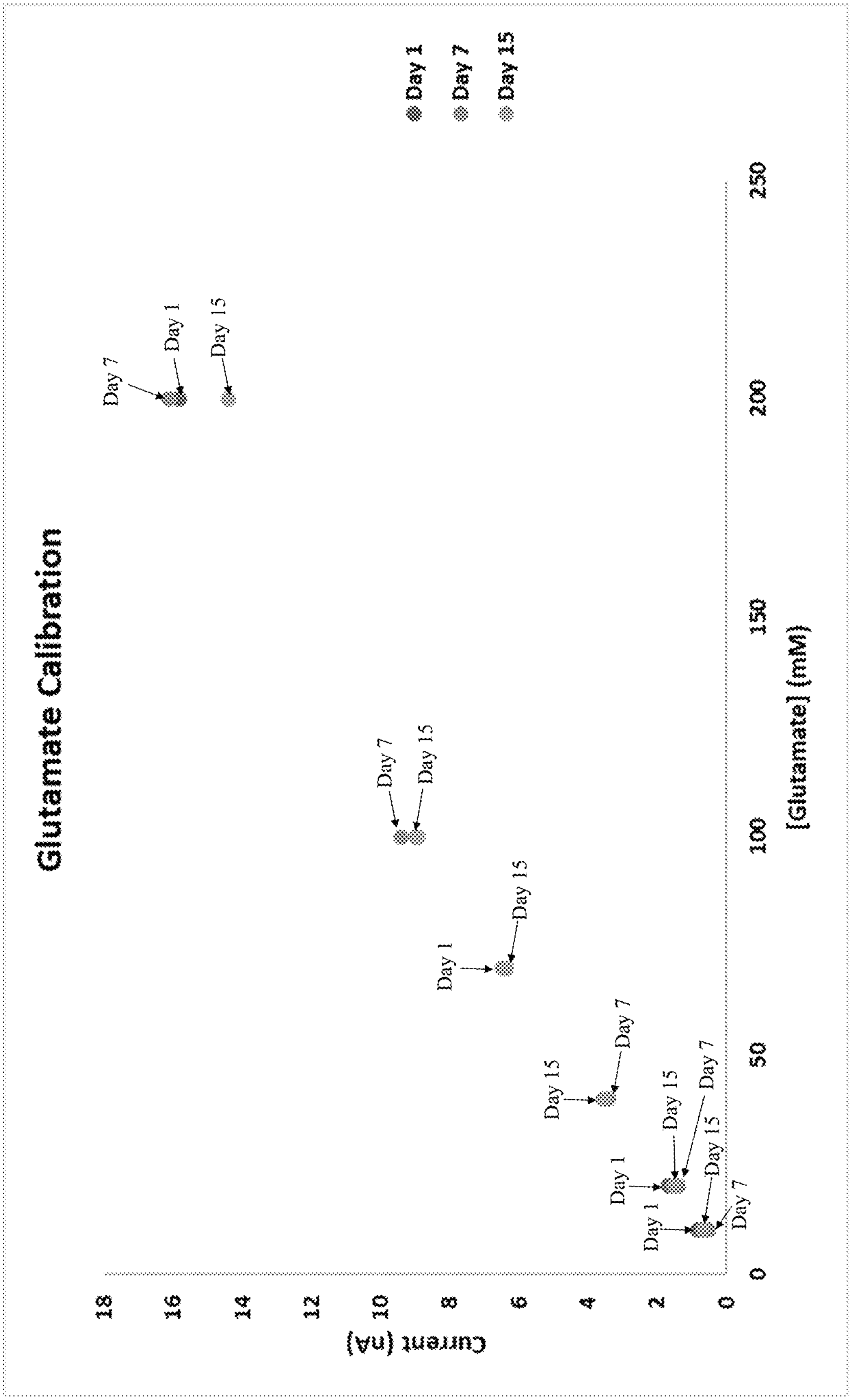

FIG. 17 provides analyte sensitivity of a glutamate sensor on days 1, 7, and 15.

DETAILED DESCRIPTION

The headings provided herein are not limitations of the various embodiments of the disclosure, which can be defined by reference to the specification as a whole. It is also to be understood that the terminology used herein is for the purpose of describing particular embodiments only, and is not intended to be limiting, since the scope of the present disclosure will be limited only by the appended claims.

Definitions

For convenience, the meaning of some terms and phrases used in the specification, examples, and appended claims are provided below. Unless stated otherwise, or implicit from context, the following terms and phrases include the meanings provided below. The definitions are provided to aid in describing particular embodiments, and are not intended to limit the claimed technology, because the scope of the technology is limited only by the claims. Unless otherwise defined, all technical and scientific terms used herein have the same meaning as commonly understood by one of ordinary skill in the art to which this technology belongs. If there is an apparent discrepancy between the usage of a term in the art and its definition provided herein, the definition provided within the specification will control.

The articles "a," "an," and "the" are used herein to refer to one or to more than one (i.e., to at least one) of the grammatical object of the article. By way of example, "an element" means one element or more than one element.

As used herein, the term "about" means within an acceptable error range for the particular value as determined by one of ordinary skill in the art, which depends in part on how the value is measured or determined, i.e., the limitations of the measurement system. For example, "about" can mean within 3 or more than 3 standard deviations, per the practice in the art. Alternatively, "about" can mean a range of up to 20% (e.g., up to 10%, up to 5%, or up to 1%) of a given value.

The term "at least" prior to a number or series of numbers is understood to include the number associated with the term "at least," and all subsequent numbers or integers that could logically be included, as clear from context. When at least is present before a series of numbers or a range, it is understood that "at least" can modify each of the numbers in the series or range. For example, "at least 3" means at least 3, at least 4, at least 5, etc. When at least is present before a component in a method step, then that component is included in the step, whereas additional components are optional.

As used herein, the terms "comprises," "comprising," "having," "including," "containing," and the like are open-ended terms meaning "including, but not limited to." To the extent a given embodiment disclosed herein "comprises" certain elements, it should be understood that present disclosure also specifically contemplates and discloses embodiments that "consist essentially of" those elements and that "consist of" those elements.

As used herein the terms "consists essentially of," "consisting essentially of," and the like are to be construed as a semi-closed terms, meaning that no other ingredients which materially affect the basic and novel characteristics of an embodiment are included.

As used herein, the terms "consists of," "consisting of," and the like are to be construed as closed terms, such that an embodiment "consisting of" a particular set of elements excludes any element, step, or ingredient not specified in the embodiment.

As used herein, the term "measure" and variations thereof can encompass the meaning of a respective term, such as "determine," "calculate," and variations thereof.

As used herein, an "analyte" is an enzyme substrate that is subject to be measured or detected. The analyte can be from, for example, a biofluid and can be tested in vivo, ex vivo, or in vitro.

As used herein, a "sensor" is a device configured to detect the presence and/or measure the level of an analyte in a sample via electrochemical oxidation and reduction reactions on the sensor. These reactions are transduced to an electrical signal that can be correlated to an amount, concentration, or level of an analyte in the sample.

As used herein, "analyte sensor" or "sensor" can refer to any device capable of receiving sensor information from a user, including for purpose of illustration but not limited to, body temperature sensors, blood pressure sensors, pulse or heart-rate sensors, glucose level sensors, analyte sensors, physical activity sensors, body movement sensors or any other sensors for collecting physical or biological information. Analytes measured by the analyte sensors of the present disclosure can include, by way of example and not limitation, glucose, lactate, ketones (e.g., ketone bodies), glutamine, alcohols, aspartate, asparagine, glutamate, creatinine, hematocrit, acetoacetate, fructosamine, amylase, bilirubin, cholesterol, chorionic gonadotropin, creatine kinase (e.g., CK-MB), creatine, DNA, RNA, growth factors, growth hormones, hormones (e.g., thyroid stimulating hormone), steroids, vitamins (e.g., ascorbic acid), uric acid, neurochemicals (e.g., acetylcholine, norepinephrine and dopamine), oxygen, albumin, hemoglobin A1C, alkaline phosphatase, alanine transaminase, aspartate aminotransferase, blood urea nitrogen, sarcosine, prostate-specific antigen, prothrombin, thrombin, troponin, pyruvate, acetaldehyde, ascorbate, galactose, L-xylono-1,4-lactone, glutathione disulfide, hydrogen peroxide, linoleate, 1,3-bisphosphoglycerate, 6-phospho-D-glucono-1,5-lactone, hemoglobin, pharmaceutical drugs (e.g., antibiotics (e.g., gentamicin, vancomycin and the like), digitoxin, digoxin, theophylline, insulin and warfarin), drugs of abuse (e.g., analgesics, depressants, stimulants and hallucinogens), metal ions (e.g., potassium, sodium, calcium, manganese, iron, cobalt, molybdenum, magnesium, zinc and chlorine), pH, carbonate, phosphate, sulfate, fatty acids and antibodies.

As used herein, the term “hydrophilic” refers to having an affinity for and capable of absorbing water.

As used herein, the terms “enzyme composition” and “sensing chemistry,” are used interchangeably, and refer to a composition that is used to detect and/or measure an analyte. In certain non-limiting embodiments, the enzyme compositions can include one or more enzymes, polymers, redox mediators, crosslinkers etc.

As used herein, a “working electrode” is an electrode at which the analyte (or a second compound whose level depends on the level of the analyte) is electrooxidized or electroreduced with or without the agency of an electron transfer agent.

As used herein, a “counter electrode” refers to an electrode paired with the working electrode, through which passes a current equal in magnitude and opposite in sign to the current passing through the working electrode. In the context of embodiments of the present disclosure, the term “counter electrode” includes both a) counter electrodes and b) counter electrodes that also function as reference electrodes (i.e., counter/reference electrodes), unless otherwise indicated.

As used herein, a “reference electrode” includes both a) reference electrodes and b) reference electrodes that also function as counter electrodes (i.e., counter/reference electrodes), unless otherwise indicated.

As used herein, “electrolysis” is the electrooxidation or electroreduction of a compound either directly at an electrode or via one or more electron transfer agents.

As used herein, components are “immobilized” or “attached” to a polymer and/or a sensor, for example, when the components are entrapped on, entrapped within, covalently bound, ionically bound, electrostatically bound, or coordinatively bound to constituents of a polymer, a sol-gel matric, membrane, and/or sensor, which reduces or precludes mobility.

As used herein, a “non-leachable” compound, or a compound that is “non-leachably disposed” is meant to define a compound that is affixed on the sensor such that it does not substantially diffuse away from the sensing layer of the working electrode for the period in which the sensor is used (e.g., the period in which the sensor is implanted in a patient or measuring a sample).

As used herein an “electron transfer agent” is a compound that carries electrons between the analyte and the working electrode, either directly, or in cooperation with other electron transfer agents. One example of an electron transfer agent is a redox mediator.

As used herein, a “redox mediator” is an electron-transfer agent for carrying electrons between an analyte, an analyte-reduced or analyte-oxidized, enzyme, and an electrode, either directly, or via one or more additional electron-transfer agents. A redox mediator that includes a polymeric backbone can also be referred to as a “redox polymer.”

The term “polymer,” as used herein, refers to molecular structures that include repeating structural units referred to as monomers. These subunits are typically connected by covalent chemical bonds. As would be readily recognized by a person of ordinary skill in the art, polymers can be branched or unbranched. In certain embodiments, the polymers are homopolymers, which are polymers formed by polymerization of a single type of monomer. In certain embodiments, polymers are heteropolymers or copolymers that include two or more different types of monomers. In certain embodiments, a copolymer of the present disclosure can include three or more different types of monomers.

The term “reference electrode” as used herein, can refer to either reference electrodes or electrodes that function as both, a reference and a counter electrode. Similarly, the term “counter electrode,” as used herein, can refer to both, a counter electrode and a counter electrode that also functions as a reference electrode.

As used herein, the term “precursor polymer” refers to the starting polymer before the various modifier groups are attached to form a modified polymer.

As used herein, the term “homogenous membrane” refers to a membrane comprising a single type of membrane polymer.

As used herein, the term “multi-component membrane” refers to a membrane comprising two or more types of membrane polymers.

As used herein, the term “single-component membrane” refers to a membrane comprising one type of membrane polymer.

As used herein, the term “polyvinylpyridine-based polymer” refers to a polymer or copolymer that comprises polyvinylpyridine (e.g., poly(2-vinylpyridine) or poly(4-vinylpyridine)) or a derivative thereof.

A “substituted” functional group (e.g., substituted alkyl, alkenyl, alkoxy, aryl) includes at least one substituent (e.g., 1, 2, 3, 4, or 5) that can be, for example, halo, alkoxy, mercapto, aryl, alkoxycarbonyl, alkylaminocarbonyl, dialkylaminocarbonyl, hydroxy, amino, alkylamino, dialkylamino, trialkylammonium, alkanoylamino, arylcarboxamido, hydrazino, alkylthio, alkenyl, and reactive groups.

A “reactive group” is a functional group of a molecule (e.g., a polymer, a crosslinking agent, an enzyme) that is capable of reacting with another compound to couple at least a portion (e.g., another reactive group) of that other compound to the molecule. Reactive groups include carboxy, activated ester, sulfonyl halide, sulfonate ester, isocyanate, isothiocyanate, epoxide, aziridine, halide, aldehyde, ketone, amine, acrylamide, thiol, acyl azide, acyl halide, hydrazine, hydroxylamine, alkyl halide, imidazole, pyridine, phenol, alkyl sulfonate, halotriazine, imido ester, maleimide, hydrazide, hydroxy, and photo-reactive azido aryl groups. Activated esters, as understood in the art, generally include esters of succinimidyl, benzotriazolyl, or aryl substituted by electron-withdrawing groups such as sulfo, nitro, cyano, or halo groups; or carboxylic acids activated by carbodiimides.

As used herein, a “sensing layer” is a component of the sensor including constituents that facilitate the electrolysis of the analyte. The sensing layer can include constituents such as a redox mediator (e.g., an electron transfer agent or a redox polymer), a catalyst (e.g., an analyte-specific enzyme), which catalyzes a reaction of the analyte to produce a response at the working electrode, or both an electron transfer agent and a catalyst. In some embodiments of the present disclosure, a sensor includes a sensing layer that is non-leachably disposed in proximity to or on the working electrode.

As used herein, a “sensing element” is an application or region of an analyte-specific enzyme disposed with the sensing layer. As such, a sensing element is capable of interacting with the analyte. A sensing layer can have more than one sensing element making up the analyte detection area disposed on the working electrode. In some embodiments, the sensing element includes an analyte-specific enzyme and an electron transfer agent (e.g., electron transfer agent). In some embodiments, the sensing element includes an analyte specific enzyme, polymer, a redox mediator, and a crosslinker.

As used herein, "crosslinking agent" or "crosslinker" is a molecule that contains at least two (e.g., 2, 3, or 4) reactive groups (e.g., terminal functional groups) that can link at least two molecules together (intermolecular crosslinking) or at least two portions of the same molecule together (intramolecular crosslinking). A crosslinking agent having more than two reactive groups can be capable of both intermolecular and intramolecular crosslinkings at the same time.

A "membrane solution" is a solution that contains the components for forming the membrane, including, e.g., polymer (e.g., hydrophilic polyurethane) and a solvent.

As used herein, a "biofluid" is any bodily fluid or bodily fluid derivative in which the analyte can be measured. Examples of biofluid include, for example, dermal fluid, subcutaneous fluid, interstitial fluid, plasma, blood (e.g., from a vein or blood vessel), lymph, synovial fluid, cerebrospinal fluid, saliva, bronchoalveolar lavage, amniotic fluid, sweat, or tears. In certain embodiments, the biological fluid is dermal fluid or interstitial fluid.

The term "patient" refers to a living animal, and thus encompasses a living mammal and a living human, for example. The term "user" can be used herein as a term that encompasses the term "patient."

The term "$C_{6-30}$ aryl" refers to an aromatic compound comprising a mono-, bi-, or tricyclic carbocyclic ring system having one, two, or three aromatic rings, for example, phenyl, naphthyl, anthracenyl, or biphenyl. The aromatic compound generally contains from, for example, 6 to 30 carbon atoms, from 6 to 18 carbon atoms, from 6 to 14 carbon atoms, or from 6 to 10 carbon atoms. It is understood that the term aryl includes carbocyclic moieties that are planar and comprise $4n+2\pi$ electrons, according to Hückel's Rule, wherein n=1, 2, or 3.

The term "halo" refers to a radical of a halogen, i.e., F, Cl, Br, or I.

The term "$C_{1-6}$ alkyl" refers to a straight-chain or branched alkyl substituent containing from, for example, from about 1 to about 6 carbon atoms, e.g., from about 1 to about 4 carbon atoms or about 1 to about 3 carbons. Examples of alkyl group include, but are not limited to, methyl, ethyl, n-propyl, isopropyl, n-butyl, sec-butyl, isobutyl, tert-butyl, n-pentyl, isopentyl, n-hexyl, and the like. This definition also applies wherever "alkyl" occurs as part of a group, such as, e.g., $C_{1-6}$ haloalkyl (e.g., -trifluoromethyl ($—CF_3$)).

The term "$C_{2-6}$ alkenyl" refers to a linear alkenyl substituent containing from, for example, 2 to about 6 carbon atoms (branched alkenyls are about 3 to about 6 carbons atoms). In accordance with an embodiment, the alkenyl group is a $C_{2-4}$ alkenyl. Examples of alkenyl group include, but are not limited to, ethenyl, allyl, 2-propenyl, 1-butenyl, 2-butenyl, 1-pentenyl, 2-pentenyl, 3-pentenyl, 1-hexenyl, and the like.

The term "$C_{2-6}$ alkynyl" refers to a linear alkynyl substituent containing from, for example, 2 to about 6 carbon atoms (branched alkynyls are about 3 to about 6 carbons atoms). In accordance with an embodiment, the alkynyl group is a $C_{2-4}$ alkynyl. Examples of alkynyl group include, but are not limited to, ethynyl, propynyl, 1-butynyl, 2-butynyl, 1-pentynyl, 2-pentynyl, 3-pentynyl, 1-hexynyl, and the like.

The term "hydroxy" refers to —OH.

The term "nitro" refers to $—NO_2$.

The term "cyano" refers to —CN.

The term "amino" refers to $—NH_2$. The terms mono- and di-$C_{1-6}$ alkylamino refer to a nitrogen bonded to one or two $C_{1-6}$ alkyl groups, respectively, i.e., —NHR or —NRR', in which R and R' are the same or different $C_{1-6}$ alkyl groups.

The term "$C_{1-6}$ alkoxy" refers to a $C_{1-6}$ alkyl group bonded to an oxygen, i.e., —OR, in which R is a $C_{1-6}$ alkyl group.

The term "$C_{6-10}$ aryloxy" refers to an aryl group bonded to an oxygen, i.e., —O(Ar), in which Ar is a $C_{6-10}$ aryl group.

The term "aralkoxy" refers to the group —OR(Ar), in which R is an $C_{1-6}$ alkyl group and Ar is a $C_{6-10}$ aryl group.

The term "carboxy" refers to —C(O)OH.

The term "$C_{1-6}$ alkylcarboxy" refers to a carboxy group wherein the hydrogen bound to the carboxy group has been replaced with a $C_{1-6}$ alkyl group, i.e., —C(O)OR, wherein R is an $C_{1-6}$ alkyl group.

The term "amido" refers to the structure —C(O)NH or —NHC(O). The term "$C_{1-6}$ alkylamido" refers to —C(O)NR or —NRC(O), wherein R is $C_{1-6}$ alkyl.

The term "$C_{1-6}$ haloalkylamido" refers to a $C_{1-6}$ alkylamido group in which the $C_{1-6}$ alkyl group is substituted with 1, 2, or 3 halo groups, as described herein.

The term "heteroaryl" refers to an aromatic compound, as described herein, containing a 5 or 6 membered ring in which 1 or 2 carbons have been replaced with nitrogen, sulfur, and/or oxygen. Examples of heteroaryl include, but are not limited to, pyridinyl, furanyl, pyrrolyl, quinolinyl, thiophenyl, indolyl, oxazolyl, isoxazolyl, pyrazolyl, imidazolyl, thiazolyl, isothiazolyl, 1,3,4-thiadiazolyl, pyridazinyl, pyrimidinyl, pyrazinyl, and triazinyl.

The term "heterocycloalkyl" refers to a monocyclic, bicyclic, or spiro ring system containing 3 to 7 carbon atom ring members and 1, 2, or 3 other atoms selected from nitrogen, sulfur, and/or oxygen. Examples of such heterocycloalkyl rings include, but are not limited to, aziridinyl, oxiranyl, thiazolinyl, imidazolidinyl, piperazinyl, homopiperazinyl, pyrrolinyl, pyrrolidinyl, tetrahydrofuranyl, tetrahydrothiofuranyl, pyranyl, tetrahydropyranyl, piperidinyl, and morpholinyl.

Analyte Sensor

Generally, embodiments of the present disclosure include systems, devices, and methods for the use of analyte sensor insertion applicators for use with in vivo analyte monitoring systems. An applicator can be provided to the user in a sterile package with an electronics housing of the sensor control device contained therein. According to certain embodiments, a structure separate from the applicator, such as a container, can also be provided to the user as a sterile package with a sensor module and a sharp module contained therein. The user can couple the sensor module to the electronics housing, and can couple the sharp to the applicator with an assembly process that involves the insertion of the applicator into the container in a specified manner. In certain embodiments, the applicator, sensor control device, sensor module and sharp module can be provided in a single package. The applicator can be used to position the sensor control device on a human body with a sensor in contact with the wearer's bodily fluid. The embodiments provided herein are improvements to increase the wear time of a sensor. Other improvements and advantages are provided as well. The various configurations of these devices are described in detail by way of the embodiments which are only examples.

Furthermore, many embodiments include in vivo analyte sensors structurally configured so that at least a portion of the sensor is, or can be, positioned in the body of a user to obtain information about at least one analyte of the body. It should be noted, however, that the embodiments disclosed herein can be used with in vivo analyte monitoring systems that incorporate in vitro capability, as well as purely in vitro or ex vivo analyte monitoring systems, including systems that are entirely non-invasive.

Furthermore, the systems and methods presented herein can be used for operations of a sensor used in an analyte monitoring system, such as but not limited to wellness, fitness, dietary, research, information or any purposes involving analyte sensing over time.

Figure 1:
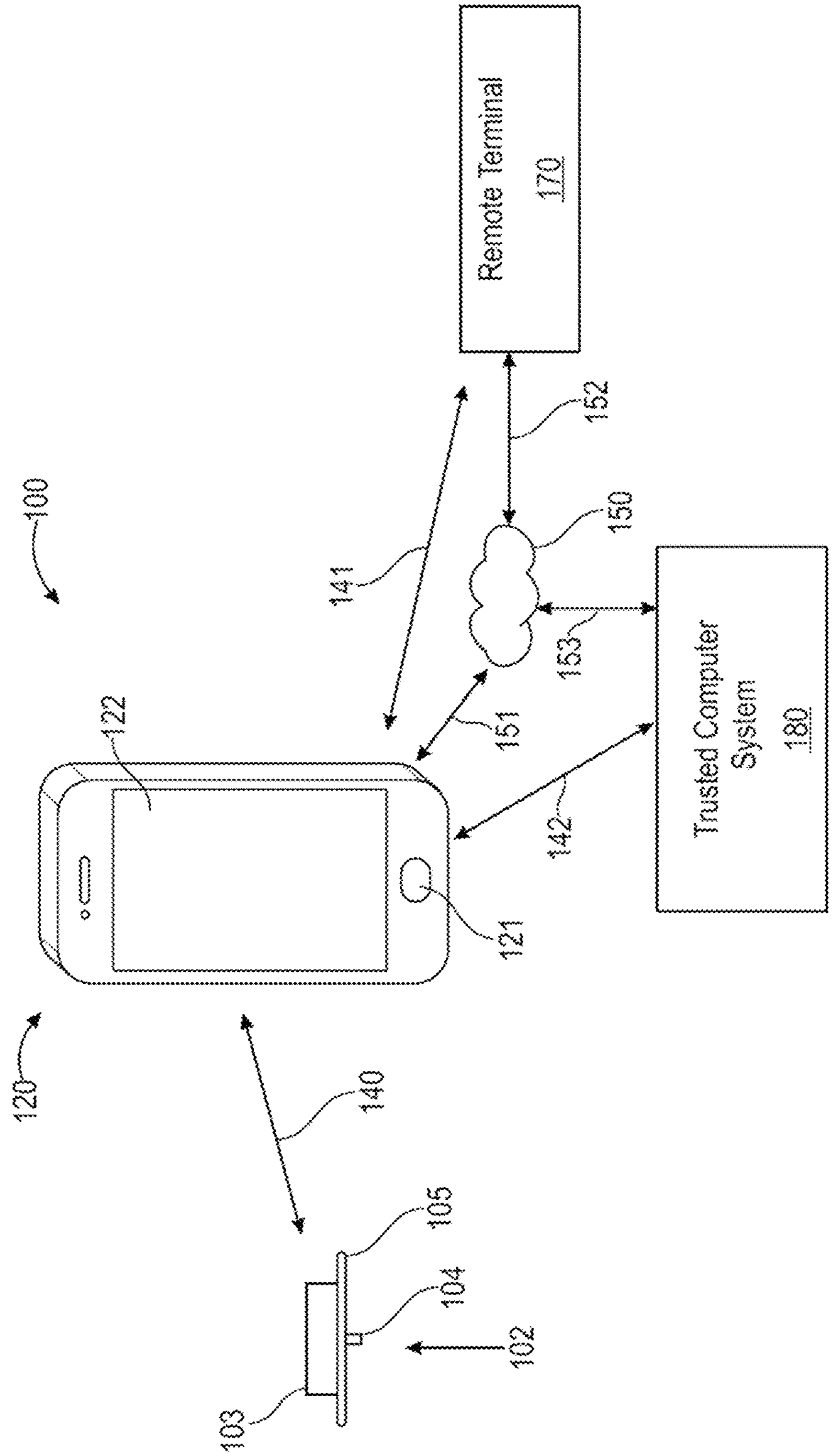
FIG. 1 shows a diagram of an illustrative sensing system that can incorporate an analyte sensor of the present disclosure.

Before describing the analyte sensors of the present disclosure and their components in further detail, a brief overview of suitable in vivo analyte sensor configurations and sensor systems employing the analyte sensors will be provided so that the embodiments of the present disclosure can be better understood. FIG. 1 shows a diagram of an illustrative sensing system that can incorporate an analyte sensor of the present disclosure. As shown, sensing system 100 includes sensor control device 102 and reader device 120 that are configured to communicate with one another over a local communication path or link 140, which can be wired or wireless, uni- or bi-directional, and encrypted or non-encrypted. Reader device 120 can constitute an output medium for viewing analyte concentrations and alerts or notifications determined by sensor 104 or a processor associated therewith, as well as allowing for one or more user inputs, according to certain embodiments. Reader device 120 can be a multi-purpose smartphone or a dedicated electronic reader instrument. While only one reader device 120 is shown, multiple reader devices 120 can be present in certain instances. Reader device 120 can also be in communication with remote terminal 170 and/or trusted computer system 180 via communication path(s)/link(s) 141 and/or 142, respectively, which also can be wired or wireless, uni- or bi-directional, and encrypted or non-encrypted. Reader device 120 can also or alternately be in communication with network 150 (e.g., a mobile telephone network, the internet, or a cloud server) via communication path/link 151. Network 150 can be further communicatively coupled to remote terminal 170 via communication path/link 152 and/or trusted computer system 180 via communication path/link 153. Alternately, sensor 104 can communicate directly with remote terminal 170 and/or trusted computer system 180 without an intervening reader device 120 being present. For example, but not by the way of limitation, sensor 104 can communicate with remote terminal 170 and/or trusted computer system 180 through a direct communication link to network 150, according to certain embodiments, as described in U.S. Patent Application Publication 2011/0213225 and incorporated herein by reference in its entirety. Any suitable electronic communication protocol can be used for each of the communication paths or links, such as near field communication (NFC), radio frequency identification (RFID), BLUETOOTH® or BLUETOOTH® Low Energy protocols, WiFi, or the like. Remote terminal 170 and/or trusted computer system 180 can be accessible, according to certain embodiments, by individuals other than a primary user who have an interest in the user's analyte levels. Reader device 120 can include display 122 and optional input component 121. Display 122 can include a touch-screen interface, according to certain embodiments.

Sensor control device 102 includes sensor housing 103, which can house circuitry and a power source for operating sensor 104. Optionally, the power source and/or active circuitry can be omitted. A processor (not shown) can be communicatively coupled to sensor 104, with the processor being physically located within sensor housing 103 or reader device 120. Sensor 104 protrudes from the underside of sensor housing 103 and extends through adhesive layer 105, which is adapted for adhering sensor housing 103 to a tissue surface, such as skin, according to certain embodiments.

Sensor 104 is adapted to be at least partially inserted into a tissue of interest, such as within the dermal or subcutaneous layer of the skin. Sensor 104 can include a sensor tail of sufficient length for insertion to a desired depth in a given tissue. The sensor tail can include at least one working electrode. In certain configurations, the sensor tail can include a sensing layer for detecting an analyte. A counter electrode can be present in combination with the at least one working electrode. Particular electrode configurations upon the sensor tail are described in more detail below.

The sensing layer can be configured for detecting a particular analyte. For example, but not by way of limitation, the disclosed analyte sensors include at least one sensing layer configured to detect an analyte (e.g., glucose, ketone). In certain embodiments, a sensor of the present disclosure includes two sensing layers (e.g., two active areas), where each sensing layer is configured to detect a different analyte. Alternatively, the two sensing layers can be configured to detect the same analyte. In certain embodiments, a first sensing layer can be configured to detect an analyte (e.g., glucose) and a second sensing layer can be configured to detect the first (i.e., same) analyte or a second analyte different from the first analyte (e.g., ketone, creatinine).

A mass transport limiting membrane can overcoat the active area, as also described in further detail below. The active area can be configured for detecting a particular analyte, such as e.g., glucose, glutamate, creatinine, sarcosine, ascorbate and a combination thereof. For example, but not by the way of limitation, a glucose-responsive active area can include a glucose-responsive enzyme, a glutamate-responsive active area can include a glutamate-responsive enzyme, a creatine-responsive active area can include a creatine-responsive enzyme system, a sarcosine-responsive active area can include a sarcosine-responsive enzyme system, and an ascorbate-responsive active area can include an ascorbate-responsive enzyme system. In certain embodiments, an ascorbate-responsive active area does not include an enzyme system.

In certain embodiments of the present disclosure, one or more analytes can be monitored in any biological fluid of interest such as dermal fluid, interstitial fluid, plasma, blood, lymph, synovial fluid, cerebrospinal fluid, saliva, bronchoalveolar lavage, amniotic fluid, or the like. In certain particular embodiments, analyte sensors of the present disclosure can be adapted for assaying dermal fluid or interstitial fluid to determine a concentration of one or more analytes in vivo. In certain embodiments, the biological fluid is interstitial fluid.

Referring still to FIG. 1, sensor 104 can automatically forward data to reader device 120. For example but not by the way of limitation, analyte concentration data (i.e., glucose concentration) can be communicated automatically and periodically, such as at a certain frequency as data is obtained or after a certain time period has passed, with the data being stored in a memory until transmittal (e.g., every minute, five minutes, or other predetermined time period). In certain other embodiments, sensor 104 can communicate with reader device 120 in a non-automatic manner and not according to a set schedule. For example, but not by the way of limitation, data can be communicated from sensor 104 using RFID technology when the sensor electronics are brought into communication range of reader device 120. Until communicated to reader device 120, data can remain stored in a memory of sensor 104. Thus, a user does not have to maintain close proximity to reader device 120 at all times, and can instead upload data at a convenient time. In certain other embodiments, a combination of automatic and non-automatic data transfer can be implemented. For example, and not by the way of limitation, data transfer can continue on an automatic basis until reader device 120 is no longer in communication range of sensor 104.

An introducer can be present transiently to promote introduction of sensor 104 into a tissue. In certain illustrative embodiments, the introducer can include a needle or similar sharp. As would be readily recognized by a person skilled in the art, other types of introducers, such as sheaths or blades, can be present in alternative embodiments. More specifically, the needle or other introducer can transiently reside in proximity to sensor 104 prior to tissue insertion and then be withdrawn afterward. While present, the needle or other introducer can facilitate insertion of sensor 104 into a tissue by opening an access pathway for sensor 104 to follow. For example, and not by the way of limitation, the needle can facilitate penetration of the epidermis as an access pathway to the dermis to allow implantation of sensor 104 to take place, according to one or more embodiments. After opening the access pathway, the needle or other introducer can be withdrawn so that it does not represent a sharps hazard. In certain embodiments, suitable needles can be solid or hollow, beveled or non-beveled, and/or circular or non-circular in cross-section. In more particular embodiments, suitable needles can be comparable in cross-sectional diameter and/or tip design to an acupuncture needle, which can have a cross-sectional diameter of about 250 microns. However, suitable needles can have a larger or smaller cross-sectional diameter if needed for certain particular applications.

In certain embodiments, a tip of the needle (while present) can be angled over the terminus of sensor 104, such that the needle penetrates a tissue first and opens an access pathway for sensor 104. In certain embodiments, sensor 104 can reside within a lumen or groove of the needle, with the needle similarly opening an access pathway for sensor 104. In either case, the needle is subsequently withdrawn after facilitating sensor insertion.

Figure 2A:
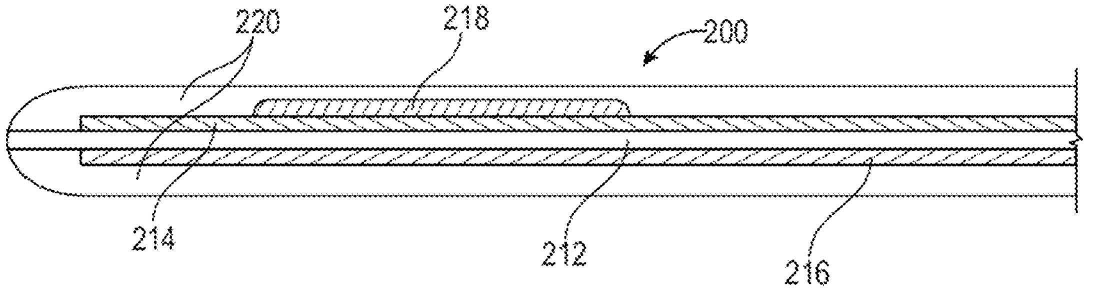
FIGS. 2A-2C show cross-sectional diagrams of analyte sensors including a single sensing layer.
Figure 2B:
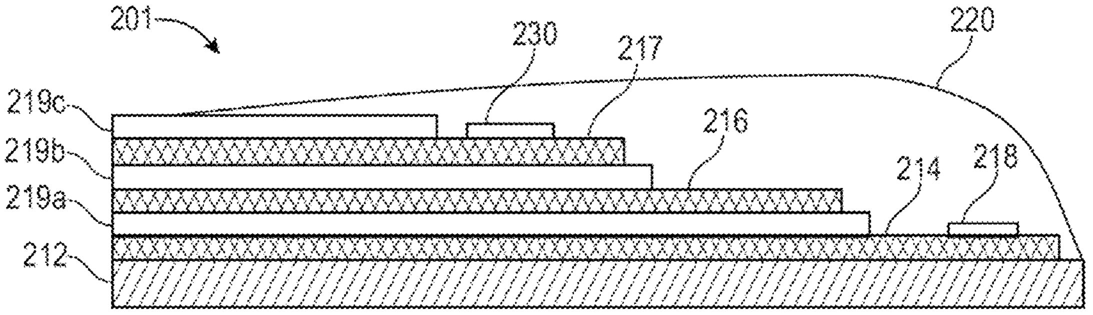
Figure 2C:
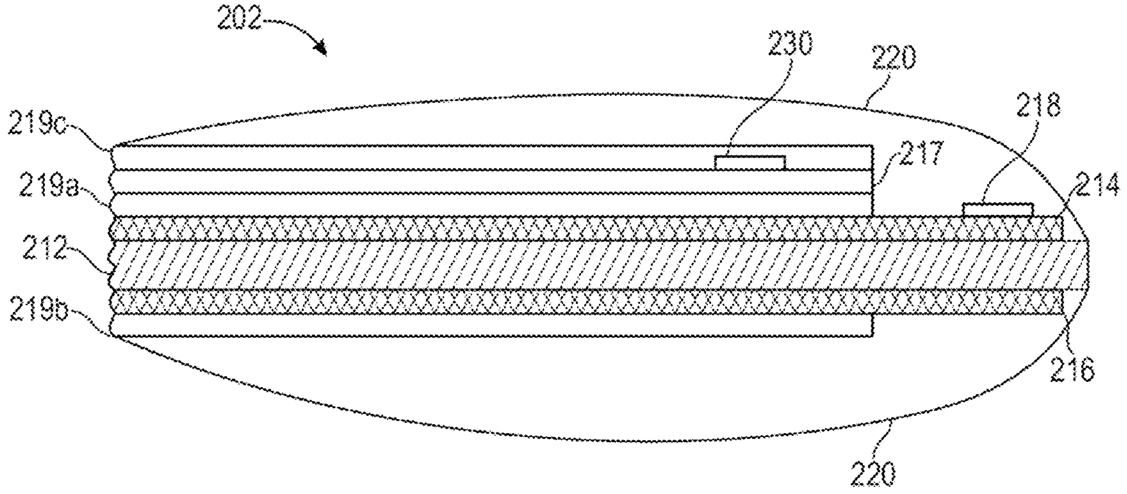

Sensor configurations featuring a single sensing layer (e.g., a single active area) that is configured for the detection of a corresponding single analyte can employ two-electrode or three-electrode detection motifs, as described further herein in reference to FIGS. 2A-2C. Sensor configurations featuring two different sensing layers for detection of separate analytes, either upon separate working electrodes or upon the same working electrode, are described separately thereafter in reference to FIGS. 3A-5C. Sensor configurations having multiple working electrodes can be particularly advantageous for incorporating two different sensing layers within the same sensor tail, since the signal contribution from each sensing layer can be determined more readily.

When a single working electrode is present in an analyte sensor, three-electrode sensor configurations can include a working electrode, a counter electrode, and a reference electrode. Related two-electrode sensor configurations can include a working electrode and a second electrode, in which the second electrode can function as both a counter electrode and a reference electrode (i.e., a counter/reference electrode). The various electrodes can be at least partially stacked (layered) upon one another and/or laterally spaced apart from one another upon the sensor tail. Suitable sensor configurations can be substantially flat in shape, substantially cylindrical in shape or any other suitable shape. In any of the sensor configurations disclosed herein, the various electrodes can be electrically isolated from one another by a dielectric material or similar insulator.

Analyte sensors featuring multiple working electrodes can similarly include at least one additional electrode. When one additional electrode is present, the one additional electrode can function as a counter/reference electrode for each of the multiple working electrodes. When two additional electrodes are present, one of the additional electrodes can function as a counter electrode for each of the multiple working electrodes and the other of the additional electrodes can function as a reference electrode for each of the multiple working electrodes.

FIG. 2A shows a diagram of an illustrative two-electrode analyte sensor configuration, which is compatible for use in the disclosure herein. As shown, analyte sensor 200 includes substrate 212 disposed between working electrode 214 and counter/reference electrode 216. Alternately, working electrode 214 and counter/reference electrode 216 can be located upon the same side of substrate 212 with a dielectric material interposed in between (configuration not shown). Sensing layer 218 is disposed as at least one layer upon at least a portion of working electrode 214. Sensing layer 218 can include multiple spots or a single spot configured for detection of an analyte, as discussed further herein.

Referring still to FIG. 2A, membrane 220 overcoats at least sensing layer 218. In certain embodiments, membrane 220 can also overcoat some or all of working electrode 214 and/or counter/reference electrode 216, or the entirety of analyte sensor 200. One or both faces of analyte sensor 200 can be overcoated with membrane 220. Membrane 220 can include one or more polymeric membrane materials having capabilities of limiting analyte flux to sensing layer 218 (i.e., membrane 220 is a mass transport limiting membrane having some permeability for the analyte of interest). In some embodiments, and further described below, membrane 220 is not crosslinked. Analyte sensor 200 can be operable for assaying an analyte by any of coulometric, amperometric, voltammetric, or potentiometric electrochemical detection techniques.

FIGS. 2B and 2C show diagrams of illustrative three-electrode analyte sensor configurations, which are also compatible for use in the disclosure herein. Three-electrode analyte sensor configurations can be similar to that shown for analyte sensor 200 in FIG. 2A, except for the inclusion of additional electrode 217 in analyte sensors 201 and 202 (FIGS. 2B and 2C). With additional electrode 217, counter/reference electrode 216 can then function as either a counter electrode or a reference electrode, and additional electrode 217 fulfills the other electrode function not otherwise accounted for. Working electrode 214 continues to fulfill its original function. Additional electrode 217 can be disposed upon either working electrode 214 or electrode 216, with a separating layer of dielectric material in between. For example, and not by the way of limitation, as depicted in FIG. 2B, dielectric layers 219*a*, 219*b* and 219*c* separate electrodes 214, 216 and 217 from one another and provide electrical isolation. Alternatively, at least one of electrodes 214, 216 and 217 can be located upon opposite faces of substrate 212, as shown in FIG. 2C. Thus, in certain embodiments, electrode 214 (working electrode) and electrode 216 (counter electrode) can be located upon opposite faces of substrate 212, with electrode 217 (reference electrode) being located upon one of electrodes 214 or 216 and spaced apart therefrom with a dielectric material. Reference material layer 230 (e.g., Ag/AgCl) can be present upon electrode 217, with the location of reference material layer 230 not being limited to that depicted in FIGS. 2B and 2C. As with sensor 200 shown in FIG. 2A, sensing layer 218 in analyte sensors 201 and 202 can include multiple spots or a single spot. Additionally, analyte sensors 201 and 202 can be operable for assaying an analyte by any of coulometric, amperometric, voltammetric, or potentiometric electrochemical detection techniques.

Like analyte sensor 200, membrane 220 can also overcoat sensing layer 218, as well as other sensor components, in analyte sensors 201 and 202, thereby serving as a mass transport limiting membrane. In certain embodiments, the additional electrode 217 can be overcoated with membrane 220. Although FIGS. 2B and 2C have depicted electrodes 214, 216, and 217 as being overcoated with membrane 220, it is to be recognized that in certain embodiments only working electrode 214 is overcoated. Moreover, the thickness of membrane 220 at each of electrodes 214, 216, and 217 can be the same or different. As in two-electrode analyte sensor configurations (FIG. 2A), one or both faces of analyte sensors 201 and 202 can be overcoated with membrane 220 in the sensor configurations of FIGS. 2B and 2C, or the entirety of analyte sensors 201 and 202 can be overcoated. Accordingly, the three-electrode sensor configurations shown in FIGS. 2B and 2C should be understood as being non-limiting of the embodiments disclosed herein, with alternative electrode and/or layer configurations remaining within the scope of the present disclosure.

Figure 3A:
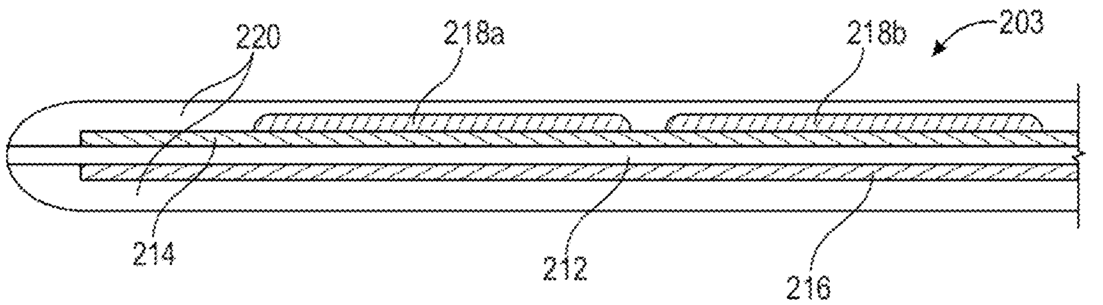
FIGS. 3A-3C show cross-sectional diagrams of analyte sensors including two sensing layers.

FIG. 3A shows an illustrative configuration for sensor 203 having a single working electrode with two different sensing layers disposed thereon. FIG. 3A is similar to FIG. 2A, except for the presence of two sensing layers (e.g., two active areas) upon working electrode 214: first sensing layer **218*a* and second sensing layer 218*b*, which are responsive to different analytes and are laterally spaced apart from one another upon the surface of working electrode 214. Sensing layers 218*a* and 218*b* can include multiple spots or a single spot configured for detection of each analyte. The composition of membrane 220 can vary or be compositionally the same at sensing layers 218*a* and 218*b*. First sensing layer 218*a* and second sensing layer 218*b*** can be configured to detect their corresponding analytes at working electrode potentials that differ from one another, as discussed further below.

Figure 3B:
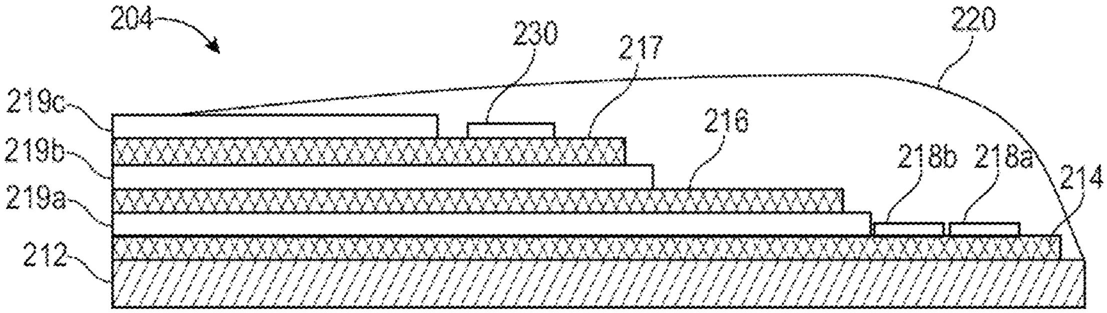
Figure 3C:
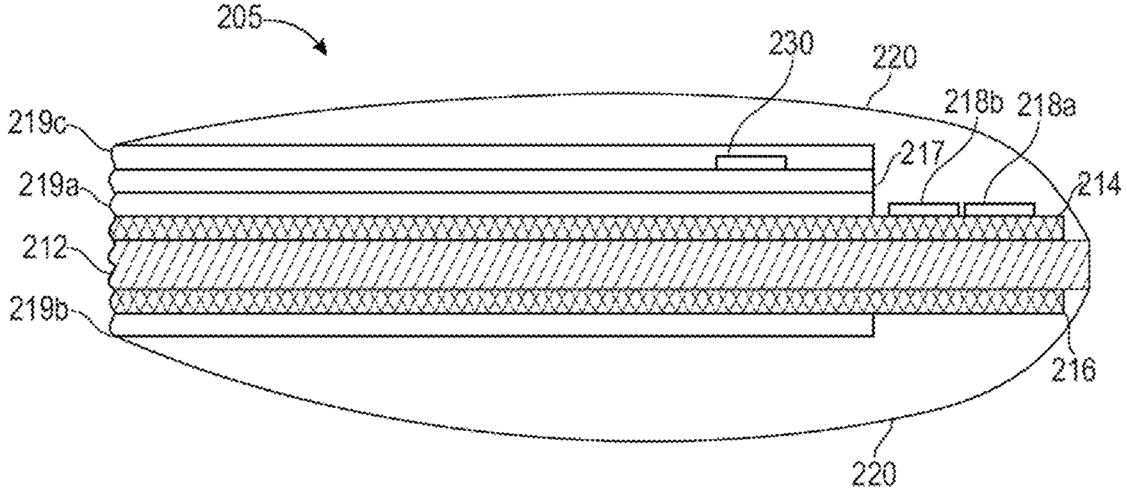

FIGS. 3B and 3C show cross-sectional diagrams of illustrative three-electrode sensor configurations for sensors 204 and 205, respectively, each featuring a single working electrode having first sensing layer **218*a* and second sensing layer 218*b* disposed thereon. FIGS. 3B and 3C are otherwise similar to FIGS. 2B and 2C and can be better understood by reference thereto. As with FIG. 3A, the composition of membrane 220 can vary or be compositionally the same at sensing layers 218*a* and 218*b***.

Figure 4:
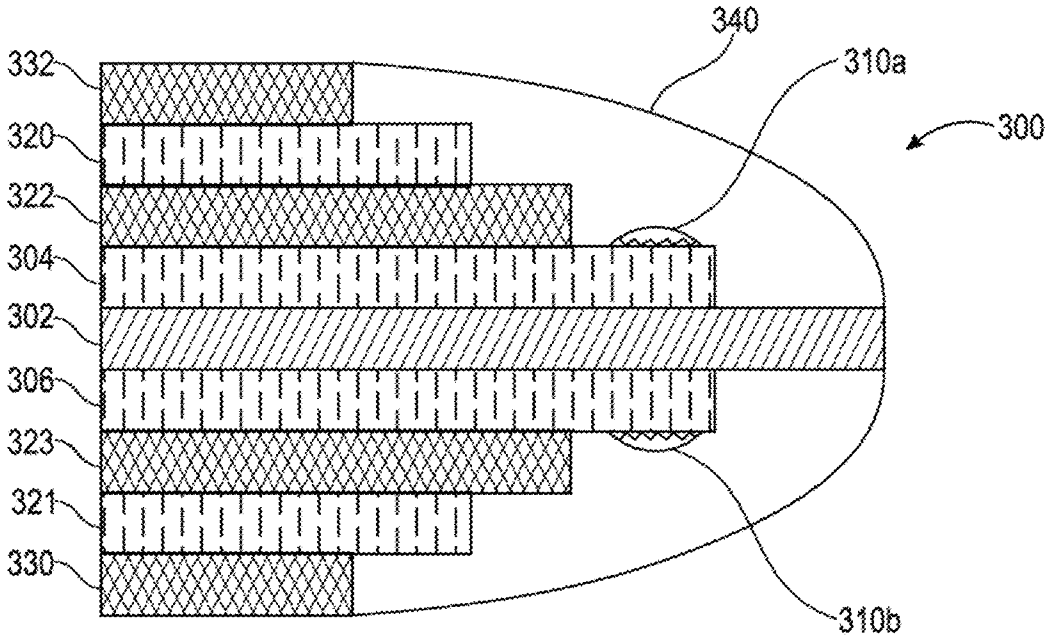
FIG. 4 shows a cross-sectional diagram of an analyte sensor including two sensing layers.
Figure 5A:
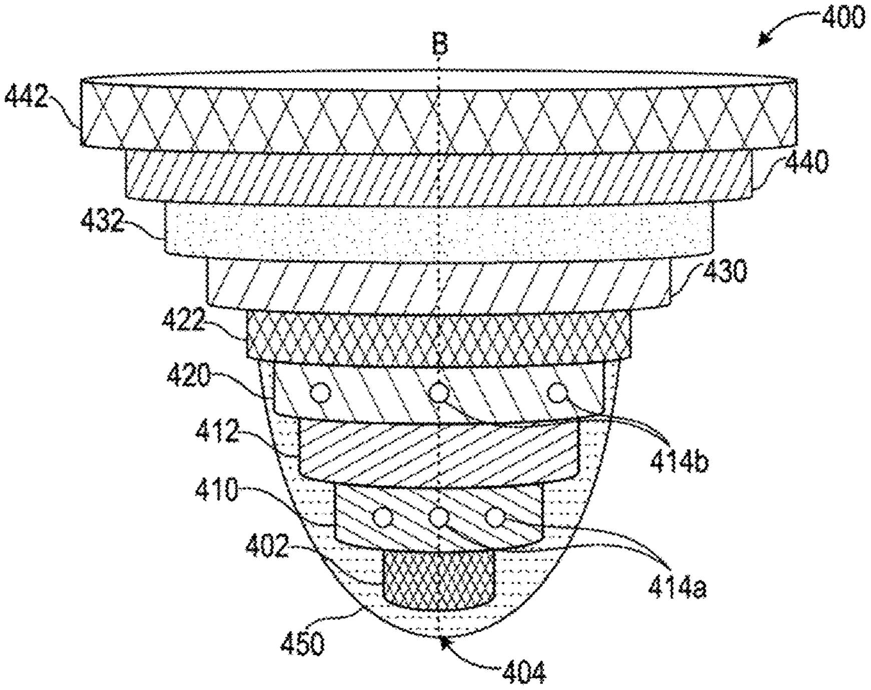
FIGS. 5A-5C show perspective views of analyte sensors including two sensing layers upon separate working electrodes.
Figure 5B:
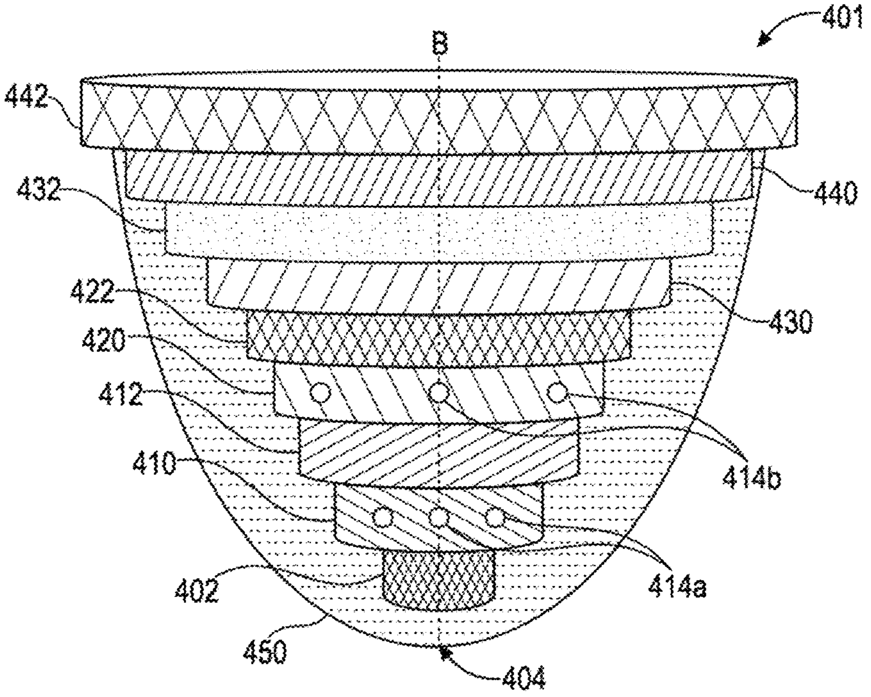
Figure 5C:
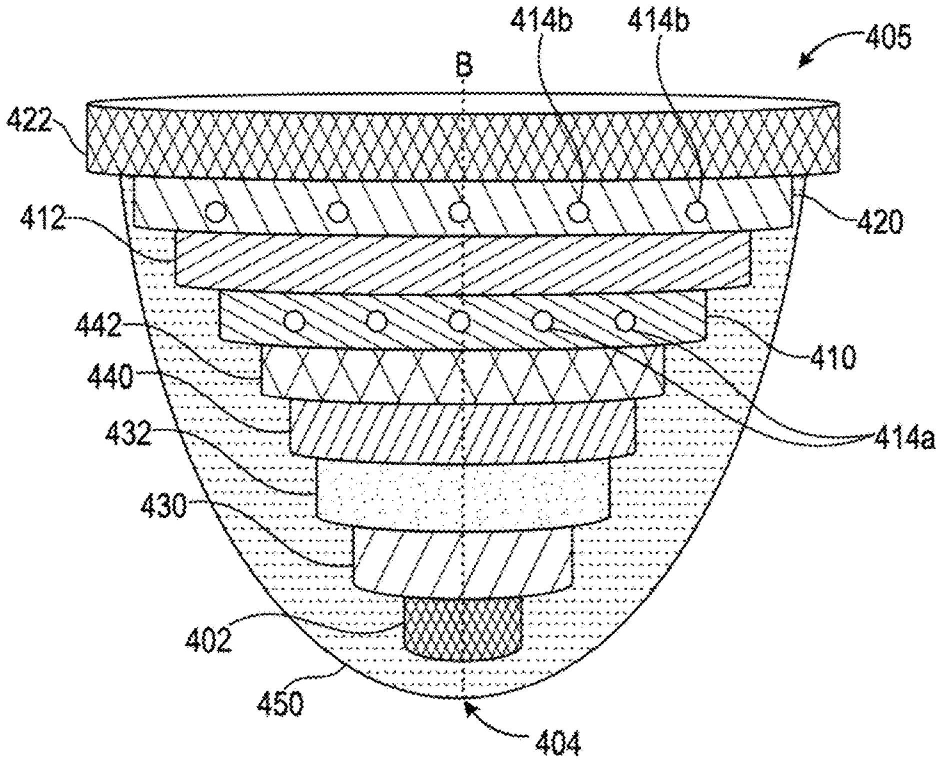
Figure 6:
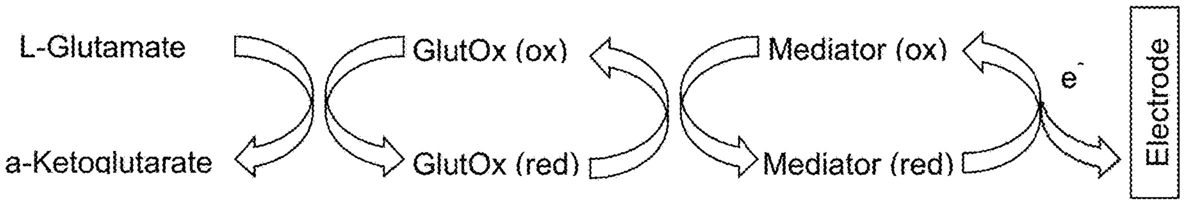
FIG. 6 shows a diagram of a particular enzyme system that can be used for detecting glutamate according to the present disclosure.

Illustrative sensor configurations having multiple working electrodes, specifically two working electrodes, are described in further detail in reference to FIGS. 4-5C. Although the following description is primarily directed to sensor configurations having two working electrodes, it is to be appreciated that more than two working electrodes can be incorporated through extension of the disclosure herein. Additional working electrodes can be used to impart additional sensing capabilities to the analyte sensors beyond just a first analyte and a second analyte, e.g., for the detection of a third and/or fourth analyte.

FIG. 4 shows a cross-sectional diagram of an illustrative analyte sensor configuration having two working electrodes, a reference electrode and a counter electrode, which is compatible for use in the disclosure herein. As shown, analyte sensor 300 includes working electrodes 304 and 306 disposed upon opposite faces of substrate 302. First sensing layer **310*a* is disposed upon the surface of working electrode 304, and second sensing layer 310*b* is disposed upon the surface of working electrode 306. Counter electrode 320 is electrically isolated from working electrode 304 by dielectric layer 322, and reference electrode 321 is electrically isolated from working electrode 306 by dielectric layer 323. Outer dielectric layers 330 and 332 are positioned upon reference electrode 321 and counter electrode 320, respectively. Membrane 340 can overcoat at least sensing layers 310*a* and 310*b*, according to various embodiments, with other components of analyte sensor 300 or the entirety of analyte sensor 300 optionally being overcoated with membrane 340. In certain embodiments, membrane 340** comprises, consists essentially of, or consists of a polyurethane (i.e., a homopolymer, copolymer, or blend) of the present disclosure.

Membrane 340 can be continuous but vary compositionally upon active area **310*a* and/or upon active area 310*b* in order to afford different permeability values for differentially regulating the analyte flux at each location. For example, different membrane formulations can be sprayed and/or printed onto the opposing faces of analyte sensor 300. Dip coating techniques can also be appropriate, particularly for depositing at least a portion of a bilayer membrane upon one of active areas 310*a* and 310*b*. In certain embodiments, membrane 340 can be the same or vary compositionally at active areas 310*a* and 310*b*. For example, but not by way of limitation, membrane 340 can include a bilayer overcoating active areas 310*a* and be a homogeneous membrane overcoating active areas 310*b*, or membrane 340 can include a bilayer overcoating active areas 310*b* and be a homogeneous membrane overcoating active areas 310*a*. In certain embodiments, an analyte sensor can include more than one membrane 340, e.g., two or more membranes. For example, but not by way of limitation, an analyte sensor can include a membrane that overcoats the one or more active areas, e.g., 310*a* and 310*b*, and an additional membrane that overcoats the entire sensor as shown in FIG. 4**.

Like analyte sensors 200, 201, and 202, analyte sensor 300 can be operable for assaying an analyte by any of coulometric, amperometric, voltammetric, or potentiometric electrochemical detection techniques.

Alternative sensor configurations having multiple working electrodes and differing from the configuration shown in FIG. 4 can feature a counter/reference electrode instead of separate counter and reference electrodes 320, 321, and/or feature layer and/or membrane arrangements varying from those expressly depicted. For example, and not by the way of limitation the positioning of counter electrode 320 and reference electrode 321 can be reversed from that depicted in FIG. 4. In addition, working electrodes 304 and 306 need not necessarily reside upon opposing faces of substrate 302 in the manner shown in FIG. 4.

Although suitable sensor configurations can feature electrodes that are substantially planar in character, it is to be appreciated that sensor configurations featuring non-planar electrodes can be advantageous and particularly suitable for use in the disclosure herein. In particular, substantially cylindrical electrodes that are disposed concentrically with respect to one another can facilitate deposition of a mass transport limiting membrane, as described hereinbelow. FIGS. 5A-5C show perspective views of analyte sensors featuring two working electrodes that are disposed concentrically with respect to one another. It is to be appreciated that sensor configurations having a concentric electrode disposition but lacking a second working electrode are also possible in the present disclosure.

FIG. 5A shows a perspective view of an illustrative sensor configuration in which multiple electrodes are substantially cylindrical and are disposed concentrically with respect to one another about a central substrate. As shown, analyte sensor 400 includes central substrate 402 about which all electrodes and dielectric layers are disposed concentrically with respect to one another. In particular, working electrode 410 is disposed upon the surface of central substrate 402, and dielectric layer 412 is disposed upon a portion of working electrode 410 distal to sensor tip 404. Working electrode 420 is disposed upon dielectric layer 412, and dielectric layer 422 is disposed upon a portion of working electrode 420 distal to sensor tip 404. Counter electrode 430 is disposed upon dielectric layer 422, and dielectric layer 432 is disposed upon a portion of counter electrode 430 distal to sensor tip 404. Reference electrode 440 is disposed upon dielectric layer 432, and dielectric layer 442 is disposed upon a portion of reference electrode 440 distal to sensor tip 404. As such, exposed surfaces of working electrode 410, working electrode 420, counter electrode 430, and reference electrode 440 are spaced apart from one another along longitudinal axis B of analyte sensor 400.

Referring still to FIG. 5A, first sensing layers 414*a* and second sensing layers 414*b*, which are responsive to different analytes or the same analyte, are disposed upon the exposed surfaces of working electrodes 410 and 420, respectively, thereby allowing contact with a fluid to take place for sensing. Although sensing layers 414*a* and 414*b* have been depicted as three discrete spots in FIG. 5A, it is to be appreciated that fewer or greater than three spots, including a continuous layer of sensing layer, can be present in alternative sensor configurations.

In FIG. 5A, sensor 400 is partially coated with membrane 450 upon working electrodes 410 and 420 and sensing layers 414*a* and 414*b* disposed thereon. FIG. 5B shows an alternative sensor configuration in which the substantial entirety of sensor 401 is overcoated with membrane 450. Membrane 450 can be the same or vary compositionally at sensing layers 414*a* and 414*b*.

It is to be further appreciated that the positioning of the various electrodes in FIGS. 5A and 5B can differ from that expressly depicted. For example, the positions of counter electrode 430 and reference electrode 440 can be reversed from the depicted configurations in FIGS. 5A and 5B. Similarly, the positions of working electrodes 410 and 420 are not limited to those that are expressly depicted in FIGS. 5A and 5B. FIG. 5C shows an alternative sensor configuration to that shown in FIG. 5B, in which sensor 405 contains counter electrode 430 and reference electrode 440 that are located more proximal to sensor tip 404 and working electrodes 410 and 420 that are located more distal to sensor tip 404. Sensor configurations in which working electrodes 410 and 420 are located more distal to sensor tip 404 can be advantageous by providing a larger surface area for deposition of sensing layers 414*a* and 414*b* (five discrete sensing spots illustratively shown in FIG. 5C), thereby facilitating an increased signal strength in some cases. Similarly, central substrate 402 can be omitted in any concentric sensor configuration disclosed herein, wherein the innermost electrode can instead support subsequently deposited layers.

Additional non-limiting examples of the configuration of one or more active areas (e.g., two or more active areas), one or more electrodes (e.g., two or more electrodes) and one or more mass transport limiting membranes (e.g., two or more mass transport limiting membranes) are disclosed in U.S. Patent Publication No. 2021/0219885 (e.g., FIGS. 5A-7B and paragraphs [0067]-[0079]), the contents of which are incorporated by reference herein in their entirety.

In certain embodiments, the working electrode and counter electrode of the sensor as well as dielectric material are layered. For example, the sensor can include a non-conductive material layer, and a first conductive layer such as conductive polymer, carbon, platinum, gold, etc., disposed on at least a portion of the non-conductive material layer (as described above). The active area is positioned on one or more surfaces of the working electrode, or can otherwise be directly or indirectly contacted to the working electrode. A first insulation layer, such as a first dielectric layer can disposed or layered on at least a portion of a first conductive layer and a second conductive layer can be positioned or stacked on top of at least a portion of a first insulation layer (or dielectric layer). The second conductive layer can be a reference electrode. A second insulation layer, such as a second dielectric layer can be positioned or layered on at least a portion of the second conductive layer. Further, a third conductive layer can be positioned on at least a portion of the second insulation layer and can be a counter electrode. Finally, a third insulation layer can be disposed or layered on at least a portion of the third conductive layer. In this manner, the sensor can be layered such that at least a portion of each of the conductive layers is separated by a respective insulation layer (for example, a dielectric layer).

In certain embodiments, some or all of the electrodes can be provided in a co-planar manner such that two or more electrodes can be positioned on the same plane (e.g., side-by-side (e.g., parallel) or angled relative to each other) on the material. For example, co-planar electrodes can include a suitable spacing there between and/or include a dielectric material or insulation material disposed between the conductive layers/electrodes. Furthermore, in certain embodiments one or more of the electrodes can be disposed on opposing sides of the nonconductive material. In certain embodiments, electrical contact can be on the same or different sides of the non-conductive material. For example, an electrode can be on a first side and its respective contact can be on a second side, e.g., a trace connecting the electrode and the contact can traverse through the material.

In certain embodiments, one or more electrodes of an analyte sensor described herein can be a wire electrode, e.g., a permeable wire electrode. In certain embodiments, the sensor tail comprises a working electrode and a reference electrode helically wound around the working electrode. In certain embodiments, an insulator is disposed between the working and reference electrodes. In certain embodiments, portions of the electrodes are exposed to allow reaction of the one or more enzymes with an analyte on the electrode. In certain embodiments, each electrode is formed from a fine wire with a diameter from about 0.001 inches to about 0.010 inches. In certain embodiments, the working electrode can have a diameter from about 0.002 inches to about 0.008 inches or from about 0.004 inches to about 0.005 inches. In certain embodiments, an electrode is formed from a plated insulator, a plated wire or a bulk electrically conductive material. In certain embodiments, the working electrode comprises a wire formed from a conductive material, such as platinum, platinum-iridium, palladium, graphite, gold, carbon or conductive polymer or alloys. In certain embodiments, the conductive material is a permeable conductive material. In certain embodiments, the wire electrodes can be formed by a variety of manufacturing techniques (e.g., bulk metal processing or deposition of metal onto a substrate). In certain embodiments, the wire electrodes can be formed from plated wire (e.g., platinum on steel wire) or bulk metal (e.g., platinum wire). In certain embodiments, the wire electrode is formed from tantalum wire, e.g., covered with platinum.

In certain embodiments, the reference electrode, which can function as a reference electrode alone, or as a dual reference and counter electrode, is formed from silver or silver/silver chloride. In certain embodiments, the reference electrode is juxtaposed and/or twisted with or around the working electrode. In certain embodiments, the reference electrode is helically wound around the working electrode. In certain embodiments, the assembly of wires can be coated or adhered together with an insulating material so as to provide an insulating attachment.

In certain embodiments, additional electrodes can be included in the sensor tail. For example, but not by way of limitation, a three-electrode system (a working electrode, a reference electrode and a counter electrode) and/or an additional working electrode (e.g., an electrode for detecting a second analyte). In certain embodiments where the sensor comprises two working electrodes, the two working electrodes can be juxtaposed around which the reference electrode is disposed upon (e.g., helically wound around the two or more working electrodes). In certain embodiments, the two or more working electrodes can extend parallel to each other. In certain embodiments, the reference electrode is coiled around the working electrode and extends towards the distal end (i.e., in vivo end) of the sensor tail. In certain embodiments, the reference electrode extends (e.g., helically) to the exposed region of the working electrode.

In certain embodiments, one or more working electrodes, e.g., wire working electrodes, are helically wound around a reference electrode. In certain embodiments where two or more working electrodes are provided, the working electrodes can be formed in a double-, triple-, quad- or greater helix configuration along the length of the sensor tail (for example, surrounding a reference electrode, insulated rod or other support structure). In certain embodiments, the electrodes, e.g., two or more working electrodes, are coaxially formed. For example, but not by way limitation, the electrodes all share the same central axis.

In certain embodiments, the working electrode comprises a tube with a reference electrode disposed or coiled inside, including an insulator therebetween. Alternatively, the reference electrode can comprise a tube with a working electrode disposed or coiled inside, including an insulator therebetween. In certain embodiments, a polymer (e.g., insulating) rod is provided, wherein the one or more electrodes (e.g., one or more electrode layers) are disposed upon (e.g., by electro-plating). In certain embodiments, a metallic (e.g., steel or tantalum) rod or wire is provided, coated with an insulating material (described herein), onto which the one or more working and reference electrodes are disposed upon. For example, but not by way of limitation, the present disclosure provides a sensor, e.g., a sensor tail, that comprises one or more tantalum wires, where a conductive material is disposed upon a portion of the one or more tantalum wires to function as a working electrode. In certain embodiments, the platinum-clad tantalum wire is covered with an insulating material, where the insulating material is partially covered with a silver/silver chloride composition to function as a reference and/or counter electrode.

In certain embodiments where an insulator is disposed upon the working electrode (e.g., upon the platinum surface of the electrode), a portion of the insulator can be stripped or removed to expose the electroactive surface of the working electrode. For example, but not by way of limitation, a portion of the insulator can be removed by hand, excimer lasing, chemical etching, laser ablation, or grit-blasting. Alternatively, a portion of the electrode can be masked prior to depositing the insulator to maintain an exposed electroactive surface area. In certain embodiments, the portion of the insulator that is stripped and/or removed can be from about 0.1 mm or less to about 2 mm or more in length, e.g., from about 0.5 mm to about 0.75 mm in length. In certain embodiments, the insulator is a non-conductive polymer. In certain embodiments, the insulator comprises parylene, fluorinated polymers, polyethylene terephthalate, polyvinylpyrrolidone, polyurethane, polyimide and other non-conducting polymers. In certain embodiments, glass or ceramic materials can also be used in the insulator layer. In certain embodiments, the insulator comprises parylene. In certain embodiments, the insulator comprises a polyurethane. In certain embodiments, the insulator comprises a polyurethane and polyvinylpyrrolidone.

In an embodiment, the present disclosure is directed to an analyte sensor comprising a working electrode, a sensing layer disposed on at least a portion of the working electrode, and a hydrophilic polyurethane membrane overcoating at least the sensing layer, wherein the hydrophilic polyurethane is aliphatic, aromatic, or both aliphatic and aromatic.

It was unexpectedly discovered that in vivo sensor robustness and performance can be greatly improved by replacing a traditional crosslinked poly(4-vinylpyridine)-based membrane with a hydrophilic polyurethane membrane, which results in a reduction in temperature dependent measurement errors. These reduced errors provide one or more of the following benefits: improved accuracy under normal wear conditions, expanded suitable environments for which sensors can function within defined specifications, and expanding what is defined as normal wear conditions. For example, the analyte sensor can still be usable under conditions in which a user would experience abnormal body temperature and/or extreme environmental temperatures, since the effects of temperature dependence are reduced or substantially eliminated.

Additionally, material and processing costs are reduced with increasing performance in association with use of the polyurethane membranes over that of the traditional combination of poly(4-vinylpyridine)-based membrane, thermistor, and algorithm. In particular, the analyte sensor provides a more efficient sensor production process and final product cost, since costs associated with the thermistor (e.g., buying, installing, calibrating) can be eliminated. The polyurethane membrane itself is much lower in price than the traditional poly(4-vinylpyridine)-based membrane and is applied using a much simpler process (e.g., no cross-linker required, no curing required, and reduced processing time overall). Not having to run an algorithm or the thermistor saves energy, which leads to reduced energy requirements and permits either enhanced run-time using a standard battery or equivalent run-time to a standard battery but with an overall reduction in weight and/or size using a smaller-sized battery.

In the analyte sensor, the working electrode can be any suitable conductive material, such as carbon, gold, palladium, or platinum. The sensing layer senses a desired analyte (e.g., glucose) and can be continuously or discontinuously disposed on at least a portion of the working electrode. A discontinuous application means that the sensing layer forms a discrete shape on the working electrode, such as a spot, a line, or a plurality (i.e., an array) of spots and/or lines. The number of spots or lines is not considered to be particularly limited, but can range from 2 to about 10 (e.g., 2, 3, 4, 5, 6, 7, 8, 9, or 10, including about 3 to about 8, or from about 4 to about 6). In any of the embodiments herein, the sensing layer can be continuous on the working electrode. In other embodiments, the sensing layer can be discontinuous on the working electrode.

In some embodiments, a second sensing layer for an analyte different from the first analyte can be present on the working electrode. In this instance, the first sensing layer and second sensing layer can form an array of multiple spots of each sensing layer, in which some spots sense a first analyte (e.g., glucose) and other spots sense a second analyte different from the first (e.g., ketone, creatinine). Each spot can range in size from about 0.01 to 1 $mm^2$ in diameter.

The total size of the sensing layer or layers (combined area of all spots, layers, or active areas) can be at least about 0.05 $mm^2$ and can be up to about 100 $mm^2$. In some embodiments, the total size can be about 100 $mm^2$ or less, about 75 $mm^2$ or less, about 50 $mm^2$ or less, about 40 $mm^2$ or less, about 30 $mm^2$ or less, about 25 $mm^2$ or less, about 15 $mm^2$ or less, about 10 $mm^2$ or less, about 5 $mm^2$ or less, about 1 $mm^2$ or less, or about 0.1 $mm^2$ or less. In a particular embodiment, the total size of the sensing layer or layers ranges from about 0.05 to about 0.1 $mm^2$, about 0.05 to about 100 $mm^2$, about 0.1 to about 50 $mm^2$, about 0.5 to about 30 $mm^2$, about 1 to about 20 $mm^2$, or about 1 to about 15 $mm^2$.

The sensing layer or layers typically have a thickness that ranges from about 0.1-10 μm. For example, each sensing layer can be 0.1 μm thick or more (e.g., 0.2 μm or more, 0.3 μm or more, 0.5 μm or more, 0.8 μm or more, 1 μm or more, 2 μm or more, 3 μm or more, 5 μm or more, or 8 μm or more) and typically will have a thickness of 10 μm or less (e.g., 8 μm or less, 5 μm or less, 3 μm or less, 2 μm or less, 1 μm or less, 0.8 μm or less, 0.5 μm or less, 0.3 μm or less, or 0.2 μm or less). In an example, each sensing layer present can have a thickness of about 0.1 to about 10 μm, about 0.2 to about 8 μm, about 0.5 to about 5 μm, about 1 to about 4 μm, or about 2 μm.

In some embodiments, a conductive material such as, for example, carbon nanotubes, graphene, or metal nanoparticles, can be combined within the sensing layer or layers to promote rapid attainment of a steady state current. Conductive material can be included in a range from about 0.1% to about 50% by weight (pbw) of the sensing layer (e.g., about 1 to about 50 pbw, about 1 to about 10 pbw, or about 0.1 to about 10 pbw).

Hydrophilic Polyurethane Membrane

In the analyte sensor, a hydrophilic polyurethane membrane formed from a hydrophilic polyurethane that can be aliphatic, aromatic, or both aliphatic and aromatic overcoats at least the sensing layer(s) disposed on the working electrode(s).

Typically, the overcoating can form an outer membrane that provides stability to the sensing reagents (e.g., the analyte-specific enzyme and redox mediator), mass-transport limitations, biocompatibility, and/or prevents electrode fouling. The hydrophilic polyurethane membrane can optionally coat all or part of the working electrode and optionally any counter or reference electrode that can be present. In an embodiment, the hydrophilic polyurethane membrane can coat (e.g., encapsulates) the entire analyte sensor, including the working electrode(s) with the sensing layer(s), and any counter electrodes, reference electrodes, and/or substrates that can be present. In an embodiment, the hydrophilic polyurethane membrane can coat (e.g., encapsulate) the sensor tail.

In some embodiments, the hydrophilic polyurethane can comprise an aliphatic hydrophilic polyurethane comprising a reaction product of an aliphatic organic diisocyanate and a diol. The aliphatic organic diisocyanate can be any suitable aliphatic compound comprising two isocyanate groups (—O═C═N). Typically, the two isocyanate groups can be on the terminal ends of the aliphatic compound. The aliphatic compound can be cyclic or acyclic, linear or branched, and typically will have 2 to 14 carbons (e.g., 2 to 12, 2 to 10, 2 to 9, 2 to 8, 2 to 7, or 2 to 6 carbons), not including the diisocyanate groups.

In some embodiments, the aliphatic compound can include one or more substituents other than the two diisocyanate groups. A substituted aliphatic compound typically comprises at least one substituent (e.g., 1, 2, 3, 4, 5, 6, etc.) in any suitable position (e.g., 1-, 2-, 3-, 4-, 5-, or 6-position, etc.). Suitable substituents include, e.g., halo, $C_{1-6}$ alkyl, $C_{1-6}$ haloalkyl, $C_{2-6}$ alkenyl, $C_{2-6}$ alkynyl, hydroxy, nitro, cyano, amino, mono- or di-$C_{1-6}$ alkylamino, $C_{1-6}$ alkoxy, $C_{6-10}$ aryloxy, aralkoxy, carboxy, $C_{1-6}$ alkylcarboxy, amido, $C_{1-6}$ alkylamido, $C_{1-6}$ haloalkylamido, $C_{6-10}$ aryl, heteroaryl, and heterocycloalkyl. In some embodiments, the substituent can be 1 or 2 moieties selected from $C_{1-4}$ alkyl (e.g., methyl), halo, and/or haloalkyl.

In some embodiments, the aliphatic organic diisocyanate can be selected from the group consisting of isophorone diisocyanate (IPDI), 1,4-cyclohexyl diisocyanate (CHDI), decane-1,10-diisocyanate, lysine diisocyanate (LDI), 1,4-butane diisocyanate (BDI), 1,5-pentanediisocyanate (PDI), hydrogenated xylene diisocyanate (HXDI), 2,2,4-trimethylhexamethylene diisocyanate (TMDI), hexamethylene diisocyanate (HDI), dicyclohexylmethane-4,4'-diisocyanate ($H_{12}$MDI), 1,3-bis(isocyanatemethyl)cyclohexane (BIMC), biuret, and combinations thereof.

In some embodiments, the hydrophilic polyurethane can comprise an aromatic hydrophilic polyurethane comprising a reaction product of an aromatic organic diisocyanate and a diol. The aromatic organic diisocyanate can be any suitable aromatic compound comprising two isocyanate groups (—O═C═N). The aromatic compound can be any mono-, bi-, or tricyclic carbocyclic ring system having one, two, or three aromatic rings, for example, phenyl, naphthyl, anthracenyl, or biphenyl. In some embodiments, the aromatic compound can contain from, for example, 6 to 30 carbon atoms, from 6 to 18 carbon atoms, from 6 to 14 carbon atoms, from 6 to 12 carbon atoms, or from 6 to 10 carbon atoms, not including the diisocyanate groups.

In some embodiments, the aromatic compound can include one or more substituents other than the two diisocyanate groups. A substituted aromatic compound can typically comprise at least one substituent (e.g., 1, 2, 3, 4, 5, 6, etc.) in any suitable position (e.g., 1-, 2-, 3-, 4-, 5-, or 6-position, etc.). Suitable substituents include, e.g., halo, $C_{1-6}$ alkyl, $C_{1-6}$ haloalkyl, $C_{2-6}$ alkenyl, $C_{2-6}$ alkynyl, hydroxy, nitro, cyano, amino, mono- or di-$C_{1-6}$ alkylamino, $C_{1-6}$ alkoxy, $C_{6-10}$ aryloxy, aralkoxy, carboxy, $C_{1-6}$ alkylcarboxy, amido, $C_{1-6}$ alkylamido, $C_{1-6}$ haloalkylamido, $C_{6-10}$ aryl, heteroaryl, and heterocycloalkyl. In some embodiments, the substituent can be 1 or 2 moieties selected from $C_{1-4}$ alkyl (e.g., methyl), halo, and/or haloalkyl.

In some embodiments, the aromatic organic diisocyanate can be selected from the group consisting of methylene diphenyl diisocyanate (MDI), toluene diisocyanate (TDI), o-toluidine diisocyanate (TODI), 4,4'-diphenylmethane diisocyanate, p-phenylene diisocyanate (PPDI), xylene diisocyanate, hexamethylene diisocyanate, toluene diisocyanate, 1,5-naphthalene diisocyanate (NDI), polymeric MDI, and combinations thereof.

In some embodiments, the diol can be selected from the group consisting of a polyether polyol, polylactide diol, polyglycolide diol, poly(lactide-b-glycolide), poly(lactide-co-caprolactone) diol, poly(hexamethylene carbonate) diol, polycarbonate diol, poly(ethylene terephthalate diol), poly(ethylene adipate) diol, poly(butylene adipate) diol, fatty acid-based linear diol, castor oil-based diol, soybean oil-based diol, ethylene glycol, diethylene glycol, propylene glycol, dipropylene glycol, 1,4-butanediol (BDO), 1,6-hexanediol (HDO), 1,3-butanediol, 2-methyl-1,3-propanediol, 1,5-pentanediol, neopentylglycol, 1,4-cyclohexanedimethanol (CHDM), 2,2-bis[4-(2-hydroxyethoxy) phenyl] propane (HEPP), hexamethylenediol, heptanediol, nonanediol, dodecanediol, 3-methyl-1,5-pentanediol, glycerine, sorbitol, sucrose, xylitol, pentaerythritol, ethylenediamine, butanediamine, hexamethylenediamine, hydroxyethyl resorcinol (HER), poly(tetramethylene ether) glycol (PTMG), poly(polytetrahydrofuran carbonate) diol, bis(2-hydroxyethyl)terephthalate (BHET), and a combination thereof.

In some embodiments, the diol can be a polyether polyol, such as a hydroxyl-terminated polyether polyol derived from a diol or polyol having a total of from 2 to 15 carbon atoms (e.g., 2, 3, 4, 5, 6, 7, 8, 9, 10, 11, 12, 13, 14, or 15 carbon atoms). The polyether polyol can have any suitable number average molecular weight, such as about 100 g/mol or more to about 20,000 g/mol or less. In some embodiments, the polyether polyol can have a low end of a range of a number average molecular weight of about 200 g/mol or more (e.g., about 300 g/mol or more, about 400 g/mol or more, about 500 g/mol or more, about 600 g/mol or more, about 700 g/mol or more, about 800 g/mol or more, about 900 g/mol or more, about 1000 g/mol or more, about 1200 g/mol or more, about 1400 g/mol or more, about 1600 g/mol or more, about 1800 g/mol or more, about 2000 g/mol or more, about 2200 g/mol or more, about 2400 g/mol or more, about 2600 g/mol or more, about 2800 g/mol or more, about 3000 g/mol or more, about 3200 g/mol or more, about 3400 g/mol or more, about 3600 g/mol or more, about 3800 g/mol or more, about 4000 g/mol or more, about 4200 g/mol or more, about 4400 g/mol or more, about 4600 g/mol or more, about 4800 g/mol or more, about 5000 g/mol or more, about 5200 g/mol or more, about 5400 g/mol or more, about 5600 g/mol or more, about 5800 g/mol or more, about 6000 g/mol or more, about 6200 g/mol or more, about 6400 g/mol or more, about 6600 g/mol or more, about 6800 g/mol or more, about 7000 g/mol or more, about 7200 g/mol or more, about 7600 g/mol or more, about 7800 g/mol or more, about 8000 g/mol or more, about 8200 g/mol or more, about 8600 g/mol or more, about 8800 g/mol or more, about 9000 g/mol or more, about 9200 g/mol or more, about 9400 g/mol or more, about 9600 g/mol or more, about 9800 g/mol or more, about 10,000 g/mol or more, about 11,000 g/mol or more, about 12,000 g/mol or more, about 13,000 g/mol or more, about 14,000 g/mol or more, about 15,000 g/mol or more, about 16,000 g/mol or more, about 18,000 g/mol or more, or about 19,000 g/mol or more). In some embodiments of these lower end of the molecular weight range, the polyether polyol can have an upper end of the number average molecular weight range that is about 20,000 g/mol or less (e.g., about 19,000 g/mol or less, about 18,000 g/mol or less, about 17,000 g/mol or less, about 16,000 g/mol or less, about 15,000 g/mol or less, about 14,000 g/mol or less, about 13,000 g/mol or less, about 12,000 g/mol or less, about 11,000 g/mol or less, about 10,000 g/mol or less, about 9800 g/mol or less, about 9600 g/mol or less, about 9400 g/mol or less, about 9200 g/mol or less, about 9000 g/mol or less, about 8800 g/mol or less, about 8600 g/mol or less, about 8400 g/mol or less, about 8200 g/mol or less, about 8000 g/mol or less, about 7800 g/mol or less, about 7600 g/mol or less, about 7400 g/mol or less, about 7200 g/mol or less, about 7000 g/mol or less, about 6800 g/mol or less, about 6600 g/mol or less, about 6400 g/mol or less, about 6200 g/mol or less, about 6000 g/mol or less, about 5800 g/mol or less, about 5600 g/mol or less, about 5400 g/mol or less, about 5200 g/mol or less, about 5000 g/mol or less, about 4800 g/mol or less, about 4600 g/mol or less, about 4400 g/mol or less, about 4200 g/mol or less, about 4000 g/mol or less, about 3800 g/mol or less, about 3600 g/mol or less, about 3400 g/mol or less, about 3200 g/mol or less, about 3000 g/mol or less, about 2800 g/mol or less, about 2600 g/mol or less, about 2400 g/mol or less, about 2200 g/mol or less, about 2000 g/mol or less, about 1800 g/mol or less, about 1600 g/mol or less, about 1400 g/mol or less, about 1200 g/mol or less, about 1000 g/mol or less, about 900 g/mol or less, about 800 g/mol or less, about 700 g/mol or less, about 600 g/mol or less, about 500 g/mol or less, about 400 g/mol or less, about 300 g/mol or less, or about 200 g/mol or less). In some embodiments, the polyol ether can have a number average molecular weight of about 200 g/mol to about 15,000 g/mol or about 200 g/mol to about 5000 g/mol or about 400 g/mol to about 10,000 g/mol or about 400 g/mol to about 8000 g/mol or about 500 g/mol to about 5000 g/mol or about 600 g/mol to about 12,000 g/mol.

In certain embodiments, the polymer, e.g., a polyurethane or a polymer, e.g., copolymer, comprising polyurethane and a second polymer, can have a molecular weight from about 500 Da to about 500 kDa. For example, but not by way of limitation, the polyurethane or the polymer, e.g., copolymer, comprising polyurethane and a second polymer can have a molecular weight from about from about 600 Da to about 500 kDa, from about 700 Da to about 500 kDa, from about 800 Da to about 500 kDa, from about 900 Da to about 500 kDa, from about 1 kDa to about 500 kDa, from about 10 kDa to about 500 kDa, from about 50 kDa to about 500 kDa, from about 100 kDa to about 500 kDa, from about 150 kDa to about 500 kDa, from about 200 kDa to about 500 kDa, from about 300 kDa to about 500 kDa, from about 400 kDa to about 500 kDa, from about 1 kDa to about 100 kDa, from about 1 kDa to about 50 kDa, from about 10 kDa to about 400 kDa, from about 10 kDa to about 100 kDa, from about 50 kDa to about 400 kDa, from about 50 kDa to about 400 kDa, from about 50 kDa to about 400 kDa, from about 50 kDa to about 300 kDa, from about 50 kDa to about 200 kDa, from about 50 kDa to about 100 kDa, from about 100 kDa to about 400 kDa, from about 100 kDa to about 300 kDa or from about 200 kDa to about 400 kDa. In certain embodiments, a suitable polyurethane or a polymer, e.g., copolymer, comprising polyurethane and a second polymer for use as a membrane polymer can have a molecular weight of 500 Da or more, of 600 Da or more, of 700 Da or more, of 800 Da or more, of 900 Da or more, of 1 kDa or more, of 5 kDa or more, about 10 kDa or more, about 15 kDa or more, about 20 kDa or more, about 25 kDa or more, about 30 kDa or more, about 40 kDa or more, about 50 kDa or more, about 75 kDa or more, about 90 kDa or more, about 100 kDa or more, about 150 kDa or more, about 200 kDa or more, about 250 kDa or more, about 300 kDa or more, about 350 kDa or more, about 400 kDa or more, about 450 kDa or more or about 500 kDa or more. In certain embodiments, a suitable polyurethane or a polymer (e.g., copolymer) comprising polyurethane and a second polymer, e.g., a hydrophilic polymer, for use as a membrane polymer can have a molecular weight of 500 Da or more, of 600 Da or more, of 700 Da or more, of 800 Da or more, of 900 Da or more, of 1 kDa or more, of 5 kDa or more, about 10 kDa or more, about 15 kDa or more, about 20 kDa or more, about 25 kDa or more, about 30 kDa or more, about 40 kDa or more, about 50 kDa or more, about 75 kDa or more, about 90 kDa or more, about 100 kDa or more, about 150 kDa or more, about 200 kDa or more, about 250 kDa or more, about 300 kDa or more, about 350 kDa or more, about 400 kDa or more, about 450 kDa or more or about 500 kDa or more.

In some embodiments, the diol can be a polyether polyol selected from the group consisting of polycaprolactone diol, poly(hydroxybutyrate) diol, poly(butyleneglycol) diol, polypropylene oxide diol, poly(ethylene glycol diol), poly(tetramethylene oxide diol), and a combination thereof.

In some embodiments, the polyether polyol can be based on polyethylene oxide (i.e., polyethylene glycol (PEG)), polypropylene glycol (PPG), poly(trimethylene ether) glycol, or polytetrahydrofuan (PTMEG). For example, the polyether polyol can have the structure

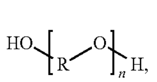

wherein R is 2, 3, or 4 carbons (e.g., a $C_{2-4}$ alkylene residue), and n is an integer from 1 to about 325. In an embodiment, the polyether polyol can comprise PEG, PPG, or PTMEG with the following structures.

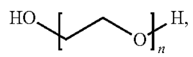

PEG

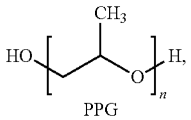

and

PPG

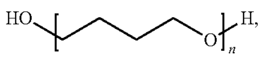

PTMEG wherein n in each formula is an integer from 1 to 325 (e.g., 1 to 300, 1 to 250, 1 to 200, 1 to 150, 1 to 100, 1 to 80, 2 to 80, 5 to 80, 7 to 80, 7 to 70, 7 to 60, 7 to 50, 7 to 40, 7 to 30, etc.).

In some embodiments, the polyether polyol can also include a polyamide adduct of an alkylene oxide, such as an ethylenediamine adduct comprising the reaction product of ethylenediamine and propylene oxide, a diethylenetriamine adduct comprising the reaction product of diethylenetriamine with propylene oxide, and similar polyamide type polyether polyols.

In some embodiments, a chain extender can be used along with the diisocyanate and diol to form the polyurethane. The chain extender can comprise a diol (e.g., 2 hydroxy groups) or polyol (e.g., at least 3 hydroxy groups), each comprising 2 to 20 carbon atoms (e.g., 2, 3, 4, 5, 6, 7, 8, 9, 10, 11, 12, 13, 14, 15, 16, 18, 19, or 20 carbon atoms). In some embodiment, the diol or polyol can comprise 2 to 12 carbon atoms or 2 to 10 carbon atoms. In some embodiments, the polyol can have 2, 3, or 4 carbons per hydroxy group.

The chain extender typically will have a molecular weight (including a number average molecular weight for polymeric structures) that is about 3,000 g/mol or less (e.g., about 2800 g/mol or less, about 2600 g/mol or less, about 2400 g/mol or less, about 2200 g/mol or less, about 2000 g/mol or less, about 1800 g/mol or less, about 1600 g/mol or less, about 1400 g/mol or less, about 1200 g/mol or less, about 1000 g/mol or less, about 900 g/mol or less, about 800 g/mol or less, about 700 g/mol or less, about 600 g/mol or less, about 500 g/mol or less, about 400 g/mol or less, about 300 g/mol or less, or about 200 g/mol or less) to about 60 g/mol or more (e.g., about 70 g/mol or more, about 80 g/mol or more about 90 g/mol or more, or about 100 g/mol or more). In some embodiments, the chain extender can have a molecular weight that ranges from about 60 g/mol to about 2,000 g/mol.

In some embodiments, the chain extender can be selected from the group consisting of ethylene glycol, diethylene glycol, propylene glycol, dipropylene glycol, 1,4-butanediol (BDO), 1,6-hexanediol (HDO), 1,3-butanediol, 2-methyl-1,3-propanediol, 1,5-pentanediol, neopentylglycol, 1,4-cyclohexanedimethanol (CHDM), 2,2-bis[4-(2-hydroxyethoxy)phenyl]propane (HEPP), hexamethylenediol, heptanediol, nonanediol, dodecanediol, 3-methyl-1,5-pentanediol, glycerine, sorbitol, sucrose, xylitol, pentaerythritol, ethylenediamine, butanediamine, hexamethylenediamine, hydroxyethyl resorcinol (HER), poly(tetramethylene ether) glycol (PTMG), poly(polytetrahydrofuran carbonate) diol, bis(2-hydroxyethyl)terephthalate (BHET), and combinations thereof.

In some embodiments, the hydrophilic polyurethane can comprise an aliphatic hydrophilic polyurethane. In some embodiments, the hydrophilic polyurethane can comprise an aromatic hydrophilic polyurethane. In some embodiments, the hydrophilic polyurethane can comprise both an aliphatic and aromatic hydrophilic polyurethane.

Any suitable method can be used to produce the hydrophilic polyurethane by reacting the diisocyanate and diol, including reacting a diisocyanate and a polyether polyol optionally in the presence of a chain extender. In certain embodiments, the polyurethane polymer is produced by a condensation reaction of aliphatic, cycloaliphatic or aromatic isocyanates (e.g., diisocyanates) and a polyol. In certain embodiments, the polyurethane polymer is produced by a condensation reaction of an aliphatic diisocyanate and a polyol. In certain embodiments, the polyurethane polymer is produced by a condensation reaction of a cycloaliphatic diisocyanate and a polyol. In certain embodiments, the polyurethane polymer is produced by a condensation reaction of an aromatic diisocyanate and a polyol.

In certain embodiments, the polyurethane is an ether-based polyurethane. In certain embodiments, the polymers used for the mass transport limiting membrane of the present disclosure are ether-based polyurethane polymers, such as those modified by polyethylene glycol, polypropylene glycol, polybutylene glycol and/or polytetramethylene glycol. For example, but not by way of limitation, the polyurethane polymer can be produced by a condensation reaction of aliphatic, cycloaliphatic or aromatic isocyanates (e.g., diisocyanates) and a polyether polyol. Non-limiting examples of polyether polyols include polypropylene glycol polyols, polybutylene glycol polyols, polyethylene glycol polyols and polytetramethylene glycol polyols. In certain embodiments, the polyurethane polymer is produced by a condensation reaction of an aliphatic diisocyanate and a polyether polyol. In certain embodiments, the polyurethane polymer is produced by a condensation reaction of a cycloaliphatic diisocyanate and a polyether polyol. In certain embodiments, the polyurethane polymer is produced by a condensation reaction of an aromatic diisocyanate and a polyether polyol. In certain embodiments, the polyurethane polymer is produced by a condensation reaction of an aliphatic diisocyanate and a polyethylene glycol polyol. In certain embodiments, the polyurethane polymer is produced by a condensation reaction of a cycloaliphatic diisocyanate and a polyethylene glycol polyol. In certain embodiments, the polyurethane polymer is produced by a condensation reaction of an aromatic diisocyanate and a polyethylene glycol polyol.

In certain embodiments, the polyurethane is an ester-based polyurethane. In certain embodiments, the polymers used for the mass transport limiting membrane of the present are ester-based polyurethane polymers. For example, but not by way of limitation, the polyurethane polymer can be produced by a condensation reaction of aliphatic, cycloaliphatic or aromatic isocyanates (e.g., diisocyanates) and a polyester polyol. In certain embodiments, the polyurethane polymer is produced by a condensation reaction of an aliphatic diisocyanate and a polyester polyol. In certain embodiments, the polyurethane polymer is produced by a condensation reaction of a cycloaliphatic diisocyanate and a polyester polyol. In certain embodiments, the polyurethane polymer is produced by a condensation reaction of an aromatic diisocyanate and a polyester polyol.

In one embodiment, the process is a so-called "one-shot" process in which all three reactants are added to an extruder reactor and reacted. The equivalent weight amount of the diisocyanate to the total equivalent weight amount of the hydroxyl containing components, that is, the diol (e.g., polyether polyol) and optional chain extender, can be from about 0.95 to about 1.10, or from about 0.96 to about 1.02, or from about 0.97 to about 1.005. The reaction temperature is not particularly limited but can be from about 175-245° C.

In another embodiment, the hydrophilic polyurethane can also be prepared using a pre-polymer process, in which the diol (e.g., polyol) is reacted with generally an equivalent excess of one or more diisocyanates to form a pre-polymer solution having free or unreacted diisocyanate therein. In this method, the reaction can generally be carried out at temperatures of from about 80-220° C. Subsequently, a chain extender can be added in an equivalent amount generally equal to the number of unreacted isocyanate end groups as well as to any free or unreacted diisocyanate compounds. The overall equivalent ratio of the total diisocyanate to the total equivalent weight amount of the diol (e.g., polyol) intermediate and the chain extender is thus from about 0.95 to about 1.10, or from about 0.96 to about 1.02, or from about 0.97 to about 1.05. The chain extension reaction temperature is generally from about 180-250° C.

If necessary, a polymerization catalyst can be used to prepare the polyurethane. Generally, any conventional catalyst can be utilized to react the diisocyanate with the diol (e.g., polyether polyol) and/or chain extender. Examples of suitable catalysts include a tertiary amine (e.g. triethylamine, dimethylcyclohexylamine, N-methylmorpholine, N,N'-dimethylpiperazine, 2-(dimethylaminoethoxy)ethanol, diazabicyclo[2.2.2]octane), an organometallic compound (e.g., a titanic ester, an iron compound (e.g. ferric acetylacetonate), or a tin compound (e.g. stannous diacetate, stannous dioctoate, stannous dilaurate, dibutyltin diacetate, dibutyltin dilaurate), or any combination thereof.

In some embodiments, the hydrophilic polyurethane can be a thermoplastic polyurethane elastomer. In such embodiments, the hydrophilic polyurethane typically can be linearly segmented block copolymers comprising hard and soft segments. In some embodiments, hard or soft segments can be pendant to the polymer backbone. In some embodiments, the reaction between diisocyanates with chain extenders (e.g., short chain diols) will form hard (rigid) segments, and the reaction between diisocyanates with polyether polyol (e.g., long chain diols) will form soft (flexible) segments. In some embodiments, the block copolymer can comprise soft segments comprising urethane and hard segments comprising urethane-diisocyanate. The ratio of hard to soft segments can be varied as needed.

In some embodiments, the hydrophilic polyurethane can have a hardness that ranges from medium hard to hard. The Shore A hardness is a measure of the resistance of a material to indentation, and the scale ranges from 0 (extremely soft) to 100 (extremely hard). For example, and in some embodiments, the hydrophilic polyurethane can have a Shore A hardness of at least about 60A, as measured in accordance with ASTM D2240 (last updated Jul. 23, 2021) using a durometer (e.g., using a type A indenter). The upper limit of the hardness of the hydrophilic polyurethane is not particularly limited. In some embodiments, the hydrophilic polyurethane can have a Shore A hardness of about 60A to about 100A (e.g., about 60A to about 95A, about 60A to about 93A, about 60A to about 90A, about 60A to about 85A, about 65A to about 80A, about 70A to about 100A, about 70A to about 93A, about 70A to about 90A, about 70A to about 85A, about 70A to about 80A, about 75A to about 100A, about 75A to about 93A, about 75A to about 90A, about 75A to about 85A, about 75A to about 80A, about 60A, about 65A, about 70A, about 75A, about 80A, about 85A, about 90A, about 93A, about 95A, or about 100A). In some embodiments, the hydrophilic polyurethane can have a Shore A hardness of at most about 90A, including about 80A, as measured in accordance with ASTM D2240 (last updated Jul. 23, 2021) using a durometer.

In certain embodiments, the polyurethane can have a hardness from about 70 to about 95 Shore A, e.g., from about 70 to about 90 Shore A, from about 70 to about 85 Shore A, from about 70 to about 80 Shore A, from about 75 to about 95 Shore A, from about 80 to about 95 Shore A, from about 85 to about 95 Shore A, from about 80 to about 93 Shore A or from about 80 to about 90 Shore A. In certain embodiments, the polyurethane can have a hardness of about 80 Shore A. In certain embodiments, the polyurethane can have a hardness of about 90 Shore A. In certain embodiments, the polyurethane can have a hardness of about 93 Shore A.

In some embodiments, the hydrophilic polyurethane can have a hardness in accordance with the Shore D scale, as measured in accordance with ASTM D2240 (last updated Jul. 23, 2021) using a durometer (e.g., using a type D indenter). In some embodiments, Shore D can be the preferred scale for harder materials. Thus, in some embodiments, the hydrophilic polyurethane can have a Shore D hardness of about OD to about 100D (e.g., about 10D to about 100D, about 15D to about 100D, about 20D to about 100D, about 25D to about 100D, about 30D to about 100D, about 35D to about 100D, or about 40D to about 100D).

In some embodiments, the hydrophilic polyurethane can have a hardness measureable only on the Shore A scale, measureable on both the Shore A and shore D scales, or measureable only on the Shore D scale.

In certain embodiments, the polyurethane is capable of absorbing from about 5% to about 95% of its weight in water, e.g., from about 5% to about 95%, from about 5% to about 90%, from about 5% to about 85%, from about 10% to about 95%, from about 15% to about 95%, from about 20% to about 95%, from about 25% to about 95%, from about 30% to about 95%, from about 5% to about 30%, from about 5% to about 35%, from about 5% to about 25% or from about 5% to about 20%. In certain embodiments, the polyurethane is capable of absorbing at least about 5% of its weight in water. In certain embodiments, the polyurethane is capable of absorbing at least about 10% of its weight in water. In certain embodiments, the polyurethane is capable of absorbing at least about 20% of its weight in water. In certain embodiments, the polyurethane is capable of absorbing at least about 30% of its weight in water. In certain embodiments, the polyurethane is capable of absorbing at least about 40% of its weight in water. In certain embodiments, the polyurethane is capable of absorbing at least about 50% of its weight in water. In certain embodiments, the polyurethane is capable of absorbing at least about 60% of its weight in water. In certain embodiments, the polyurethane is capable of absorbing at least about 70% of its weight in water. In certain embodiments, the polyurethane is capable of absorbing at least about 80% of its weight in water. In certain embodiments, the polyurethane is capable of absorbing at least about 90% of its weight in water. In certain embodiments, the polyurethane is capable of absorbing at least about 95% of its weight in water.

In certain embodiments, the linear expansion of a polyurethane is from about 10% to about 200%, e.g., from about 10% to about 190%, from about 10% to about 180%, from about 10% to about 170%, from about 10% to about 160%, from about 10% to about 150%, from about 10% to about 140%, from about 10% to about 130%, from about 10% to about 120%, from about 10% to about 110%, from about 10% to about 100%, from about 25% to about 100%, from about 30% to about 100%, from about 35% to about 100%, from about 40% to about 100%, from about 45% to about 100%, from about 50% to about 100%, from about 55% to about 100%, from about 60% to about 100%, from about 65% to about 100%, from about 70% to about 100%, from about 75% to about 100%, from about 80% to about 100%, from about 85% to about 100%, from about 90% to about 100%, from about 95% to about 100%, from about 20% to about 95%, from about 20% to about 90%, from about 20% to about 85%, from about 20% to about 80%, from about 20% to about 75%, from about 20% to about 70%, from about 20% to about 65%, from about 20% to about 60%, from about 20% to about 55%, from about 20% to about 50%, from about 20% to about 45%, from about 20% to about 40%, from about 20% to about 30%, from about 30% to about 60%, from about 40% to about 50%, from about 40% to about 60%, from about 20% to about 30% or from about 50% to about 70%. In certain embodiments, the linear expansion of a polyurethane is about 25%. In certain embodiments, the linear expansion of a polyurethane is about 40%. In certain embodiments, the linear expansion of a polyurethane is about 45%. In certain embodiments, the linear expansion of a polyurethane is about 50%. In certain embodiments, the linear expansion of a polyurethane is about 60%. In certain embodiments, the linear expansion of a polyurethane is of about 100%. In certain embodiments, the linear expansion of a polyurethane is about 110% or greater, of about 100% or greater, of about 90% or greater, of about 80% or greater, of about 70% or greater, of about 60% or greater, of about 50% or greater, of about 40% or greater, of about 30% or greater, of about 20% or greater or of about 10% or greater.

In certain embodiments, the polyurethane can have a linear expansion of about 45% and is capable of absorbing about 70% of its weight in water. In certain embodiments, the polyurethane can have a linear expansion of about 25% and is capable of absorbing about 55% of its weight in water. In certain embodiments, the polyurethane can have a linear expansion of about 40% and is capable of absorbing about 60% of its weight in water. In certain embodiments, the polyurethane can have a linear expansion of about 50% and is capable of absorbing about 50% of its weight in water. In certain embodiments, the polyurethane can have a linear expansion of about 60% and is capable of absorbing about 80% of its weight in water. In certain embodiments, the polyurethane can have a linear expansion of about 100% and is capable of absorbing about 90% of its weight in water. In certain embodiments, the polyurethane can have a linear expansion of about 10% and is capable of absorbing about 30% of its weight in water. In certain embodiments, the polyurethane can have a linear expansion of about 180% and is capable of absorbing about 95% of its weight in water.

In some embodiments, the hydrophilic polyurethane is capable of absorbing about 5%-25% by weight of water. In some embodiments, the hydrophilic polyurethane is capable of absorbing about 10%-25% (e.g., about 12%-25%, about 15%-25%, about 18%-25%, about 20%-25%, about 5%, about 8%, about 10%, about 12%, about 15%, about 18%, about 20%, about 21%, about 22%, about 23%, about 24%, or about 25%) by weight of water.

In certain embodiments, the polyurethane can be a commercially available polyurethane, e.g., a hydrophilic polyurethane. Non-limiting examples of commercially available polyurethanes include the polyurethanes available from AdvanSource Biomaterials (Wilmington, MA). In certain embodiments, the polyurethane can include a polyurethane of the HydroMed™ Series or the HydroThane™ Series from AdvanSource Biomaterials.

In certain embodiments, hydrophilic polyurethanes can include a polyurethane of the HydroMed™ Series from AdvanSource Biomaterials. For example, but not by way of limitation, the commercially available hydrophilic polyurethane can include HydroMed™ D1, HydroMed™ D2, HydroMed™ D3, HydroMed™ D4, HydroMed™ D6, HydroMed™ D640, HydroMed™ D7, HydroMed™ Hydroslip C or a combination thereof. In certain embodiments, the polyurethane can comprise HydroMed™ D6. In certain embodiments, the polyurethane can comprise HydroMed™ D640. In certain embodiments, the polyurethane can comprise HydroMed™ D1.

In certain embodiments, hydrophilic polyurethanes can include a polyurethane of the HydroThane™ Series from AdvanSource Biomaterials (Wilmington, MA). In certain embodiments, the commercially available hydrophilic polyurethane can include a polyurethane of the HydroThane™ AR series. For example, but not by way of limitation, the polyurethane can include HydroThane™ AR 5-80A, HydroThane™ AR 10-80A, HydroThane™ AR 15-80A, HydroThane™ AR 20-80A, HydroThane™ AR 25-80A, HydroThane™ AR 5-93A, HydroThane™ AR 10-93A, HydroThane™ AR 15-93A, HydroThane™ AR 20-93A or HydroThane™ AR 25-93A. In certain embodiments, the commercially available hydrophilic polyurethane can include a polyurethane of the HydroThane™ AL series from AdvanSource biomaterials. For example, but not by way of limitation, the polyurethane can include HydroThane™ AL 5-80A, HydroThane™ AL 10-80A, HydroThane™ AL 15-80A, HydroThane™ AL 20-80A, HydroThane™ AL 25-80A, HydroThane™ AL 5-93A, HydroThane™ AL 10-93A, HydroThane™ AL 15-93A, HydroThane™ AL 20-93A or HydroThane™ AL 25-93A. In some embodiments, the polyurethane is Hydrothane AL 25-80A, which exhibits a water absorption rate of about 25%.

In some embodiments, the hydrophilic polyurethane can have a Shore A hardness of about 80A and a water absorption rate of about 25%.

In some embodiments, the hydrophilic polyurethane membrane can limit the transport of mass to the sensing layer. In other words, the hydrophilic polyurethane membrane can limit analyte flux to the sensing layer, since the hydrophilic polyurethane membrane has at least some permeability for an analyte of interest. In an embodiment, the hydrophilic polyurethane membrane overcoating at least the sensing layer can have sufficient analyte permeability to provide an analyte sensitivity of about 1 nA/mM or greater when exposed to the analyte of interest.

In certain embodiments, the polyurethane is not cured. In some embodiments, the hydrophilic polyurethane membrane is not crosslinked. In certain embodiments, the use of a polyurethane polymer that is not crosslinked avoids side reactions that can occur during crosslinking, which can be deleterious to sensing layer chemistry.

In some embodiments, the hydrophilic polyurethane membrane can comprise multiple layers in which each layer has a different composition. In an example, the membrane coating can be a bilayer membrane that can comprise a first layer that can comprise an aliphatic hydrophilic polyurethane and a second layer that can comprise an aromatic hydrophilic polyurethane. The variation in composition between layers allows tuning the permeability to a desired analyte.

In some embodiments, the analyte sensor provides consistent analyte measurements over a temperature range of about 22-42° C. (e.g., about 22-40° C., about 22-37° C., about 22-35° C., about 22-32° C., about 32-42° C., about 32-40° C., about 32-37° C., about 32-35° C., about 22° C., about 23° C., about 24° C., about 25° C., about 26° C., about 27° C., about 28° C., about 29° C., about 30° C., about 31° C., about 32° C., about 33° C., about 34° C., about 35° C., about 36° C., about 37° C., about 38° C., about 39° C., about 40° C., about 41° C., or about 42° C.). It was surprisingly discovered that a hydrophilic aromatic polyurethane, as described herein, produces a unique response to temperature. As the temperature rose from about 22 to about 32° C., a positive temperature effect was seen, but then as the temperature increased further, e.g., from about 32° C. to about 42° C., a negative effect was seen. The negative effect was unexpected and very unique. This inflection point within the range of interest is very much unexpected and further improves sensor performance.

In certain embodiments, a membrane can comprise, consist essentially of or consist of a polyurethane described herein or a copolymer of a polyurethane. In certain embodiments, at least 90% w/w or more of the membrane is the polyurethane polymer or the copolymer comprising a polyurethane. For example, but not by way of limitation, at least 91% w/w or more, at least 92% w/w or more, at least 93% w/w or more, at least 94% w/w or more, at least 95% w/w or more, at least 96% w/w or more, at least 97% w/w or more, at least 98% w/w or more, at least 99% w/w or more, at least 99.1% w/w or more, at least 99.2% w/w or more, at least 99.3% w/w or more, at least 99.4% w/w or more, at least 99.5% w/w or more, at least 99.6% w/w or more, at least 99.7% w/w or more, at least 99.8% w/w or more or at least 99.9% w/w or more of the membrane is the polyurethane polymer or the copolymer comprising a polyurethane.

In certain embodiments, a membrane can include a blend or composite of a polyurethane described herein and a second polymer. In certain embodiments, the second polymer present in the composite or blend can be a hydrophilic polymer. Non-limiting examples of a hydrophilic polymer include a polyether, a polyester, a polyalkene, a polyamine, a polyalkylene oxide (e.g., polyethylene oxide, polybutylene oxide, polypropylene oxide or polytetramethylene oxide), a polyalkylene glycol (e.g., polyethylene glycol or a polypropylene glycol), a polyacrylate, a polymethacrylate, a thiolene polymer, alginate, chitosan, polyvinylpyrrolidone, polyvinyl alcohol, polyvinyl acetate, polysorbate, a hydrophilic polyurethane, a polyvinylpyridine-based polymer and a pluronic (e.g., PEO-PPO-PEO). Non-limiting examples of polyvinylpyridine-based polymers include polyvinylpyridine polymers, poly(4-vinylpyridine-co-styrene) polymers, poly(4-vinylpyridine-co-styrene) copolymers derivatized with propylsulfonate and poly(ethyleneoxide) moieties and those described in U.S. Pat. No. 6,932,894, the disclosure of which is herein incorporated by reference. In certain embodiments, the second polymer present in the composite or blend is a hydrophobic polymer. Non-limiting examples of a hydrophobic polymer include an acrylonitrile polymer, an acrylamide polymer, a maleic anhydride polymer, a polyamide, a polyimide, a polycarbonate, a polystyrene, a polyvinylchloride, a polytetrafluorethylene, a polydimethylsiloxane and a hydrophobic polyurethane. In certain embodiments, the hydrophilic polymer or hydrophobic polymer can be further derivatized to tailor the physical properties of the membrane.

In certain embodiments, a membrane of the present disclosure can include the second polymer in an amount of at least about 3%, at least about 5%, at least about 7%, at least about 10%, at least about 15%, at least about 20%, at least about 25%, at least about 30%, at least about 35%, at least about 40% or at least about 45% or at least 50% w/w of the blend or composite. In certain embodiments, a membrane of the present disclosure can include the second polymer in amount ranging from about 1 to about 50% w/w of the blend or composite, e.g., from about 3% to about 50%, from about 3% to about 5%, from about 3% to about 7%, from about 3% to about 10%, from about 3% to about 15%, from about 3% to about 20%, from about 3% to about 25%, from about 3% to about 30%, from about 5% to about 30%, from about 7% to about 30%, from about 10% to about 30%, from about 15% to about 30%, from about 20% to about 30%, from about 25% to about 30%, from about 5% to about 20% or from about 5% to about 15% w/w of the blend or composite. In certain embodiments, a membrane of the present disclosure can include the polyurethane in amount of at least about 3%, at least about 5%, at least about 7%, at least about 10%, at least about 15%, at least about 20%, at least about 25%, at least about 30%, at least about 35%, at least about 40%, at least about 45% or at least 50% w/w of the blend or composite. In certain embodiments, a membrane of the present disclosure can include the polyurethane in amount ranging from about 1 to about 50% w/w of the blend or composite, e.g., from about 3% to about 50%, from about 3% to about 5%, from about 3% to about 7%, from about 3% to about 10%, from about 3% to about 15%, from about 3% to about 20%, from about 3% to about 25%, from about 3% to about 30%, from about 5% to about 30%, from about 7% to about 30%, from about 10% to about 30%, from about 15% to about 30%, from about 20% to about 30%, from about 25% to about 30%, from about 5% to about 20% or from about 5% to about 15% w/w of the blend or composite.

In certain embodiments, a membrane can include a blend or composite of two or more polyurethanes. In certain embodiments, a membrane of the present disclosure can include two or more commercially available polyurethanes. In certain embodiments, a membrane of the present disclosure can include two or more polyurethanes with similar hardness, two or more polyurethanes with different hardness, two or more polyurethanes with similar water absorption capabilities or two or more polyurethanes with different water absorption capabilities.

In certain embodiments, a membrane of the present disclosure includes a polymer, e.g., a copolymer, comprising a polyurethane and a second polymer (e.g., as a segment within the copolymer). In certain embodiments, the polymer, e.g., a copolymer, can include a polyurethane and a hydrophilic polymer. Non-limiting examples of a hydrophilic polymer include a polyether, a polyester, a polyalkene, a polyamine, a polyalkylene oxide (e.g., polyethylene oxide, polybutylene oxide, polypropylene oxide or polytetramethylene oxide), a polyalkylene glycol (e.g., polyethylene glycol or a polypropylene glycol), a polyacrylate, a polymethacrylate, a thiolene polymer, alginate, chitosan, polyvinylpyrrolidone, polyvinyl alcohol, polyvinyl acetate, polysorbate, a hydrophilic polyurethane, a polyvinylpyridine-based polymer and a pluronic (e.g., PEO-PPO-PEO). Non-limiting examples of polyvinylpyridine-based polymers include polyvinylpyridine polymers, poly(4-vinylpyridine-co-styrene) polymers, poly(4-vinylpyridine-co-styrene) copolymer derivatized with propylsulfonate and poly (ethyleneoxide) moieties and those described in U.S. Pat. No. 6,932,894, the disclosure of which is herein incorporated by reference. In certain embodiments, the polymer, e.g., a copolymer, can include a polyurethane and a hydrophobic polymer. Non-limiting examples of a hydrophobic polymer include an acrylonitrile polymer, an acrylamide polymer, a maleic anhydride polymer, a polyamide, a polyimide, a polycarbonate, a polystyrene, a polyvinylchloride, a polytetrafluorethylene, a polydimethylsiloxane and a hydrophobic polyurethane. In certain embodiments, the hydrophilic polymer or the hydrophobic polymer can be further derivatized to tailor the physical properties of the membrane.

In certain embodiments, the polymer, e.g., copolymer, can include polyurethane and polyethylene oxide, polybutylene oxide, polypropylene oxide or polytetramethylene oxide. In certain embodiments, the polymer can include polyurethane and polyethylene oxide. In certain particular embodiments, the polymer can include polyurethane and polyethylene glycol.

In certain embodiments, the polymer is an aliphatic polyether urethane, an aliphatic polyether urethane urea, a cycloaliphatic poly(ether-urethane), cycloaliphatic poly (ether-urethane) urea, an aromatic polyether ammonia ester, an aromatic polyether ammonia ester urea, an aliphatic polyester type polyurethane, an aliphatic polyester type polyurethane urea, a cycloaliphatic polyester type polyurethane, a cycloaliphatic polyester type polyurethane urea, an aromatic polyester type polyurethane or an aromatic polyester type polyurethane urea.

As would be recognized by a person of ordinary skill in the art, choice of the hydrophilic polymer in a polymer, e.g., copolymer, comprising polyurethane and the hydrophilic polymer can enable regulation of hydrophilicity and wetting ability of said copolymer. For example, but not by the way of limitation, the hydrophilicity of the polyurethane polymers can be tailored by modifying polyurethane with polyethylene glycol or higher polyalkyl ethers such as polypropylene glycol and polytetramethylene glycol. Accordingly, in certain embodiments, the polymers, e.g., copolymers, used for mass transport limiting membrane are ether-based polyurethane polymers, such as those modified by polyethylene glycol, polypropylene glycol and polytetramethylene glycol. Advantageously, such a modification enables using a single polymer directly overcoating the active area, thereby eliminating the need for blending of multiple polymers or using additional processing steps such as curing and quenching to avoid biphasic formations in membranes. In addition, cross-linking is typically associated with many side reactions, many of which can be deleterious to sensing layer chemistry through direct reaction and inactivation of sensing layer components.

In certain embodiments, the polymer, e.g., copolymer, comprising polyurethane and a second polymer, e.g., a hydrophilic polymer, can include the second polymer in amount of at least about 3%, at least about 5%, at least about 7%, at least about 10%, at least about 15%, at least about 20%, at least about 25%, at least about 30%%, at least about 35%, at least about 40%, at least about 45% or at least 50% w/w of the total copolymer. In certain embodiments, the polymer, e.g., copolymer, of polyurethane and a second polymer, e.g., a hydrophilic polymer, can include the second polymer in amount ranging from about 1 to about 50% w/w of the total copolymer, e.g., from about 3% to about 50%, from about 3% to about 5%, from about 3% to about 7%, from about 3% to about 10%, from about 3% to about 15%, from about 3% to about 20%, from about 3% to about 25%, from about 3% to about 30%, from about 5% to about 30%, from about 7% to about 30%, from about 10% to about 30%, from about 15% to about 30%, from about 20% to about 30%, from about 25% to about 30%, from about 5% to about 20% or from about 5% to about 15% w/w of the total copolymer.

In certain embodiments, the polymer, e.g., copolymer, comprising polyurethane and a second polymer, e.g., a hydrophilic polymer, can include the polyurethane in amount of at least about 3%, at least about 5%, at least about 7%, at least about 10%%, at least about 15%, at least about 20%, at least about 25%, at least about 30%%, at least about 35%, at least about 40%, at least about 45% or at least 50% w/w of the total copolymer. In certain embodiments, the polymer, e.g., copolymer, of polyurethane and a second polymer, e.g., a hydrophilic polymer, can include the polyurethane in amount ranging from about 1 to about 50% w/w of the total copolymer, e.g., from about 3% to about 50%, from about 3% to about 5%, from about 3% to about 7%, from about 3% to about 10%, from about 3% to about 15%, from about 3% to about 20%, from about 3% to about 25%, from about 3% to about 30%, from about 5% to about 30%, from about 7% to about 30%, from about 10% to about 30%, from about 15% to about 30%, from about 20% to about 30%, from about 25% to about 30%, from about 5% to about 20% or from about 5% to about 15% w/w of the total copolymer.

In certain embodiments, a mass transport limiting membrane of the present disclosure can comprise a single layer of a polyurethane polymer. In certain embodiments, a mass transport limiting membrane of the present disclosure can comprise two or more layers of a polyurethane polymer, e.g., two, three or four layers of a polyurethane polymer. In certain embodiments, a mass transport limiting membrane of the present disclosure can comprise a single layer of a blend or composite comprising a polyurethane polymer and a second polymer as described herein. In certain embodiments, a mass transport limiting membrane of the present disclosure can comprise a single layer of a second polymer as described herein, e.g., a hydrophobic or a hydrophilic polymer. In certain embodiments, a mass transport limiting membrane of the present disclosure can comprise two or more layers of a second polymer, e.g., two, three or four layers of a second polymer. In certain embodiments, the mass transport limiting membrane can have alternating layers of a polyurethane polymer and layers of a second polymer, e.g., the mass transport limiting membrane can have a first layer of a polyurethane polymer and a second layer of a second polymer. In certain embodiments, the polyurethane polymer is an ether-based polyurethane. In certain embodiments, the second polymer is a polyvinylpyridine-based polymer, e.g., a polyvinylpyridine polymer, a poly(4-vinylpyridine-co-styrene) polymer, or a poly(4-vinylpyridine-co-styrene) copolymer derivatized with propylsulfonate and poly(ethyleneoxide) moieties. In certain embodiments, the second polymer can be crosslinked using one or more crosslinked agents described herein, e.g., PEGDGE or Gly3.

Sensor Components

In addition to a working electrode, a sensing layer disposed on at least a portion of the working electrode, and a hydrophilic polyurethane membrane overcoating at least the sensing layer, the analyte sensor further can comprise a reference electrode, a counter electrode, or both a reference electrode and a counter electrode in some embodiments. In an embodiment, the counter electrode can be carbon (e.g., screen-printed carbon), and the reference electrode can be Ag/AgCl. In a two electrode example, a working electrode and a second electrode that functions as both a counter electrode and reference electrode (i.e., a counter/reference electrode) are used.

In some embodiments, the analyte sensor can further be contained within a sensor housing that is configured for adherence to the tissue (e.g., skin). If necessary, the sensor housing can include an adhesive layer that enables adhesion to the desired tissue. The sensor housing can hold all necessary components of the sensor, such as circuitry and a power source for operating the sensor. In some embodiments, the power source (e.g., a coin cell battery) and/or active circuitry are not contained within the sensor housing. A processor can be communicatively coupled to the sensor, in which the processor is physically located within the sensor housing or a reader device. The power source can include one or more batteries, which can be rechargeable or single-use disposable batteries. Power management circuitry can regulate battery charging and power supply monitoring, boost power, or perform direct current (DC) conversions.

In some embodiments, the analyte sensor further comprises a sensor tail (e.g., insertion tip) configured for penetrating (e.g., implantation into) tissue. The sensor tail includes at least one working electrode and a sensing layer. A counter electrode can be present in combination with the at least one working electrode. The various electrodes can be at least partially stacked (layered) upon one another and/or laterally spaced apart from one another upon the sensor tail. In general, the sensor tail can be of sufficient size and shape to be positionable below the surface of the tissue (e.g., penetrating through the skin (dermis)) and into the subcutaneous space and in contact with the wearer's biofluid, such as interstitial fluid. Suitable sensor configurations can be substantially flat in shape, substantially cylindrical in shape, or any other suitable shape. In an example, a sensor tail can be about 5 mm in length, about 0.6 mm in width, and about 0.25 mm in thickness. Suitable tissues include, for example, skin, including the dermal layer, an interstitial layer, and/or a subcutaneous layer of the skin. In any of the sensor configurations disclosed herein, the various electrodes can be electrically isolated from one another by a dielectric material or similar insulator.

In an embodiment, the analyte sensor can include a sensor tail with at least a first working electrode and a second working electrode, a first analyte-responsive sensing layer disposed upon a surface of the first working electrode and a second analyte-responsive sensing layer configured to detect a second analyte different from the first analyte disposed upon a surface of the second working electrode.

In some embodiments, the analyte sensor further comprises at least one insulation (e.g., dielectric) layer. In some embodiments, the insulation layer is comprised of a suitable dielectric material that can form a solid. In an example, the insulation layer can be formed from porcelain (ceramic), mica, glass, barium strontium titanate, a plastic (e.g., polystyrene, polytetrafluoroethylene, polyethylene terephthalate, polyethylene, polypropylene, polymethylmethacrylate, polysulfone, polydimethylsiloxane, polyvinyl chloride), or a metal oxide (e.g., silica, alumina, titania, zirconia, tantalum oxide, etc.).

In some embodiments, the analyte sensor further comprises a substrate, wherein the working electrode is disposed on the substrate. The substrate is formed from any suitable inert material. In some embodiments, the substrate is biocompatible. Examples of a suitable substrate include titanium, a carbon-based substrate (e.g., cellulose, polylactic acid) and a plastic substrate (e.g., polyethylene terephthalate, polyethylene, polypropylene, polymethylmethacrylate, polysulfone, polydimethylsiloxane, polyvinyl chloride, etc.). The substrate can be disposed between the working electrode and a counter and/or reference electrode.

In certain embodiments, an analyte-responsive active area is disposed upon a portion of a working electrode. For example, but not by way of limitation, an analyte-responsive active area is disposed upon a portion of the working electrode in a spotted pattern, e.g., two or more spots on the working electrode. In certain embodiments, an analyte-responsive active area is disposed upon a portion of the working electrode as three or more, four or more, five or more or six or more discrete spots. In certain embodiments, a discrete spot can range in size from about 0.01 $mm^2$ to about 1 $mm^2$ or about 0.05 $mm^2$ to about 0.3 $mm^2$, although larger or smaller individual spots within the active areas are also contemplated herein. In certain embodiments, an analyte-responsive active area is disposed upon a portion of the working electrode in a slotted pattern. In certain embodiments, an analyte-responsive active area is disposed upon the entire length of the working electrode or in a continuous pattern on the working electrode. Non-limiting examples of depositing a plurality of reagent compositions to the surface of an electrode as well as forming a discontinuous or continuous perimeter around each reagent composition is described in U.S. Pat. No. 10,327,677, the disclosure of which is herein incorporated by reference.

In certain embodiments, when more than one active area is present in a sensor, the enzymes can be the same or different. For example, but not by the way of limitation, when the sensor includes a first and a second active area, the enzyme in the first active area and the enzyme in the second active area can be the same. In certain other embodiments, when the sensor includes a first active area and a second active area, the one or more enzymes of the first active area and the one or more enzymes in the second active area can be different, e.g., for detecting different analytes or the same analyte.

In certain embodiments, an analyte sensor can include two working electrodes, e.g., a first active area disposed on a first working electrode and a second active area disposed on a second working electrode. In certain embodiments, an analyte sensor disclosed herein can feature a first analyte-responsive active area and a second analyte-responsive active area for detecting an analyte different from the first analyte. For example, but not by way of limitation, such analyte sensors can include a sensor tail with at least a first working electrode and a second working electrode, a first analyte-responsive active area disposed upon a surface of the first working electrode and a second active area, e.g., a second analyte-responsive active area, configured to detect a different analyte disposed upon a surface of the second working electrode. In certain embodiments, when the sensor is configured to detect two or more analytes, detection of each analyte can include applying a potential to each working electrode separately, such that separate signals are obtained from each analyte. The signal obtained from each analyte can then be correlated to an analyte concentration through use of a calibration curve or function, or by employing a lookup table. In certain particular embodiments, correlation of the analyte signal to an analyte concentration can be conducted through use of a processor.

In certain embodiments, an analyte sensor can include two working electrodes, e.g., (i) a first working electrode comprising a first active area configured to detect an analyte disposed on the first working electrode and (ii) a second working electrode that does not comprise an active area or comprises an active area that does not include an enzyme or includes an inactive enzyme. For example, but not by way of limitation, such analyte sensors can include a sensor tail with at least a first working electrode and a second working electrode, where a first analyte-responsive active area configured to detect the first analyte is disposed upon a surface of the first working electrode and a second working electrode configured to detect background signal, e.g., signal generated by one or more interferents. In certain embodiments, subtraction of the signal obtained from the second working electrode from the signal obtained from the first working electrode can then allow the signal contribution arising from the first analyte to be determined and/or allow for more accurate determination of the concentration of the first analyte.

In certain other analyte sensor configurations, the first active area and the second active area can be disposed upon a single working electrode. A first signal can be obtained from the first active area and a second signal containing a signal contribution from both active areas can be obtained. In certain embodiments, a first signal can be obtained from the first active area, e.g., at a low potential, and a second signal containing a signal contribution from both active areas can be obtained at a higher potential. Subtraction of the first signal from the second signal can then allow the signal contribution arising from the second analyte to be determined. The signal contribution from each analyte can then be correlated to an analyte concentration in a similar manner to that described for sensor configurations having multiple working electrodes. In certain embodiments, when a first active area and the second active area, e.g., a second analyte-responsive active area, configured to detect a different analyte are arranged upon a single working electrode in this manner, one of the active areas can be configured such that it can be interrogated separately to facilitate detection of each analyte. For example, either the first analyte-responsive active area or the second active area responsive to the second analyte can produce a signal independently of the other active area.

In certain embodiments, an active area of the present disclosure can have a thickness from about 0.1 μm to about 100 μm, e.g., from about 1 μm to about 90 μm, from about 1 μm to about 80 μm, from about 1 μm to about 70 μm, from about 1 μm to about 60 μm, from about 1 μm to about 50 μm, from about 1 μm to about 40 μm, from about 1 μm to about 30 μm, from about 1 μm to about 20 μm, from about 0.5 μm to about 10 μm, from about 1 μm to about 10 μm, from about 1 μm to about 5 μm or from about 0.1 μm to about 5 μm. In certain embodiments, a series of droplets can be applied atop of one another to achieve the desired thickness of the active area, without substantially increasing the diameter of the applied droplets (i.e., maintaining the desired diameter or range thereof).

It is also to be appreciated that the sensitivity (output current) of the analyte sensors toward each analyte can be varied by changing the coverage (e.g., area and/or size) of the active areas, the area ratio of the active areas with respect to one another, the identity, thickness and/or composition of a mass transport limiting membrane overcoating the active areas. Variation of these parameters can be conducted readily by one having ordinary skill in the art once granted the benefit of the disclosure herein.

The sensing layer of analyte sensor is an active area of the working electrode configured for detecting one or more analytes, e.g., glucose. In certain embodiments, an analyte sensor of the present disclosure can include more than one sensing layer, where each sensing layer is configured to detect the same analyte or different analytes. In certain embodiments, an analyte sensor of the present disclosure can further include one or more sensing layers configured to detect a second analyte different from a first analyte. In some embodiments, the sensing layer comprises an analyte responsive enzyme and a redox mediator. In certain embodiments, the sensor does not include an enzyme and the analyte is directly oxidized at the working electrode.

Enzyme

In certain embodiments, the sensing layer can include one or more enzymes for detecting a particular analyte. The enzyme can catalyze a reaction that consumes an analyte of interest or produces a product that is detectable by the analyte sensor. The analyte-responsive enzyme will be selected based on the analyte that is to be detected (e.g., glucose, lactate, ketone, glutamate, pyruvate, creatinine, sarcosine, and/or alcohol (e.g., ethanol)). In some embodiments, the enzyme is an oxidase enzyme or a dehydrogenase enzyme. Suitable examples of the analyte-responsive enzyme include glucose oxidase, glucose dehydrogenase, glutamate oxidase, lactate oxidase, lactate dehydrogenase, pyruvate oxidase, alcohol oxidase, xanthine oxidase, β-hydroxybutyrate dehydrogenase, 11β-hydroxysteroid dehydrogenase type 2 (11β-HSD-2), creatine amidohydrolase, sarcosine oxidase, nicotinamide adenine dinucleotide (NADH)-dependent oxidase, NADPH dehydrogenase, a flavin adenine dinucleotide (FAD)-dependent oxidase, a flavin mononucleotide (FMN)-dependent oxidase, diaphorase, catalase, and combinations thereof. In some embodiments, the enzyme is glucose oxidase and/or glucose dehydrogenase to detect glucose. In some embodiments, the enzyme is glutamate oxidase to detect glutamate. In some embodiments, the enzyme is lactate oxidase and/or lactate dehydrogenase to detect lactate. In some embodiments, the enzyme is pyruvate oxidase to detect pyruvate. In some embodiments, the enzymes are alcohol oxidase and xanthine oxidase to detect ethanol or other alcohols. In some embodiments, the enzyme is β-hydroxybutyrate dehydrogenase to detect ketone. In some embodiments, the enzyme is creatine amidohydrolase and/or sarcosine oxidase to detect creatine and/or sarcosine. If necessary, one or more cofactors can be included with the enzyme, which serves as a catalyst for the electron transfer. Suitable cofactors include, e.g., pyrroloquinoline quinone (PQQ), thiamine pyrophosphate (TPP), flavin adenine dinucleotide (FAD), nicotinamide adenine dinucleotide (NAD), and any combination thereof.

Figure 9:
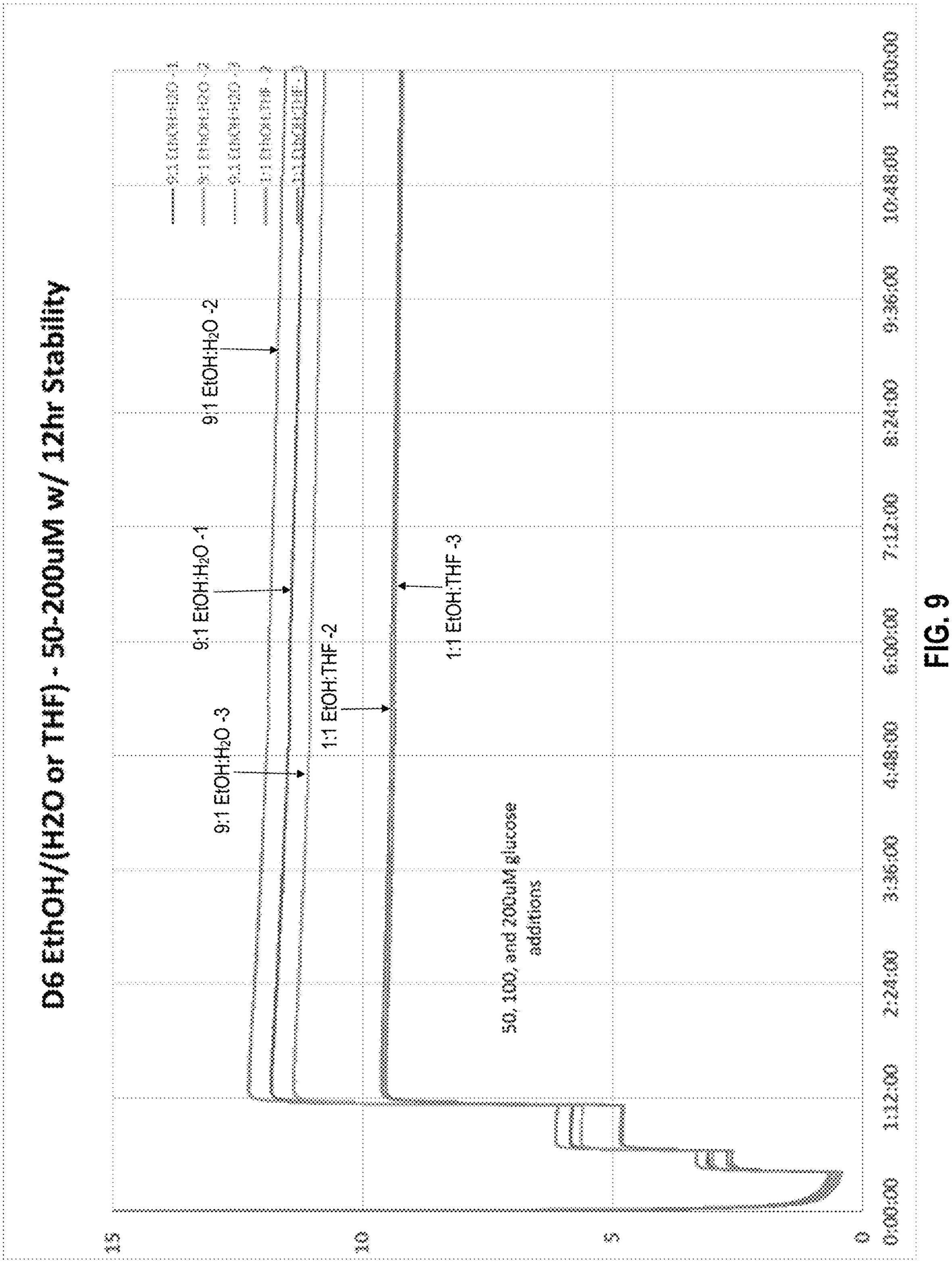
FIG. 9 shows a chronoamperometry of nA vs time for a glucose sensor according to certain embodiments of the present disclosure.

For example, but not by way of limitation, a glutamate sensing layer can include a glutamate oxidase as shown in FIG. 9. In certain embodiments, a glutamate-responsive sensing layer contains a glutamate oxidase ("GlutOx" in FIG. 9) that converts L-glutamate into α-ketoglutarate (also referred to as "α-ketoglutaric acid") and reduces glutamate oxidase. The reduced form of the glutamate oxidase can then transfer electron(s) to a redox mediator, which in turn can then be oxidized at an anode, i.e., the working electrode. The electrons transferred during this reaction provide the basis for glutamate detection at the working electrode. The electrochemical signal obtained can then be correlated to the amount of glutamate that was initially present in the sample.

In certain embodiments, the enzyme can be an oxidoreductase. In certain embodiments, the oxidoreductase can be an enzyme belonging to enzyme class 1. For example, but not by way of limitation, the enzyme can belong to enzyme class 1.1 (e.g., 1.1.1 or 1.1.3), enzyme class 1.4 (e.g., 1.4.3) or enzyme class 1.5. In certain embodiments, the enzyme can be a NAD(P)+-dependent dehydrogenase. In certain embodiments, the enzyme can be a flavin adenine dinucleotide (FAD)-dependent oxidoreductase. In certain embodiments, the enzyme can be a hydrolase. In certain embodiments, the hydrolase can be an enzyme belonging to enzyme class 3. For example, but not by way of limitation, the enzyme can belong to enzyme class 3.5, e.g., 3.5.2 or 3.5.3.

In certain embodiments, the one or more enzymes can be present in the active area in various amounts. For example, but not by way of limitation, the enzyme can be present in the active area in amount from about 0.005 μg to about 20 μg, e.g., from about 0.005 μg to about 15 μg, from about 0.005 μg to about 10 μg, from about 0.005 μg to about 5 μg, from about 0.01 μg to about 20 μg, from about 0.01 μg to about 15 μg, from about 0.01 μg to about 10 μg, from about 0.01 μg to about 5 μg, 0.01 μg to about 3 μg, from about 0.1 μg to about 15 μg, from about 0.1 μg to about 10 μg, from about 0.1 μg to about 5 μg, from about 1 μg to about 20 μg, from about 1 μg to about 15 μg, from about 1 μg to about 10 μg, from about 1 μg to about 5 μg or from about 5 μg to about 20 μg. In certain embodiments, the enzyme is present in the active area in an amount from about 1 μg to about 20 μg. In certain embodiments, the enzyme is present in the active area in an amount from about 0.01% to about 100% by weight of the active area composition, such as, but not limited to, from about 0.1% to about 95% by weight, from about 0.1% to about 90% by weight, from about 0.1% to about 85% by weight, from about 0.1% to about 80% by weight, from about 0.1% to about 75% by weight, from about 0.1% to about 70% by weight, from about 0.1% to about 65% by weight, from about 0.1% to about 60% by weight, from about 0.1% to about 55% by weight, from about 0.1% to about 50% by weight, from about 0.1% to about 45% by weight, from about 0.1% to about 40% by weight, from about 0.1% to about 35% by weight, from about 0.1% to about 30% by weight, from about 0.1% to about 25% by weight, from about 0.1% to about 20% by weight, from about 0.1% to about 15% by weight or from about 0.1% to about 10% by weight or any values in between based on the weight of the total active area composition. In certain embodiments, the enzyme is present in the active area in an amount from about 5% to about 20% by weight of the active area composition.

In certain embodiments, an analyte-responsive active area, e.g., present on a working electrode, of an analyte sensor of the present disclosure can include one or more enzymes that can be used to detect glucose. For example, but not by way of limitation, an analyte sensor of the present disclosure can include an active area that comprises one or more enzymes for detecting glucose, e.g., disposed on a first working electrode. In certain embodiments, a glucose-responsive active area can include one or more enzymes, as described in U.S. Pat. No. 8,268,143 (the contents of which are incorporated by reference herein in their entirety). In certain embodiments, the analyte sensor can include an active site comprising a glucose oxidase and/or a glucose dehydrogenase for detecting glucose. In certain embodiments, the glucose dehydrogenase can be a pyrroloquinoline quinone (PQQ) or a cofactor-dependent glucose dehydrogenase, e.g., flavin adenine dinucleotide (FAD)-dependent glucose dehydrogenase or nicotinamide adenine dinucleotide (NAD)-dependent glucose dehydrogenase. In certain embodiments, the active area can further include diaphorase. In certain embodiments, the active area can further include diaphorase. In certain embodiments, the enzyme for detecting glucose is an FAD-dependent glucose oxidase.

In certain embodiments, an analyte-responsive active area, e.g., present on a working electrode, of an analyte sensor of the present disclosure can include one or more enzymes that can be used to detect ketones. For example, but not by way of limitation, an analyte sensor of the present disclosure can include an active area that comprises one or more enzymes, e.g., an enzyme system, for detecting ketones, e.g., disposed on a first working electrode. In certain embodiments, a ketones-responsive active area can include an enzyme system comprising multiple enzymes that are capable of acting in concert to facilitate detection of ketones, as described in U.S. Patent Publication No. 2020/0237275 (the contents of which are incorporated by reference herein in their entirety). In certain embodiments, the analyte sensor can include an active site comprising p-hydroxybutyrate dehydrogenase for detecting ketones. In certain embodiments, the active area can further include diaphorase.

In certain embodiments, an analyte-responsive active area, e.g., present on a working electrode, of an analyte sensor of the present disclosure can include one or more enzymes that can be used to detect lactate. For example, but not by way of limitation, an analyte sensor of the present disclosure can include an active area that comprises one or more enzymes, e.g., an enzyme system, for detecting lactate, e.g., disposed on a first working electrode. In certain embodiments, a lactate-responsive active area can include an enzyme system comprising multiple enzymes that are capable of acting in concert to facilitate detection of lactate, as described in U.S. Publication No. 2019/0320947 (the contents of which are incorporated by reference herein in their entirety). In certain embodiments, the analyte sensor can include an active site comprising a lactate dehydrogenase and/or a lactate oxidase. In certain embodiments, the active area can further include diaphorase.

In certain embodiments, an analyte-responsive active area, e.g., present on a working electrode, of an analyte sensor of the present disclosure can include one or more enzymes that can be used to detect alcohol, e.g., ethanol. For example, but not by way of limitation, an analyte sensor of the present disclosure can include an active area that comprises one or more enzymes, e.g., an enzyme system, for detecting alcohol, e.g., disposed on a first working electrode. In certain embodiments, an ethanol-responsive active area can include an enzyme system comprising multiple enzymes that are capable of acting in concert to facilitate detection of ethanol, as in U.S. Patent Publication No. 2020/0237277 (the contents of which are incorporated by reference herein in their entirety). In certain embodiments, the analyte sensor can include an active site comprising an alcohol dehydrogenase or a ketoreductase.

In certain embodiments, an analyte-responsive active area, e.g., present on a working electrode, of an analyte sensor of the present disclosure can include one or more enzymes that can be used to detect creatinine. For example, but not by way of limitation, an analyte sensor of the present disclosure can include an active area that comprises one or more enzymes, e.g., an enzyme system, for detecting creatinine, e.g., disposed on a first working electrode. In certain embodiments, a creatinine-responsive active area can include an enzyme system comprising multiple enzymes that are capable of acting in concert to facilitate detection of creatinine, e.g., as described in U.S. Patent Publication No. 2020/0241015 (the contents of which are incorporated by reference herein in their entirety). In certain embodiments, the analyte sensor can include an active site comprising an amidohydrolase, creatine amidinohydrolase and/or sarcosine oxidase.

In certain embodiments, an analyte-responsive active area, e.g., present on a working electrode, of an analyte sensor of the present disclosure can include one or more enzymes that can be used to detect glutamate. For example, but not by way of limitation, an analyte sensor of the present disclosure can include an active area that comprises one or more enzymes, e.g., an enzyme system, for detecting glutamate, e.g., disposed on a first working electrode. In certain embodiments, the analyte sensor can include an active site comprising a glutamate dehydrogenase or a glutamate oxidase.

In certain embodiments, a sensor of the present disclosure does not include an analyte-responsive active area comprising an enzyme. In certain embodiments, a sensor of the present disclosure includes a working electrode that does not have an enzyme disposed upon the working electrode or includes an inactive enzyme, e.g., an enzyme that lacks enzymatic activity (e.g., for the analyte of interest), disposed upon the working electrode. In certain embodiments, such a sensor can be used to detect an analyte that can be directly oxidized at the working electrode. For example, but not by way of limitation, a sensor of the present disclosure for detecting ascorbate does not include an enzyme on the working electrode. In certain embodiments, ascorbate is directly oxidized at the working electrode resulting in a signal that correlates to the level of ascorbate in the biological fluid contacting the sensor.

In certain embodiments, a working electrode that does not include an enzyme or includes an inactive enzyme can be used for detecting a background signal. In certain embodiments, the background signal includes a signal that is caused by chemical species other than the analyte of interest present in the sample, e.g., signal caused by an interferent. In certain embodiments, the background signal is a signal caused by one or more interferents. Non-limiting examples of interferents include acetaminophen, ascorbate, ascorbic acid, bilirubin, cholesterol, creatinine, dopamine, ephedrine, ibuprofen, L-dopa, methyldopa, salicylate, tetracycline, tolazamide, tolbutamide, triglycerides, urea and uric acid. In certain embodiments, the background signal can be used to calibrate, filter and/or normalize the signal obtained from a second working electrode (which is configured for detecting an analyte) present on the same analyte sensor. In certain embodiments, the signal from the working electrode that does not have enzyme (or has inactive enzyme) can be subtracted from the signal obtained from a working electrode that is configured to detect an analyte to determine the signal contribution from the analyte.

In certain embodiments, an analyte-responsive active area, e.g., an analyte-responsive active area, can further include a cofactor or coenzyme for one or more enzymes present in the analyte-responsive active area. In certain embodiments, the cofactor is nicotinamide adenine dinucleotide (NAD) or nicotinamide adenine dinucleotide phosphate (NADP) (referred to herein collectively as "NAD(P) "). In certain embodiments, the coenzyme is FAD. In certain embodiments, the analyte-responsive active area can include from about 1% to about 50% by weight, e.g., from about 10% to about 50%, from about 15% to about 45%, from about 20% to about 40%, from about 20% to about 35%, from about 20% to about 30%, from about 1% to about 20%, from about 1% to about 10% or from about 1% to about 5% by weight, of the cofactor. In certain embodiments, the analyte-responsive active area can include from about 1% to about 20% by weight of the cofactor. In certain embodiments, the analyte-responsive active area can include from about 1% to about 10% by weight of the cofactor. In certain embodiments, the analyte-responsive active area can include from about 15% to about 35% by weight of the cofactor. In certain embodiments, the cofactor, e.g., NAD(P) or FAD, can be physically retained within the analyte-responsive active area. For example, but not by way of limitation, a membrane overcoating the analyte-responsive active area can aid in retaining the cofactor within the analyte-responsive active area while still permitting sufficient inward diffusion of the analyte to permit detection thereof.

The sensing layer can further comprise an albumin, which can act as an enzyme stabilizer (e.g., a stabilizing agent). In an embodiment, the albumin can be a serum albumin, such as bovine serum albumin or human serum albumin. In certain embodiments, the sensing layer can further comprise bovine serum albumin. In certain embodiments, an analyte-responsive active area can include by weight from about 5% to about 50%, e.g., from about 10% to about 50%, from about 15% to about 45%, from about 20% to about 40%, from about 20% to about 35% or from about 20% to about 30% of the stabilizer. In certain embodiments, the analyte-responsive active area can include from about 5% to about 40% of the stabilizing agent (e.g., albumin) by weight. In certain embodiments, the analyte-responsive active area can include from about 5% to about 35% of the stabilizing agent (e.g., albumin) by weight. In certain embodiments, the sensing layer can include from about 5% to about 30% of the stabilizing agent (e.g., albumin) by weight. In certain embodiments, the sensing layer can include from about 10% to about 30% of the stabilizing agent (e.g., albumin) by weight. In certain embodiments, the sensing layer can include from about 15% to about 35% of the stabilizing agent (e.g., albumin) by weight.

In certain embodiments, the sensing layer can include a ratio of albumin stabilizer to enzyme from about 40:1 to about 1:40, e.g., from about 35:1 to about 1:35, from about 30:1 to about 1:30, from about 25:1 to about 1:25, from about 20:1 to about 1:20, from about 15:1 to about 1:15, from about 10:1 to about 1:10, from about 9:1 to about 1:9, from about 8:1 to about 1:8, from about 7:1 to about 1:7, from about 6:1 to about 1:6, from about 5:1 to about 1:5, from about 4:1 to about 1:4, from about 3:1 to about 1:3, from about 2:1 to about 1:2 or about 1:1. In certain embodiments, the sensing layer can include a ratio of albumin stabilizer to enzyme from about 1:1 to about 1:10, e.g., from about 1:1 to about 1:9, from about 1:1 to about 1:8, from about 1:1 to about 1:7, from about 1:1 to about 1:6, from about 1:1 to about 1:5, from about 1:2 to about 1:9, from about 1:3 to about 1:8, from about 1:3 to about 1:7 or from about 1:4 to about 1:6.

In any of the embodiments, the sensing layer can comprise a pH buffer. The buffer can be any suitable composition that is water soluble and controls (i.e., maintains) the pH of the sensing composition within a pH of about 5 to about 8 (e.g., maintains a pH of about 5, about 5.5, about 6, about 6.5, about 7, about 7.5, or about 8). In some embodiments, the pH can be controlled to be within a range of about 6 to about 8. For example, the buffer can comprise a phosphate (e.g., monobasic and dibasic sodium phosphate), 4-(2-hydroxyethyl)piperazine-1-ethanesulfonic acid (HEPES), 3-(N-morpholino) propanesulfonic acid (MOPS), 2-amino-2-(hydroxymethyl)-1,3-propanediol (TRIS), a carbonate (e.g., carbonic acid and a carbonate salt, such as sodium carbonate; sodium carbonate and sodium bicarbonate), or a citrate (e.g., citric acid and a citrate salt, such as trisodium citrate). The buffer can optionally comprise one or more (e.g., 1, 2, 3, or 4) additional salts (e.g., Group I or Group II halide salts, e.g., sodium chloride, potassium chloride, magnesium chloride). In an embodiment, the buffer can be phosphate-buffered saline (PBS), which comprises disodium hydrogen phosphate, sodium chloride, and optionally potassium chloride and potassium dihydrogen phosphate. In another embodiment, the buffer can be HEPES or a phosphate buffer that can comprise phosphate, sodium chloride, and magnesium chloride.

The buffer typically is an aqueous buffer but other non-aqueous solvents can be present, such as an alcohol (e.g., ethanol). In some embodiments, the buffer comprises water as the only solvent. In other embodiment, the buffer can comprise water and at least one (e.g., 1, 2, or 3) non-aqueous solvents in any suitable ratio, such as a non-aqueous solvent to water volume ratio ranging from 99.9:0.1 to 0.1:99.9. In some embodiments, the non-aqueous solvent to water volume ratio is about 1:99, about 5:95, about 10:90, about 15:85, about 20:80, about 25:75, about 30:70, about 35:65, about 40:60, about 45:55, about 50:50, about 55:45, about 60:40, about 65:35, about 70:30, about 75:25, about 80:20, about 85:15, about 90:10, about 95:5, or about 99:1, etc.). In a specific example, ethanol (EtOH) and water are used in a volume ratio ranging from 50:50 to 90:10 EtOH:$H_2O$ (e.g., 70:30, about 75:25, about 80:20, about 85:15, or about 90:10, etc.).

Electron Transfer Agent

In certain embodiments, an analyte-responsive active area can include one or more electron transfer agents. For example, but not way of limitation, an analyte sensor of the present disclosure can include a sensor tail with at least a first working electrode and an analyte-responsive active area disposed upon a surface of the first working electrode, where the analyte-responsive active area comprises an electron transfer agent and one or more enzymes responsive to the analyte.

In certain embodiments, an analyte sensor of the present disclosure can include two or more active areas, where each active area includes an electron transfer agent. Alternatively, an analyte sensor of the present disclosure can include two or more active areas, where only one active area includes an electron transfer agent.

Suitable electron transfer agents for use in the analyte sensors of the present disclosure can facilitate conveyance of electrons to the adjacent working electrode after an analyte undergoes an enzymatic oxidation-reduction reaction within the corresponding active area, thereby generating a current that is indicative of the presence of that particular analyte. The amount of current generated is proportional to the quantity of analyte that is present. For example, and not by the way of limitation, the electron transfer agent transfers electrons between the working electrode through an oxidoreductase, e.g., an NAD(P)-dependent oxidoreductase.

In certain embodiments, suitable electron transfer agents can include electroreducible and electrooxidizable ions, complexes or molecules (e.g., quinones) having oxidation-reduction potentials that are a few hundred millivolts above or below the oxidation-reduction potential of the standard calomel electrode (SCE). In certain embodiments, the electron transfer agent can include osmium complexes and other transition metal complexes, such as those described in U.S. Pat. Nos. 6,134,461 and 6,605,200 and U.S. Patent Publication No. 2022/0202326, which are incorporated herein by reference in their entireties. Additional examples of suitable redox mediators include those described in U.S. Pat. Nos. 6,736,957, 7,501,053 and 7,754,093, the disclosures of each of which are also incorporated herein by reference in their entirety. Other examples of suitable electron transfer agents include metal compounds or complexes of ruthenium, osmium, iron (e.g., polyvinylferrocene or hexacyanoferrate), or cobalt, including metallocene compounds thereof, for example. Suitable ligands for the metal complexes can also include, for example, bidentate or higher denticity ligands such as, for example, bipyridine, biimidazole, phenanthroline, or pyridyl(imidazole). Other suitable bidentate ligands can include, for example, amino acids, oxalic acid, acetylacetone, diaminoalkanes, or o-diaminoarenes. Any combination of monodentate, bidentate, tridentate, tetradentate or higher denticity ligands can be present in a metal complex to achieve a full coordination sphere. In certain embodiments, the electron transfer agent is an osmium complex. In certain embodiments, the electron transfer agent is osmium complexed with bidentate ligands. In certain embodiments, the electron transfer agent is osmium complexed with tridentate ligands.

In an embodiment, the sensing layer comprises a redox mediator that can comprise a polymer and an electron transfer agent.

The polymer in the redox mediator can be any suitable polymer that allows the transfer of electrons between the electron transfer agent and the working electrode. Illustrative copolymers that can be suitable for inclusion in the active areas include those containing monomer units such as styrene, acrylamide, methacrylamide, or acrylonitrile. For example, the polymer can be, poly(4-vinylpyridine), poly(1-vinylimidazole), poly(thiophene), poly(aniline), poly(pyrrole), poly(acetylene), poly(acrylic acid), styrene/maleic anhydride copolymer, methylvinylether/maleic anhydride copolymer, poly(vinylbenzylchloride), poly(allylamine), poly(lysine), poly(acrylamide-co-1-vinyl imidazole), poly(4-vinylpyridine) quaternized with carboxypentyl groups, and poly(sodium 4-styrene sulfonate). In certain embodiments, the polymer can be a copolymer of vinylpyridine and styrene. Additional non-limiting examples of polymers that can be present in the active area include those described in U.S. Pat. No. 6,605,200, incorporated herein by reference in its entirety, such as poly(acrylic acid), styrene/maleic anhydride copolymer, methylvinylether/maleic anhydride copolymer (GANTREZ polymer), poly(vinylbenzylchloride), poly(allylamine), polylysine, poly(4-vinylpyridine) quaternized with carboxypentyl groups, and poly(sodium 4-styrene sulfonate). In certain embodiments where the analyte sensor includes two active sites, the polymer within each active area can be the same or different.

The polymers can be considered precursor polymers in that the polymers are further modified to immobilize (e.g., attach) the electron transfer complex. In some embodiments, the polymer can comprise a poly(4-vinylpyridine), poly(1-vinylimidazole), poly(thiophene), poly(aniline), poly(pyrrole), or poly(acetylene) backbone. In other embodiments, the polymer can comprise a polymer or copolymer repeat unit that can comprise at least one (e.g., 1, 2, 3, 4, 5, or 6) pendant pyridinyl group, imidazolyl group, or both a pyridinyl and imidazolyl group. For example, a suitable polymer includes partially or fully quaternized poly(4-vinylpyridine) and poly(1-vinylimidazole) in which quaternized pyridine and imidazole groups, respectively, can be used to form spacers by reaction with (e.g., complexation with) an electron transfer agent.

The electron transfer agent in the redox mediator typically comprises a transition metal complex. The transition metal in the transition metal complex can be any suitable transition metal that can be effectively reduced and oxidized in the method described herein. For example, the transition metal complex can comprise osmium, ruthenium, iron, cobalt, vanadium, or a combination thereof. In some embodiments, the transition metal can be ruthenium or osmium, particularly osmium. According to some embodiments, suitable electron transfer agents can include low-potential osmium complexes, such as those described in U.S. Pat. Nos. 6,134,461, 6,605,200, 6,736,957, 7,501,053, and 7,754,093, the disclosures of each of which are incorporated herein by reference in their entirety. Other suitable examples of electron transfer mediators and polymer-bound electron transfer mediators can include those described in U.S. Pat. Nos. 8,444,834, 8,268,143, and 6,605,201, the disclosures of which are incorporated herein by reference in their entirety.

The transition metal complex can further comprise at least one ligand, which can be monodentate or multidentate (e.g., bidentate, tridentate, tetradentate). Typically the complex will include enough ligands to provide a full coordination sphere. In some embodiments, at least one ligand (e.g., 1, 2, 3, 4, 5, or 6) can comprise a nitrogen-containing heterocycle.

Monodentate ligands include, for example, —F, —Cl, —Br, —I, —CN, —SCN, —OH, $NH_3$, alkylamine, dialkylamine, trialkylamine, alkoxy, a heterocyclic compound, compounds containing such groups, a solvent molecule (e.g., $H_2O$, EtOH), or a reactive group. For example, an alkyl (e.g., $C_{1-12}$, $C_{1-6}$, $C_{1-4}$, $C_{1-3}$) or aryl (e.g., phenyl, benzyl, naphthyl) portions of a ligand can be optionally substituted by F, Cl, Br, I, alkylamino, dialkylamino, trialkylammonium (except aryl portions), alkoxy, alkylthio, aryl. Examples of suitable heterocyclic monodentate ligands include imidazole, pyrazole, oxazole, thiazole, pyridine, and pyrazine, each of which can be unsubstituted or substituted, as described herein (e.g., with at least one reactive group, such as 1, 2, 3, or 4 reactive groups).

Examples of suitable bidentate ligands include, for example, 1,10-phenanthroline, an amino acid, oxalic acid, acetylacetone, a diaminoalkane, an ortho-diaminoarene, 2,2'-biimidazole, 2,2'-bioxazole, 2,2'-bithiazole, 2-(2-pyridyl)imidazole, and 2,2'-bipyridine, each of which can be unsubstituted or substituted, as described herein (e.g., substituted with at least one reactive group, such as 1, 2, 3, or 4 reactive groups). Particularly suitable bidentate ligands for the electron transfer complex include substituted and unsubstituted 2,2'-biimidazole, 2-(2-pyridyl)imidazole, and 2,2'-bipyridine. Examples of suitable terdentate ligands include, for example, diethylenetriamine, 2,2',2"-terpyridine, 2,6-bis(N-pyrazolyl)pyridine, each of which can substituted or unsubstituted (e.g., substituted with one more alkyl groups, such as methyl, or one or more reactive groups).

A suitable 2,2'-biimidazole ligand can be a ligand according to formula (I):

(I)

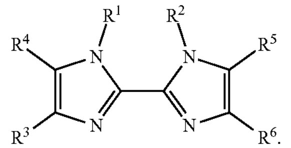

In formula (I), $R^1$ and R are the same or different and each is a substituted or unsubstituted alkyl, alkenyl, or aryl. Generally, $R^1$ and $R^2$ are the same or different and each is an unsubstituted $C_{1-12}$ alkyl (e.g., $C_{1-4}$ alkyl). In some embodiments, both $R^1$ and $R^2$ are methyl.

In formula (I), $R^3$, $R^4$, $R^5$, and $R^6$ are the same or different and each is H, F, Cl, Br, I, $NO_2$, CN, $CO_2H$, $SO_3H$, SH, alkoxycarbonyl, alkylaminocarbonyl, dialkylaminocarbonyl, hydroxy, alkoxy, amino, alkylamino, dialkylamino, alkanoylamino, arylcarboxamido, hydrazino, alkylhydrazino, hydroxylamino, alkoxyamino, alkylthio, alkyl, alkenyl, or aryl. Alternatively, $R^3$ and $R^4$, in combination, or $R^5$ and $R^6$, in combination, independently form a saturated or unsaturated 5- or 6-membered ring (e.g., benzo). Typically, the alkyl and alkoxy portions are $C_{1-12}$. The alkyl or aryl portions of any of the substituents can be optionally substituted by one or more substituents (e.g., 1, 2, 3, 4, 5, or 6), such as F, Cl, Br, I, amino, alkylamino, dialkylamino, trialkylammonium (except on aryl portions), alkoxy, alkylthio, aryl, or a reactive group (e.g., $CO_2H$). Generally, $R^3$, $R^4$, $R^5$, and $R^6$ are the same or different and each is H or an unsubstituted $C_{1-12}$ alkyl (e.g., $C_{1-4}$ alkyl). In some embodiments, $R^3$, $R^4$, $R^5$, and $R^6$ are all H.

A suitable 2-(2-pyridyl)imidazole ligand can be a ligand according to formula (II):

(II)

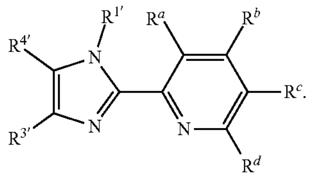

In formula (II), $R^1$ is a substituted or unsubstituted alkyl, alkenyl, or aryl. Generally, $R^1$ is an unsubstituted $C_{1-12}$ alkyl (e.g., $C_{1-4}$ alkyl) or a $C_{1-12}$ alkyl that is optionally substituted with a reactive group. In some embodiments, $R^1$ is methyl.

In formula (II), $R^{3'}$, $R^{4'}$, $R^a$, $R^b$, $R^c$, and $R^d$ are the same or different and each is H, F, Cl, Br, I, $NO_2$, CN, $CO_2H$, $SO_3H$, SH, alkoxycarbonyl, alkylaminocarbonyl, dialkylaminocarbonyl, hydroxy, alkoxy, amino, alkylamino, dialkylamino, alkanoylamino, arylcarboxamido, hydrazino, alkylhydrazino, hydroxylamino, alkoxyamino, alkylthio, alkyl, alkenyl, or aryl. Alternatively, $R^{3'}$ and $R^{4'}$, in combination, or two adjacent substituents of $R^a$, $R^b$, $R^c$, and $R^d$ (e.g., $R^a$ and $R^b$, $R^b$ and $R^c$, or $R^c$ and $R^d$) in combination, independently form a saturated or unsaturated 5- or 6-membered ring (e.g., benzo). Typically, the alkyl and alkoxy portions are $C_{1-12}$. The alkyl or aryl portions of any of the substituents can be optionally substituted by one or more substituents (e.g., 1, 2, 3, 4, 5, or 6), such as F, Cl, Br, I, amino, alkylamino, dialkylamino, trialkylammonium (except on aryl portions), alkoxy, alkylthio, aryl, or a reactive group (e.g., $CO_2H$). Generally, $R^{3'}$, $R^{4'}$, $R^a$, $R^b$, $R^c$, and $R^d$ are the same or different and each is H or an unsubstituted $C_{1-12}$ alkyl (e.g., $C_{1-4}$ alkyl). In some embodiments, $R^{3'}$, $R^{4'}$, $R^a$, $R^b$, $R^c$, and $R^d$ are all H.

A suitable 2,2'-bipyridine ligand can be a ligand according to formula (III):

(III)

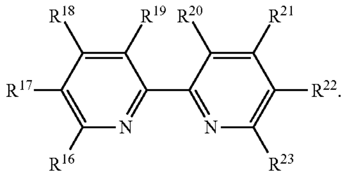

In formula (III), $R^{16}$, $R^{17}$, $R^{18}$, $R^{19}$, $R^{20}$, $R^{21}$, $R^{22}$, and $R^{23}$ are the same or different and each is H, F, Cl, Br, I, $NO_2$, CN, $CO_2H$, $SO_3H$, SH, alkoxycarbonyl, alkylaminocarbonyl, dialkylaminocarbonyl, hydroxy, alkoxy, amino, alkylamino, dialkylamino, alkanoylamino, arylcarboxamido, hydrazino, alkylhydrazino, hydroxylamino, alkoxyamino, alkylthio, alkyl, alkenyl, or aryl. Typically, the alkyl and alkoxy portions are $C_{1-12}$. The alkyl or aryl portions of any of the substituents can be optionally substituted by one or more substituents (e.g., 1, 2, 3, 4, 5, or 6), such as F, Cl, Br, I, amino, alkylamino, dialkylamino, trialkylammonium (except on aryl portions), alkoxy, alkylthio, aryl, or a reactive group (e.g., $CO_2H$).

Specific examples of suitable combinations include $R^{16}$ and $R^{23}$ are both H or both methyl and/or $R^{17}$ and $R^{23}$ are both H or both methyl and/or $R^{18}$ and $R^{21}$ are both H or both methyl and/or $R^{19}$ and $R^{20}$ are both H or both methyl. An alternative combination is where one or more adjacent pairs of substituents (e.g., $R^{16}$ and $R^{17}$, $R^{17}$ and $R^{18}$, $R^{18}$ and $R^{19}$, $R^{23}$ and $R^{22}$, $R^{22}$ and $R^{21}$, or $R^{21}$ and $R^{20}$), in combination, form a saturated or unsaturated 5- or 6-membered ring (e.g., benzo).

In an embodiment, the one or more ligand is 4,4'-dimethyl-2,2'-bipyridine, mono-, di-, or polyalkoxy-2,2'-bipyridines (e.g., 4,4'-dimethoxy-2,2'-bipyridine), 4,7-dimethyl-1,10-phenanthroline, mono, di-, or polyalkoxy-1,10-phenanthrolines (e.g., 4,7-dimethoxy-1,10-phenanthroline), or a combination of any of these.

In some embodiments, the transition metal complex will include a counterion (X) to balance the charge of the transition metal. Typically, there will be 1 to 5 (i.e., 1, 2, 3, 4, or 5) counterions. Multiple counterions in the complex are not necessarily all the same. Examples of suitable counterions include anions, such as halide (e.g., fluoride, chloride, bromide, or iodide), sulfate, phosphate, hexafluorophosphate, and tetrafluoroborate, and cations (e.g., a monovalent cation), such as lithium, sodium, potassium, tetralkylammonium, and ammonium. In some embodiments, the counterion is a halide, such as chloride.

In an embodiment, the transition metal complex can be an osmium transition metal complex that can comprise one or more ligands, wherein at least one (e.g., 1, 2, 3, 4, 5, or 6) ligand that can comprise a nitrogen-containing heterocycle (e.g., imidazole, pyrazole, oxazole, thiazole, pyridine, and pyrazine). In some embodiments, the osmium transition metal complex can comprise one or more ligands selected from 4,4'-dimethyl-2,2'-bipyridine, mono-, di-, or polyalkoxy-2,2'-bipyridines (e.g., 4,4'-dimethoxy-2,2'-bipyridine), 4,7-dimethyl-1,10-phenanthroline, mono, di-, or polyalkoxy-1,10-phenanthrolines (e.g., 4,7-dimethoxy-1,10-phenanthroline).

In an embodiment, the redox mediator can comprise an osmium complex bonded to a polymer or copolymer of poly(1-vinyl imidazole) or poly(4-vinylpyridine). The poly (4-vinylpyridine)-based polymer is a prepolymer that has been modified, as shown in the following structure, to attach an osmium complex (e.g., a poly(biimidizyl) osmium complex).

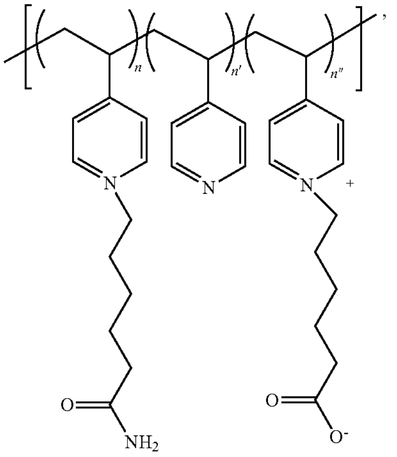

wherein n can be 2, n' can be 17, and n" can be 1. Other reactive groups and/or spacer groups can be used.

In an embodiment, the electron redox mediator can comprise an osmium-containing poly(4-vinylpyridine)-based polymer, referred to herein as "X7," as shown below.

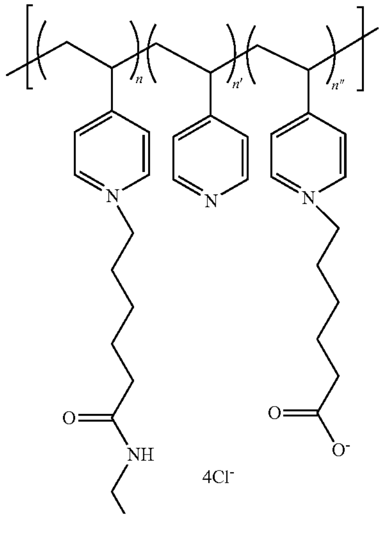

-continued

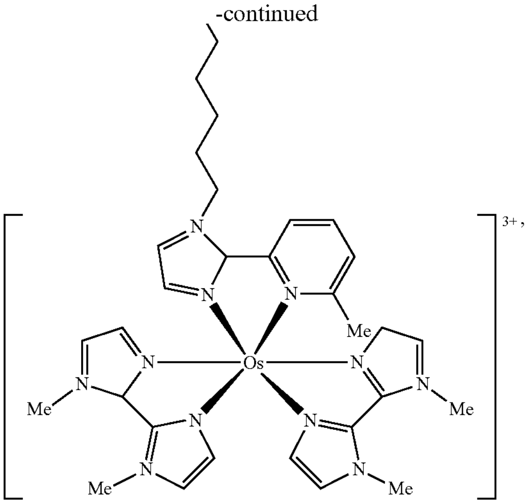

wherein n is 2, n' is 17, and n" is 1.

The electron transfer agent typically is attached (e.g., non-leachable and/or covalently bonded) to the polymer in the redox material. For example, covalent bonding of the electron transfer agent to the polymer can take place by polymerizing a monomer unit bearing a covalently bound electron transfer agent, or the electron transfer agent can be reacted with the polymer separately after the polymer has already been synthesized.

According to some embodiments, a bifunctional spacer can be used to attached (e.g., covalently bond) the electron transfer agent to the polymer in the redox material, with a first reactive group being reactive with the polymer (e.g., a functional group capable of quaternizing a pyridine nitrogen atom or an imidazole nitrogen atom) and a second reactive group being reactive with the electron transfer agent (e.g., a functional group that is reactive with a ligand coordinating a metal ion). Typically, covalent bonds are formed between the two reactive groups to generate a linkage. Suitable reactive groups include, for example, activated ester (e.g., succinimidyl, benzotriazolyl, or an aryl substituted with one more electron withdrawing groups, such as sulfo, nitro, cyano, or halo), acrylamido, acyl azido, acyl halide, carboxy (—COO— or —$CO_2H$), aldehyde, ketone, alkyl halide, alkyl sulfonato, anhydride, aziridino, epoxy, halotriazinyl, imido ester, isocyanato, isothiocyanato, maleimido, sulfonyl halide, amino, thiol (—SH), hydroxy, pyridinyl, imidazolyl, and hydroxyamino. The reaction between two reactive groups can form a covalent linkage between the transition metal complex and the polymer that is a carboxamido, thioether, hydrazonyl, oximyl, alkyamino, ester, carboxylic ester, imidazolium, pyridinium, ether, thioether, aminotriazinyl, triazinyl ether, amidinyl, urea, urethanyl, thiourea, thioether, sulfonamide, or any combination. In addition to the reactive groups, the bifunctional spacer typically can further comprise an alkylenyl (i.e., $—(CH_2)_n—$) and/or ethylenyloxy (i.e., $—(CH_2CH_2O)_m—$, in which n and m are each independently an integer from 1 to 12 (e.g., 1 to 11, 1 to 10, 1 to 9, 1 to 8, 1 to 7, 1 to 6, 1 to 5, 1 to 4, 1 to 3, or 1 to 2).

In some embodiments, the sensing layer, and in particular, the redox mediator can further comprise a cross linking agent. In general, the cross linking agent is any suitable multifunctional (e.g., bifunctional) short chain molecule that enables the electron transfer agent to attach (e.g., covalently bond) to the polymer of the redox mediator. For example, the cross linking agent can be include a polyepoxide (e.g., a polyethylene glycol diglycidylether (PEGDGE), ethylene glycol diglycidyl ether (EGDGE), resorcinol diglycidyl ether, 1,2,7,8-diepoxyoctane, Gly3), cyanuric chloride, N-hydroxysuccinimide, an imidoester, epichlorohydrin, or a combination thereof. In an embodiment, the cross linking agent is a polyethylene glycol diglycidylether (PEGDGE) of the following formula:

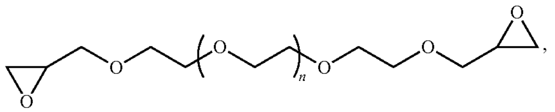

wherein n is an integer from 1 to about 50 (e.g., 1 to about 45, 1 to about 40, 1 to about 35, 1 to about 30, 1 to about 25, about 5 to about 50, about 5 to about 45, about 5 to about 40, about 5 to about 35, or about 5 to about 30).

In a particular example, the PEGDGE is PEGDGE200, PEGDGE400 (n is 10), PEGDGE500, PEGDGE600, PEGDGE1000, or PEGDGE2000, in which the number denotes the average molecular weight ($M_n$). In an embodiment, the crosslinking agent is PEGDGE400.

In certain embodiments, one or more working electrodes of an analyte sensor of the present disclosure does not have a redox mediator disposed upon the working electrode. In certain embodiments, one or more working electrodes of an analyte sensor of the present disclosure does not have a redox mediator or an enzyme disposed upon the working electrode. In certain embodiments, such working electrodes can be used to detect an analyte that can be directly oxidized at the working electrode.

In an embodiment, at least a portion of the analyte (e.g., glucose) present in the sensing layer is non-leachably attached to the redox mediator. In some embodiments, the enzyme is covalently attached to the polymer portion of the redox mediator. Covalent bonding of the enzyme to the redox material (e.g., polymer) can take place via the cross-linking agent, as described herein, and a reactive site on the enzyme. Thus, the enzyme is electronically “wired” to a working electrode through the redox material. In an embodiment, a hydrogel is formed upon crosslinking the enzyme and its wire on electrodes. In another embodiment, at least a portion of the enzyme can diffuse into the hydrogel and becomes attached but not necessarily covalently bonded to the polymer.

In certain embodiments, an analyte sensor of the present disclosure can comprise a sensor tail comprising at least a first working electrode, a first active area disposed upon a surface of the first working electrode and a mass transport limiting membrane permeable to the first analyte that directly overcoats at least the first active area. In certain embodiments, the first active area includes one or more enzymes for detecting an analyte. In certain embodiments, the first active area does not include an enzyme. In certain embodiments, the first active area comprises a first polymer and at least one enzyme covalently bonded to the first polymer and responsive to a first analyte. In certain embodiments, the mass transport limiting membrane includes a polyurethane. In certain embodiments, the mass transport limiting membrane includes a composite of a polyurethane and a second polymer, e.g., a hydrophilic polymer. In certain embodiments, the mass transport limiting membrane includes a polymer, e.g., copolymer, of a polyurethane and a second polymer, e.g., a hydrophilic polymer.

In certain embodiments, the analyte sensor comprises two active areas and the membrane can overcoat at least one of the active areas of the analyte sensor. In certain embodiments, one of the two active areas comprises an enzyme for detecting an analyte and the other active area does not include an enzyme and is used to detect background signal, e.g., generated by an interferent. In certain embodiments, the membrane overcoats each of the active areas of an analyte sensor. Alternatively, a first membrane can overcoat one of the active areas and a second membrane can overcoat the second active area. In certain embodiments, at least one of the membranes comprises a polyurethane. In certain embodiments, the other membrane comprises a different polymer.

In certain embodiments, a membrane of the present disclosure that includes one or more of the polymers disclosed herein with a thickness, e.g., a dry thickness, ranging from about 0.1 μm to about 1,000 μm, e.g., from about 1 μm to about 500 μm, from about 5 μm to about 100 μm, from about 10 μm to about 100 μm, from about 10 μm to about 90 μm, from about 10 μm to about 80 μm, from about 10 μm to about 70 μm, from about 10 μm to about 60 μm, from about 10 μm to about 50 μm, from about 10 μm to about 40 μm, from about 10 μm to about 30 μm, from about 10 μm to about 20 μm, from about 10 μm to about 15 μm, from about 20 μm to about 100 μm, from about 30 μm to about 100 μm, from about 40 μm to about 100 μm, from about 50 μm to about 100 μm, from about 60 μm to about 100 μm, from about 70 μm to about 100 μm, from about 80 μm to about 100 μm, from about 90 μm to about 100 μm, from about 20 μm to about 60 μm or from about 30 μm to about 50 μm. In certain embodiments, a membrane of the present disclosure that includes one of the polyurethane polymers disclosed herein has a thickness, e.g., a dry thickness, ranging from about 5 μm to about 100 μm. In certain embodiments, the thickness of the membranes of the present disclosure ranges from about 20 μm to about 50 μm, e.g., from about 25 μm to about 35 μm, from about 25 μm to about 30 μm or from about 20 μm to about 30 μm.

Interference Domain

In certain embodiments, a sensor of the present disclosure, e.g., sensor tail, can further comprise an interference domain. In certain embodiments, the interference domain can include a polymer domain that restricts the flow of one or more interferants, e.g., to the surface of the working electrode. In certain embodiments, the interference domain can allow analytes and other substances that are to be measured by the working electrode to pass through, while preventing passage of other chemical species such as interferents. In certain embodiments, the interferents can affect the signal obtained at the working electrode that is configured to detect an analyte of interest. Non-limiting examples of interferents include acetaminophen, ascorbate, ascorbic acid, bilirubin, cholesterol, creatinine, dopamine, ephedrine, ibuprofen, L-dopa, methyldopa, salicylate, tetracycline, tolazamide, tolbutamide, triglycerides, urea and uric acid.

In certain embodiments, the interference domain is located between the working electrode and one or more active areas disposed upon the working electrode. In certain embodiments, non-limiting examples of polymers that can be used in the interference domain include polyurethanes, polymers having pendant ionic groups and polymers having controlled pore size. In certain embodiments, the interference domain is formed from one or more cellulosic derivatives. Non-limiting examples of cellulosic derivatives include polymers such as cellulose acetate, cellulose acetate butyrate, 2-hydroxyethyl cellulose, cellulose acetate phthalate, cellulose acetate propionate and cellulose acetate trimellitate.

In certain embodiments, the interference domain is located between the one or more active areas and the mass transport limiting membrane. In certain embodiments, the interference domain is part of the mass transport limiting membrane and not a separate membrane.

In certain embodiments, the interference domain can be deposited directly onto the working electrode, e.g., onto the surface of the working electrode. In certain embodiments, the interference domain can be deposited directly onto the active area. In certain embodiments, the interference domain has a thickness, e.g., dry thickness, ranging from about 0.1 μm to about 1,000 μm, e.g., from about 1 μm to about 500 μm, about 10 μm to about 100 μm or about 10 μm to about 100 μm. In certain embodiments, the interference domain can have a thickness from about 0.1 μm to about 10 μm, e.g., from about 0.5 μm to about 10 μm, from about 1 μm to about 10 μm, from about 1 μm to about 5 μm or from about 0.1 μm to about 5 μm. In certain embodiments, the sensor can be dipped in the interference domain solution more than once. For example, but not by way of limitation, a sensor (or working electrode) of the present disclosure can be dipped in an interference domain solution at least twice, at least three times, at least four times or at least five times to obtain the desired interference domain thickness.

The present disclosure also relates to a system for sensing an analyte. In certain embodiments, the analyte can be, for example, glucose, lactate, ketone, glutamate, pyruvate, creatinine, sarcosine, alcohol (e.g., ethanol), or any combination thereof.

The analyte sensor can be part of a system that can comprise a working electrode, a sensing layer disposed on at least a portion of the working electrode, and a circuit configured to connect and disconnect with the working electrode. In an embodiment, the system can be a sensor (e.g., an enzymatic biosensor) comprising a working electrode, a sensing layer disposed on at least a portion of the working electrode, a hydrophilic polyurethane membrane comprising an aliphatic and/or aromatic polyurethane overcoating at least the sensing layer. In some embodiments, the sensing layer comprises at least one analyte responsive enzyme, one or more optional cofactors for the analyte responsive enzyme, X7 as the redox material, and albumin (e.g., BSA). In some embodiments, the analyte sensor or a system comprising the analyte sensor does not include a thermistor or any other element configured to provide an input for an algorithm as an estimate of the temperature of the sensing layer.

The sensing of the analyte (A) relies on having an oxidoreductase enzyme (AOx) electrically "wired" to the working electrode of the sensor through a redox material. During amperometric sensing, the electrode is poised at a potential (voltage) so that the analyte is reacted at a constant rate, which is proportional to the analyte concentration. For example, in an analyte sensor used herein, the potential (voltage) sufficient to drive the redox reaction is +40 mV vs. Ag/AgCl. For an analyte oxidation reaction (A to A+), the electrons will flow from the analyte (A) to the analyte-specific enzyme (AOx) to the redox material (e.g., $Os^{3+}$) to the working electrode at a constant rate, producing a steady-state current. The reduced form of the redox material will be oxidized, resulting in a current spike. The current will then decay back to the original amperometric current as the redox system reaches steady-state once again.

In an example, electrode contacts are positioned on a first portion of the sensor situated above the skin surface and extend to a location in sensor tail. A working electrode, a reference electrode, and a counter electrode are at a second portion of the sensor, typically at a bottom portion of the sensor tail. The working electrode will comprise a sensing layer (e.g., a first sensing layer) for detecting an analyte (e.g., a first analyte) and can optionally comprise a second sensing layer for detecting an analyte different from the first sensing layer, as described herein.

Method of Use

The present disclosure is also directed to a method for sensing an analyte comprising:

exposing an analyte sensor described herein to a biofluid comprising at least one analyte (e.g., glucose);

wherein the analyte sensor comprises a sensor tail comprising at least a first working electrode with a first sensing layer disposed upon a surface of the first working electrode, and optionally a second working electrode with a second sensing layer disposed upon a surface of the second working electrode, and a hydrophilic polyurethane membrane (i) formed from a polyurethane that is aliphatic, aromatic, or both aliphatic and aromatic and (ii) having a first portion overcoating the first sensing layer and an optional second portion overcoating the second sensing layer;

wherein the first sensing layer comprises a first analyte responsive enzyme, and the optional second sensing layer comprises a second analyte responsive enzyme that is different from the first analyte responsive enzyme;

applying a potential to the first working electrode and optionally the second working electrode;

obtaining a first signal at or above an oxidation-reduction potential of the first analyte responsive enzyme in the first sensing layer, the first signal being proportional to a concentration of the first analyte in the biofluid;

optionally obtaining a second signal at or above an oxidation-reduction potential of the second analyte responsive enzyme in the second sensing layer, the second signal being proportional to a concentration of the second analyte in the biofluid; and correlating the first signal to the concentration of the first analyte in the biofluid and the optional second signal to the concentration of the second analyte in the biofluid.

In an embodiment of the method, the analyte sensor only includes a first working electrode, a first sensing layer, and a first analyte-responsive enzyme and does not include a second working electrode, second sensing layer, or a second analyte-responsive enzyme. In an embodiment of the method, the analyte sensor comprises a second working electrode and a second sensing layer comprising a second analyte-responsive enzyme that is different from the first analyte-responsive enzyme.

In some embodiments, the first signal and the second signal are measured at different times. In some embodiments, the first signal and the second signal are obtained simultaneously via a first channel and a second channel.

In some embodiments, the analyte sensor is exposed to the biofluid in vivo. In general, the method uses a system (e.g., an analyte sensor), as disclosed herein, for measuring a concentration of analyte and can be used in an in vivo monitoring system, which while positioned in vivo in a user (e.g., a patient, such as a human) makes contact with the biofluid of the user and senses one or more analyte levels contained therein. An in vivo monitoring system can include one or more reader devices that receives sensed analyte data from a sensor control device. The reader device can process and/or display the sensed analyte data or sensor data in any number of forms to the user. In some embodiments, the reader device can be a mobile communication device, such as a dedicated reader device (configured for communication with a sensor control device) optionally in conjunction with a computer system, a mobile telephone (e.g., a WiFi or internet-enabled smart phone), a tablet, a personal digital assistant (PDA), or a mobile smart wearable electronics assembly (e.g., a smart glass, smart glasses, watch, bracelet, or necklace). Configuring a reader device to an in vivo monitoring system is described at, for example, U.S. Pat. No. 11,371,957, the disclosure of which is incorporated herein by reference in its entirety.

The reader device typically includes an input component, a display, and processing circuitry, which can include one or more processors, microprocessors, controllers, and/or microcontrollers, each of which can be a discrete chip or distributed amongst (and a portion of) a number of different chips. The processing circuitry can include a communications processor having on-board memory and an applications processor having on-board memory. The reader device can further include radio frequency (RF) communication circuitry coupled with an RF antenna, a memory, multi-functional circuitry with one or more associated antennas, a power supply, power management circuitry, and/or a clock. It will be recognized that other hardware and functionality can be included in the reader device.

In certain embodiments, the present disclosure further provides methods for detecting an analyte. In certain embodiments, the present disclosure provides methods for detecting two more analytes disclosed herein, e.g., a first analyte and a second analyte. For example, but not by way of limitation, the one or more analytes can be glucose, lactate, ketones (e.g., ketone bodies), glutamine, alcohols, aspartate, asparagine, glutamate, creatinine, hematocrit, acetoacetate, fructosamine, amylase, bilirubin, cholesterol, chorionic gonadotropin, creatine kinase (e.g., CK-MB), creatine, DNA, RNA, growth factors, growth hormones, hormones (e.g., thyroid stimulating hormone), steroids, vitamins (e.g., ascorbic acid), uric acid, neurochemicals (e.g., acetylcholine, norepinephrine and dopamine), oxygen, albumin, hemoglobin A1C, alkaline phosphatase, alanine transaminase, aspartate aminotransferase, blood urea nitrogen, sarcosine, prostate-specific antigen, prothrombin, thrombin, troponin, pyruvate, acetaldehyde, ascorbate, galactose, L-xylono-1,4-lactone, glutathione disulfide, hydrogen peroxide, linoleate, 1,3-bisphosphoglycerate, 6-phospho-D-glucono-1,5-lactone, hemoglobin, pharmaceutical drugs (e.g., antibiotics (e.g., gentamicin, vancomycin and the like), digitoxin, digoxin, theophylline, insulin and warfarin), drugs of abuse (e.g., analgesics, depressants, stimulants and hallucinogens), metal ions (e.g., potassium, sodium, calcium, manganese, iron, cobalt, molybdenum, magnesium, zinc and chlorine), pH, carbonate, phosphate, sulfate, fatty acids and/or antibodies.

In certain embodiments, the analyte is glucose, glutamate, creatinine, sarcosine and/or ascorbate. In certain embodiments, the present disclosure provides methods for detecting glucose, e.g., as a first analyte. In certain embodiments, the present disclosure provides methods for detecting glutamate, e.g., as a first analyte. In certain embodiments, the present disclosure provides methods for detecting creatinine, e.g., as a first analyte. In certain embodiments, the present disclosure provides methods for detecting sarcosine, e.g., as a first analyte. In certain embodiments, the present disclosure provides methods for detecting ascorbate, e.g., as a first analyte. In certain embodiments, the present disclosure provides methods for detecting one or more ketones. In certain embodiments, the present disclosure provides methods for detecting glucose and ketones.

In certain embodiments, the present disclosure provides methods for detecting an analyte in a subject in need thereof. In certain embodiments, the subject has a disease or disorder that is associated with the dysregulation of an analyte. In certain embodiments, the subject has a disease or disorder that is associated with the dysregulation of an analyte disclosed herein. In certain embodiments, the subject has a disease or disorder that is associated with the dysregulation of glucose. In certain embodiments, the subject has a disease or disorder that is associated with the dysregulation of glutamate. In certain embodiments, the subject has a disease or disorder that is associated with the dysregulation of ketones. In certain embodiments, the subject has a disease or disorder that is associated with the dysregulation of lactate. In certain embodiments, the subject has a disease or disorder that is associated with the dysregulation of creatinine. In certain embodiments, the subject has a disease or disorder that is associated with the dysregulation of ascorbate.

In certain embodiments, the levels of an analyte disclosed herein can be monitored for the wellness of a subject. For example, but not by way of limitation, analyte levels can be monitored for weight management, to obtain fitness goal, to improve sleep and improve mental clarity.

In certain embodiments, the subject is in need of monitoring glucose levels. For example, but not by way of limitation, a subject in need thereof is a subject that is at risk of having or has diabetes. Alternatively, glucose levels in a subject can be monitored for wellness. Wellness data can generally include any type of data associated with a person's health, such as their weight, heart rate, blood pressure or glucose levels. In certain embodiments, glucose levels in a subject can be monitored for weight management, to obtain better sleep and/or to help the subject feel better and think clearer.

In certain embodiments, the subject is in need of glutamate monitoring. For example, but not by way of limitation, a subject in need thereof can be a subject that is a risk of developing or has developed one or more disorders and/or conditions associated with glutamate dysregulation. For example, but not by way of limitation, the subject in need of glutamate monitoring can be a subject that is a risk of developing or has developed one or more disorders and/or conditions associated with elevated levels of glutamate as described herein. In certain embodiments, the subject in need of glutamate monitoring can be a subject that is at risk of developing or has developed one or more disorders and/or conditions associated with a glutamate deficiency as described herein.

In certain embodiments, a method for detecting an analyte can include: (i) providing an analyte sensor for detecting an analyte. In certain embodiments, the analyte sensor includes: (a) a sensor tail including at least a first working electrode; (b) an analyte-responsive active area disposed upon a surface of the first working electrode where the analyte-responsive active area includes an enzyme; and (c) a mass transport limiting membrane described herein, e.g., comprising a polyurethane or a polymer, e.g., a copolymer, comprising a polyurethane, permeable to the analyte that overcoats the analyte-responsive active area. In certain embodiments, the method can further include: (ii) applying a potential to the first working electrode; (iii) obtaining a first signal at or above an oxidation-reduction potential of the analyte-responsive active area, the first signal being proportional to a concentration of the first analyte in a fluid contacting the analyte-responsive active area; and (iv) correlating the first signal to the concentration of the second analyte in the fluid.

In certain embodiments, a method for detecting an analyte can include: (i) providing an analyte sensor for detecting an analyte. In certain embodiments, the analyte sensor includes: (a) a sensor tail including at least a first working electrode configured for detecting a first analyte; and (b) a mass transport limiting membrane described herein, e.g., comprising a polyurethane or a polymer, e.g., a copolymer, comprising a polyurethane, permeable to the analyte that overcoats the working electrode. In certain embodiments, the method can further include: (ii) applying a potential to the first working electrode; (iii) obtaining a first signal that is proportional to a concentration of the first analyte in a fluid contacting the working electrode; and (iv) correlating the first signal to the concentration of the second analyte in the fluid. In certain embodiments, there is no enzyme or no active enzyme disposed upon the first working electrode, e.g., where the analyte is directly oxidized at the working electrode.

In certain embodiments, methods of the present disclosure can include: (i) exposing an analyte sensor to a fluid comprising an analyte of interest; wherein the analyte sensor comprises: (a) a sensor tail comprising at least a first working electrode; (b) an analyte-responsive active area disposed upon a surface of the first working electrode, where the analyte-responsive active area comprises at least enzyme for detecting the analyte and, optionally, a polymer; and (c) a mass transport limiting membrane described herein, e.g., comprising a polyurethane or a polymer, e.g., a copolymer, comprising a polyurethane, permeable to the analyte that overcoats the analyte-responsive active area. In certain embodiments, the method can further include: (ii) applying a potential, to the first working electrode; (iii) obtaining a first signal at or above an oxidation-reduction potential of the first analyte-responsive active area, the first signal being proportional to a concentration of the analyte in the fluid; and (iv) correlating the first signal to the concentration of the analyte in the fluid.

In certain embodiments, methods of the present disclosure can include: (i) exposing an analyte sensor to a fluid comprising an analyte of interest; wherein the analyte sensor comprises: (a) a sensor tail comprising at least a first working electrode configured for detecting a first analyte; and (b) a mass transport limiting membrane described herein, e.g., comprising a polyurethane or a polymer, e.g., a copolymer, comprising a polyurethane, permeable to the analyte that overcoats the working electrode. In certain embodiments, the method can further include: (ii) applying a potential, to the first working electrode; (iii) obtaining a first signal that is proportional to a concentration of the analyte in the fluid; and (iv) correlating the first signal to the concentration of the analyte in the fluid. In certain embodiments, there is no enzyme or no active enzyme disposed upon the first working electrode, e.g., where the analyte is directly oxidized at the working electrode.

In certain embodiments, the method of the present disclosure can further include detecting another analyte by providing an analyte sensor that includes a second active area and/or exposing an analyte sensor that includes a second active area to a fluid comprising the analytes. In certain embodiments, the analyte sensor for use in a method of the present disclosure can include a second working electrode; and a second active area disposed upon a surface of the second working electrode, where the second active area comprises a second polymer, at least one enzyme responsive to the analyte to be detected and, optionally, a redox mediator; wherein a portion, e.g., second portion, of the mass transport limiting membrane overcoats the second active area. Alternatively, the second active area can be covered by a second mass transport limiting membrane that is separate and/or different than the mass transport limiting membrane that overcoats the first analyte-responsive active area.

In certain embodiments, a method for detecting glutamate, e.g., in a subject in need thereof, includes: (i) providing an analyte sensor including: (a) a sensor tail including at least a first working electrode; (b) a glutamate-responsive active area disposed upon a surface of the first working electrode and responsive to glutamate, where the glutamate-responsive active area includes a glutamate oxidase and, optionally, a first polymer and/or an electron transfer agent, e.g., as a redox polymer; and (c) a mass transport limiting membrane permeable to glutamate that overcoats the glutamate-responsive active area; (ii) applying a potential to the first working electrode; (iii) obtaining a first signal at or above an oxidation-reduction potential of the glutamate-responsive active area, the first signal being proportional to a concentration of glutamate in a fluid contacting the glutamate-responsive active area; and (iv) correlating the first signal to the concentration of glutamate in the fluid. In certain embodiments, the mass transport limiting membrane can include a polyurethane. In certain embodiments, the mass transport limiting membrane can include a polymer, e.g., a polyurethane, or a copolymer comprising a polyurethane. In certain embodiments, the mass transport limiting membrane can include an ether-based polyurethane. In certain embodiments, the mass transport limiting membrane can include a polyurethane that is capable of absorbing at least about 70% of its weight in water.

In certain embodiments, methods of the present disclosure can include: (i) exposing an analyte sensor to a fluid, e.g., bodily fluid, comprising glutamate, wherein the analyte sensor comprises: (a) a sensor tail comprising at least a first working electrode; (b) a glutamate-responsive active area disposed upon a surface of the first working electrode and responsive to glutamate, where the glutamate-responsive active area includes a glutamate oxidase and, optionally, a first polymer and/or an electron transfer agent, e.g., as a redox polymer; and (c) a mass transport limiting membrane permeable to glutamate that overcoats the glutamate-responsive active area; (ii) applying a potential to the first working electrode; (iii) obtaining a first signal at or above an oxidation-reduction potential of the glutamate-responsive active area, the first signal being proportional to a concentration of glutamate in the fluid; and (iv) correlating the first signal to the concentration of glutamate in the fluid. In certain embodiments, the mass transport limiting membrane can include a polymer, e.g., a polyurethane, or a copolymer comprising a polyurethane. In certain embodiments, the mass transport limiting membrane can include an ether-based polyurethane. In certain embodiments, the mass transport limiting membrane can include a polyurethane that is capable of absorbing at least about 70% of its weight in water.

In certain embodiments, a method for detecting glucose, e.g., in a subject in need thereof, includes: (i) providing an analyte sensor including: (a) a sensor tail including at least a first working electrode; (b) a glucose-responsive active area disposed upon a surface of the first working electrode and responsive to glucose, where the glucose-responsive active area includes a glucose oxidase and, optionally, a first polymer and/or an electron transfer agent, e.g., as a redox polymer; and (c) a mass transport limiting membrane permeable to glucose that overcoats the glucose-responsive active area; (ii) applying a potential to the first working electrode; (iii) obtaining a first signal at or above an oxidation-reduction potential of the glucose-responsive active area, the first signal being proportional to a concentration of glucose in a fluid contacting the glucose-responsive active area; and (iv) correlating the first signal to the concentration of glucose in the fluid. In certain embodiments, the mass transport limiting membrane can include a polymer, e.g., a polyurethane, or a copolymer comprising a polyurethane. In certain embodiments, the mass transport limiting membrane can include a polymer, e.g., a polyurethane, or a copolymer comprising a polyurethane. In certain embodiments, the mass transport limiting membrane can include an ether-based polyurethane. In certain embodiments, the mass transport limiting membrane can include a polyurethane that is capable of absorbing at least about 80% of its weight in water.

In certain embodiments, methods of the present disclosure can include: (i) exposing an analyte sensor to a fluid, e.g., bodily fluid, comprising glucose, wherein the analyte sensor comprises: (a) a sensor tail comprising at least a first working electrode; (b) a glucose responsive active area disposed upon a surface of the first working electrode and responsive to glucose, where the glucose-responsive active area includes a glucose oxidase and, optionally, a first polymer and/or an electron transfer agent, e.g., as a redox polymer; and (c) a mass transport limiting membrane permeable to glucose that overcoats the glucose-responsive active area; (ii) applying a potential to the first working electrode; (iii) obtaining a first signal at or above an oxidation-reduction potential of the glucose-responsive active area, the first signal being proportional to a concentration of glucose in the fluid; and (iv) correlating the first signal to the concentration of glucose in the fluid. In certain embodiments, the mass transport limiting membrane can include a polymer, e.g., a polyurethane, or a copolymer comprising a polyurethane. In certain embodiments, the mass transport limiting membrane can include an ether-based polyurethane. In certain embodiments, the mass transport limiting membrane can include a polyurethane that is capable of absorbing at least about 80% of its weight in water.

In certain embodiments, a method for detecting creatinine, e.g., in a subject in need thereof, includes: (i) providing an analyte sensor including: (a) a sensor tail including at least a first working electrode; (b) a creatinine-responsive active area disposed upon a surface of the first working electrode and responsive to creatinine, where the creatinine-responsive active area includes a sarcosine oxidase, creatine amidohydrolase and creatinine amidohydrolase and, optionally, a first polymer and/or an electron transfer agent, e.g., as a redox polymer; and (c) a mass transport limiting membrane permeable to creatinine that overcoats the creatinine-responsive active area; (ii) applying a potential to the first working electrode; (iii) obtaining a first signal at or above an oxidation-reduction potential of the creatinine-responsive active area, the first signal being proportional to a concentration of creatinine in a fluid contacting the creatinine-responsive active area; and (iv) correlating the first signal to the concentration of creatinine in the fluid. In certain embodiments, the mass transport limiting membrane can include a polymer, e.g., a polyurethane, or a copolymer thereof. In certain embodiments, the mass transport limiting membrane can include a polymer, e.g., a polyurethane, or a copolymer comprising a polyurethane. In certain embodiments, the mass transport limiting membrane can include a polyurethane that is capable of absorbing at least about 25% of its weight in water and has a hardness of about 80 Shore A.

In certain embodiments, methods of the present disclosure can include: (i) exposing an analyte sensor to a fluid, e.g., bodily fluid, comprising creatinine, wherein the analyte sensor comprises: (a) a sensor tail comprising at least a first working electrode; (b) a creatinine responsive active area disposed upon a surface of the first working electrode and responsive to creatinine, where the creatinine-responsive active area includes a sarcosine oxidase, creatine amidohydrolase, and creatinine amidohydrolase and, optionally, a first polymer and/or an electron transfer agent, e.g., as a redox polymer; and (c) a mass transport limiting membrane permeable to creatinine that overcoats the creatinine-responsive active area; (ii) applying a potential to the first working electrode; (iii) obtaining a first signal at or above an oxidation-reduction potential of the creatinine-responsive active area, the first signal being proportional to a concentration of creatinine in the fluid; and (iv) correlating the first signal to the concentration of creatinine in the fluid. In certain embodiments, the mass transport limiting membrane can include a polymer, e.g., a polyurethane, or a copolymer comprising a polyurethane. In certain embodiments, the mass transport limiting membrane can include a polyurethane that is capable of absorbing at least about 25% of its weight in water and has a hardness of about 80 Shore A.

In certain embodiments, a method for detecting ascorbate, e.g., in a subject in need thereof, includes: (i) providing an analyte sensor including: (a) a sensor tail including at least a first working electrode configured for detecting ascorbate; and (b) a mass transport limiting membrane permeable to ascorbate that overcoats the first working electrode; (ii) applying a potential to the first working electrode; (iii) obtaining a first signal at or above an oxidation-reduction potential of the first working electrode, the first signal being proportional to a concentration of ascorbate in a fluid contacting the first working electrode; and (iv) correlating the first signal to the concentration of ascorbate in the fluid. In certain embodiments, there is no enzyme or no active enzyme disposed upon the first working electrode and ascorbate is directly oxidized at the working electrode. In certain embodiments, the mass transport limiting membrane can include a polymer, e.g., a polyurethane, or a copolymer comprising a polyurethane. In certain embodiments, the mass transport limiting membrane can include a polymer, e.g., a polyurethane, or a copolymer comprising a polyurethane.

In certain embodiments, methods of the present disclosure can include: (i) exposing an analyte sensor to a fluid, e.g., bodily fluid, comprising ascorbate; wherein the analyte sensor comprises: (a) a sensor tail comprising at least a first working electrode configured for detecting ascorbate; and (b) a mass transport limiting membrane permeable to ascorbate that overcoats the first working electrode; (ii) applying a potential to the first working electrode; (iii) obtaining a first signal at or above an oxidation-reduction potential of the first working electrode, the first signal being proportional to a concentration of ascorbate in the fluid; and (iv) correlating the first signal to the concentration of ascorbate in the fluid. In certain embodiments, there is no enzyme or no active enzyme disposed upon the first working electrode and ascorbate is directly oxidized at the working electrode. In certain embodiments, the mass transport limiting membrane can include a polymer, e.g., a polyurethane, or a copolymer comprising a polyurethane. In certain embodiments, the mass transport limiting membrane can include a polyurethane that is capable of absorbing at least about 25% of its weight in water and has a hardness of about 80 Shore A.

In certain embodiments, the analyte sensor can include a second working electrode configured for detecting a second analyte, where a method of the present disclosure can further include applying a potential to the second working electrode, obtaining a second signal at or above an oxidation-reduction potential of the second working electrode, the second signal being proportional to a concentration of the second analyte in the fluid and correlating the second signal to the concentration of the second analyte in the fluid. In certain embodiments, the second working electrode can include an active area that is configured for detecting the second analyte. In certain embodiments, the active area can include one or more enzymes responsive to the second analyte.

In certain embodiments, the analyte sensor can include a second working electrode configured for detecting a background signal, where a method of the present disclosure can further include applying a potential to the second working electrode, obtaining a second signal from the second working electrode and subtracting the second signal from the first signal obtained from the first working electrode to obtain the concentration of the first analyte in the fluid. In certain embodiments, the second working electrode does not have an enzyme disposed upon it or includes an active area with inactive enzyme, e.g., an enzyme that lacks enzymatic activity.

In certain embodiments, sensors of the present disclosure can be used for up to about 10 days, about 11 days, about 12 days, about 13 days, about 14 days, about 15 days, about 16 days, about 17 days, about 18 days, about 19 days or about 20 days. In certain embodiments, the glutamate sensors of the present disclosure can be used for up to about 15 days.

Methods of Manufacture

The present disclosure further relates to a method of forming an analyte sensor comprising: disposing a sensing layer on at least a portion of a working electrode, and coating at least the sensing layer with a hydrophilic polyurethane membrane, wherein the hydrophilic polyurethane is aliphatic, aromatic, or both aliphatic and aromatic.

The coating of the hydrophilic polyurethane membrane over at least the sensing layer can be performed by any suitable technique. Typically, the hydrophilic polyurethane membrane will be coated by spray coating, painting, inkjet printing, screen printing, stenciling, roller coating, dip coating, or any combination thereof. For example, but not by way of limitation, the mass transport limiting membranes of the present disclosure can be applied to active area(s) and/or working electrodes by dip coating. In an embodiment, the coating comprises dipping the analyte sensor comprising the sensing layer (e.g., the sensor tail) into a solution comprising the hydrophilic polyurethane and a solvent to provide a dipped analyte sensor. The coating step can be performed once or multiple times (e.g., 2, 3, 4, or 5 times), which will affect the thickness of the membrane coating. In an embodiment, the coating step can be performed twice to form a bilayer.

In general, if multiple coats are applied, the first coat will be dried prior to applying the subsequent coat(s). The amount of time between coating steps will vary depending on the types of membrane, working electrode, and sensing layer, and the atmospheric conditions. In general, the drying time will be 1 minute or longer (e.g., 2 min or more, 3 min or more, 5 min or more, 10 min or more, 15 min or more, or 20 min or more). In some embodiments, the drying time will be 20 min or less (e.g., 15 min or less, 10 min or less, 8 min or less, 5 min or less, or 3 min or less). In some embodiments, the drying time is about 1 min to about 20 min (e.g., about 2 min, about 5 min, about 10 min, about 12 min, about 15 min, about 18 min, about 20 min).

In certain embodiments, the mass transport limiting membrane can be homogeneous and can be single-component (contain a single membrane polymer or a copolymer of two or more polymers). In certain embodiments, a mass transport limiting membrane of the present disclosure contains a single polymer. Alternatively, the mass transport limiting membrane can be multi-component (contain two or more different membrane polymers, e.g., as a composite or blend). In certain embodiments, the multi-component membrane can be present as a multilayered membrane, e.g., a bilayer membrane or a trilayer membrane. In certain embodiments, the multi-component membrane can be present as a homogeneous admixture of two or more membrane polymers. In certain embodiments, a homogeneous admixture can be deposited by combining the two or more membrane polymers in a solution and then depositing the solution upon a working electrode, e.g., by dip coating or spray coating. In certain embodiments, a multi-layered membrane can be deposited onto analyte-responsive active area by depositing a first layer, e.g., by dip coating or spray coating, and depositing a second layer onto the first layer, e.g., by dip coating or spray coating, to generate a bilayer membrane. In certain embodiments, a third layer can be deposited onto the second layer, e.g., by dip coating or spray coating, to generate a trilayer membrane. In certain embodiments, a multi-layered membrane can be deposited onto an analyte-responsive active area by depositing a first layer of a first polymer, e.g., by dip coating into or spray coating with a solution comprising the first polymer, and depositing a second layer comprising a second polymer onto the first layer, e.g., by dip coating into or spray coating with a solution comprising the second polymer, to generate a bilayer membrane. In certain embodiments, a third layer comprising a third polymer can be deposited onto the second layer, e.g., by dip coating into or spray coating with a solution comprising the third polymer, to generate a trilayer membrane.

In certain embodiments, a mass transport limiting membrane of the present disclosure can include a hydrophilic polymer. For example, but not by way of limitation, the mass transport limiting membrane can be a single-component membrane or a multi-component membrane comprising a hydrophilic polymer. In certain embodiments, the mass transport limiting membrane is a single-component membrane comprising a hydrophilic polymer. In certain embodiments, the mass transport limiting membrane is a single-component membrane consisting essentially of a hydrophilic polymer. In certain embodiments, the mass transport limiting membrane is a single-component membrane consisting of a hydrophilic polymer.

When used, the solvent can be any solvent or combination of solvents in which the hydrophilic polyurethane is at least partially soluble and that has a relatively low vapor pressure at 25° C. In some embodiments, at least one solvent used in the method has a vapor pressure at 25° C. that is about 16 kPa or less (e.g., about 15 or less, about 14 or less, about 13 or less, about 12 or less, about 11 or less, about 10 or less, about 9 or less, about 8 or less, about 7 or less, or about 6 or less). Typically, the solvent will have a vapor pressure of about 0.01 kPa or more, such that the solvent will have a vapor pressure within a range of about 0.01 kPa to about 16 kPa (e.g., about 0.01 kPa to about 15 kPa, about 0.01 kPa to about 14 kPa, about 0.01 kPa to about 13 kPa, about 0.01 kPa to about 12 kPa, about 0.01 kPa to about 11 kPa, about 0.01 kPa to about 10 kPa, about 0.01 kPa to about 9 kPa, about 0.01 kPa to about 8 kPa, about 0.01 kPa to about 7 kPa, about 0.01 kPa to about 6 kPa). In some embodiments, the solvent comprises ethanol, 2-methyl-tetrahydrofuran, 1,4-dioxane, water, or mixtures thereof. For example, a solution can be formed by combining the hydrophilic polyurethane and solvent (e.g., a mixture of ethanol and 2-methyl-tetrahydrofuran or a mixture of 1,4-dioxane and water) until the polyurethane absorbs the solvent and forms a polyurethane-solvent mixture. In some embodiments, the solvent does not include tetrahydrofuran (THF), which can, in some instances, cause the underlying dielectric and/or electrode layer(s) to melt and/or deteriorate.

The polyurethane-solvent mixture can be heated until the polyurethane is dissolved in the solvent, and any solids that form can optionally be removed. In a particular example, the polyurethane-solvent mixture can be mixed for about 1 h or more (e.g., about 2 h or more, about 3 h or more, about 4 h or more, about 5 h or more, about 6 h or more, about 7 h or more, about 8 h or more, about 9 h or more, about 10 h or more, about 11 h or more, about 12 h or more), heated with or without mixing (e.g., heated without mixing), and then mixed again (i.e., a second mixing step) before optionally removing any solids (e.g., via centrifugation). When performed, the second mixing step typically is shorter than the initial mixing step. In some embodiments, the second mixing step is about 5 h or less (e.g., about 4 h or less, about 3 h or less, about 2 h or less, about 1 h or less, or about 30 min or less). Removing the solids can be by any suitable technique, such as filtration, decantation, or centrifugation.

Once the membrane coating has been applied, the coating can optionally be cured. In an embodiment, the coating can be cured for 12 hours or more (e.g., 18 hours or more, 24 hours or more, 30 hours or more, 36 hours or more, 42 hours or more, or 48 hours or more). The curing can be at room temperature (i.e., about 20° C.) or at a slightly elevated temperature (e.g., 100° C. or less, 80° C. or less, 70° C. or less, 60° C. or less, 50° C. or less, 40° C. or less, 30° C. or less, or 25° C. or less). In general, the curing will not occur at less than about 20° C.

In other embodiments, the hydrophilic polyurethane membrane coating is not cured (e.g., because no crosslinking agent is used and/or no crosslinking occurs). Instead, the dipped analyte sensor can be heated to a suitable temperature to dry and/or condition the hydrophilic polyurethane membrane. Polyurethanes can change morphology while in solid form through heating. The different polyurethane morphologies can associate or disassociate, making an aggregate-like structure (e.g., nodules and/or fibrils) or a continuous structure. The heat treatment step can condition the polyurethane to set the morphology.

Suitable heating temperatures include, e.g., about 20° C. to about 100° C., about 30° C. to about 100° C., about 30° C. to about 90° C., about 30° C. to about 70° C., about 40° C. to about 100° C., about 40° C. to about 90° C., about 40° C. to about 80° C., about 40° C. to about 70° C., about 50° C. to about 100° C., about 50° C. to about 90° C., about 50° C. to about 80° C., about 50° C. to about 70° C., about 60° C. to about 100° C., about 60° C. to about 90° C., about 60° C. to about 80° C., or about 60° C. to about 70° C.

The hydrophilic polyurethane membrane typically has a thickness that ranges from about 1 μm to about 100 μm. For example, in some embodiments, the membrane can have a thickness of about 1 μm or more (e.g., about 5 μm or more, about 10 μm or more, about 15 μm or more, about 20 μm or more, about 25 μm or more, about 30 μm or more, about 35

μm or more, about 40 μm or more, about 50 μm or more, about 60 μm or more, about 70 μm or more, about 80 μm or more, or about 90 μm or more) and typically will have a thickness of about 100 μm or less (e.g., about 90 μm or less, about 80 μm or less, about 70 μm or less, about 60 μm or less, about 50 μm or less, about 45 μm or less, about 40 μm or less, about 35 μm or less, about 30 μm or less, about 25 μm or less, about 20 μm or less, about 15 μm or less, about 10 μm or less, or about 5 μm or less). In an example, the membrane can have a thickness of about 5 to about 80 μm, about 10 to about 60 μm, about 20 to about 50 μm, about 20 to about 40 μm, about 25 to about 35 μm, or a thickness of about 30 μm.

In certain embodiments, an analyte sensor of the present disclosure includes one or more active areas (for detecting one or more analytes) and one or more working electrodes. For example, but not by way of limitation, the present disclosure provides methods for manufacturing an analyte sensor that includes a first active area disposed upon a first working electrode. In certain embodiments, a second active area can be disposed upon a second working electrode or the first working electrode. Alternatively or additionally, analyte sensors of the present disclosure include one or more working electrodes that does not have enzyme, e.g., active enzyme, disposed upon the one or more working electrodes.

In certain embodiments, the method includes generating a first working electrode, e.g., by screen printing. In certain embodiments, generating a first working electrode can include printing with a carbon ink. In certain embodiments, generating a first working electrode can include printing with a carbon ink on a substrate, e.g., non-conductive substrate.

In certain embodiments, the method can further include adding a composition comprising one or more enzymes onto a surface of the working electrode to generate an analyte-responsive active area on the working electrode. In certain embodiments, the enzyme composition can include one or more enzymes for detecting an analyte disclosed herein. For example, but not by way of limitation, the enzyme composition can include one or more enzymes for detecting alcohol, glucose, glutamate, creatinine, sarcosine, ketones and/or lactate. In certain embodiments, the composition comprising the one or more enzymes can further include an electron transfer agent and/or a crosslinker. In certain embodiments, the method does not include adding a composition comprising one or more enzymes onto a surface of the working electrode to generate an analyte-responsive active area on the working electrode, e.g., for manufacturing sensors for detecting an analyte that is directly oxidized on the working electrode.

In certain embodiments, the method can further include depositing a membrane directly on top of the first and/or the second active areas and/or on top of the one or more working electrodes. In certain embodiments, the membrane composition can include a polyurethane. Non-limiting examples of polyurethanes for use in membrane compositions as described herein. Alternatively or additionally, the membrane composition can include a polymer, e.g., a polyurethane or a copolymer of a polyurethane and a polymer, e.g., a hydrophilic polymer.

In certain embodiments, the membrane is applied by spray coating. In certain embodiments, the membrane is applied by solvent dip coating. The conditions of the dip process, e.g., bath temperature, environment temperature, environment humidity, bath entry and exit speeds, can vary and are chosen to result in a membrane with minimal imperfections. Depending on the final thickness of the membrane and solution viscosity, the coating can be applied in a single step or multiple repeated steps of the chosen process such as dipping to build the desired thickness.

In certain embodiments, the polymer, e.g., polyurethane or a copolymer comprising a polyurethane, is dissolved in a solvent system. The choice of the solvent system is made such that the polymer is dissolved, yet is not deleterious to the sensing chemistry of the analyte-responsive active area. In certain embodiments, the solvent system has a boiling point from about 50° C. to about 100° C. for a dip coating process, e.g., from about 70° C. to about 90° C. for a dip coating process. It is noted that high boiling point solvent systems can be problematic due to high retention of solvent, and extraneous processing requirements (solvent removal such as drying or washing out) after dipping. Extended exposure of solvent to the sensing layer and flex circuit from slow evaporation is also problematic due to increasing likelihood of issues, specifically, related to dynamic and progressive deterioration in function associated with solvent exposure. High boiling point system membrane dipping solutions, typically, tend to flow and favor uneven/undesired polymer deposition on the sensor tip (accumulation due to uneven drying). Biologic functionality/activity within the sensing layer and all materials associated with it are at higher risk with increased solvent exposure. On the other hand, compatible low boiling point solvent systems lend themselves problematic due to membrane dipping solution pot life and dipping parameter limitations. Fast evaporation of solvent during dipping leads to "tails" of membrane forming on the sensor tip, uneven/hard to control membrane thickness, and formation of "skins" on the surface of the dipping bath solution. As used herein, the term "tails" when noted in connection with the membrane refers to extraneous gelled/solidified material hanging off the tip of the sensor upon exiting the dipping bath. In certain embodiments, the tails can appear like 3-D cones or strings originating from the tip of the sensor upon removal from the bath, and progress/grow with each subsequent dip. As used herein, the term "skins" is used in connection to the pot life of the membrane dipping solutions. Given the nature of a stagnant dipping bath with top (entry surface) being the only air/liquid interface, as solvent evaporates from the top surface and underlying depth, a gradient will be generated resulting in a higher viscosity, higher polymer weight percent, which start to gel and eventually become solid, as compared to the deeper/less effected underlying liquid/intended system formulation.

In certain embodiments, the solvent system is an alcohol-based solvent system. For example, but not by way of limitation, the solvent system includes one or more alcohols. In certain embodiments, the alcohol-based solvent system can include methanol, ethanol, 1-propanol, 2-propanol (isopropanol), 2,2-dimethyl-1-propanol, 1-butanol, 2-butanol, isobutanol, 3-methyl-1-butanol, 3-methyl-2-butanol, 2-methyl-1-propanol, 2-methyl-2-propanol, 1-pentanol, 2-pentanol, 2-methyl-1-pentanol, cyclopentanol, 1-hexanol, cyclohexanol, 1-heptanol, 1-octanol, 1-nonanol, 2-propen-1-ol, phenylmethanol, diphenylmethanol and/or triphenylmethanol. In certain embodiments, the alcohol-based solvent system can include methanol. In certain embodiments, the alcohol-based solvent system can include ethanol. In certain embodiments, the alcohol-based solvent system can include a propanol. In certain embodiments, the alcohol-based solvent system can include isopropanol. In certain embodiments, the alcohol-based solvent system can include a butanol.

In certain embodiments, the alcohol-based solvent system can include a second component. In certain embodiments, the second component can be any solvent that is miscible with the alcohol contained in the alcohol-based solvent system. Non-limiting examples of the second component that can be included in the solvent system include water, ketones (e.g., acetone, methyl ethyl ketone, methyl isobutyl ketone and cyclohexanone), nitriles (e.g., acetonitrile), alkyl esters (e.g., methyl acetate, ethyl acetate, butyl acetate and isobutyl acetate), aliphatic hydrocarbons (e.g., n-hexane, n-heptane and octane), alicyclic hydrocarbons (e.g., cyclohexane and methylcyclohexane), aromatic hydrocarbons (e.g., toluene, xylene and ethylbenzene), glycol ether esters (e.g., methoxyethyl acetate, 2-ethoxyethyl acetate, methyl carbitol acetate, ethyl carbitol acetate, ethylene glycol ethyl ether acetate, propylene glycol methyl ether acetate, 3-methyl-3-methoxy butyl acetate and ethyl-3-ethoxy propionate), ethers (e.g., diethyl ether, tetrahydrofuran (THF) and 1,4-dioxane), halogenated aliphatic hydrocarbons (e.g., methyl chloride, methylene chloride, chloroform, carbon tetrachloride, methyl bromide, methylene iodide and dichloroethane) and aprotic polar solvents (e.g., N-methylpyrrolidone, dimethylformamide, N,N'-dimethylacetamide, dimethyl sulfoxide and hexamethyl phosphoramide) and derivatives thereof. In certain embodiments, the second component can be tetrahydrofuran or a derivative thereof, e.g., a methyl-tetrahydrofuran, e.g., 2-methyl-tetrahydrofuran.

In certain embodiments, the second component of the solvent system can be water. In certain embodiments, the alcohol-based solvent system can include a heterocyclic compound, e.g., a heterocyclic compound having a 5-membered ring, e.g., a cyclic ether. In certain embodiments, the second component comprises water and a cyclic compound (e.g., a cyclic ether). In certain embodiments, the heterocyclic compound can be tetrahydrofuran or a derivative thereof, e.g., a methyl-tetrahydrofuran, e.g., 2-methyl-tetrahydrofuran. In certain embodiments, the alcohol-based solvent system can include 2-methyl-tetrahydrofuran. In certain embodiments, the alcohol-based solvent system can include a cyclic compound, e.g., a cyclic compound having a five-membered ring. In certain embodiments, the alcohol-based solvent system can include cyclopentyl methyl ether, 1,4-dioxane, or a combination thereof.

In certain embodiments, the alcohol-based solvent system comprises an alcohol and a second component at a v/v ratio from about 10:1 to about 1:10. In certain embodiments, the alcohol-based solvent system comprises an alcohol and a second component at a v/v ratio from about 9:1 to about 1:9, from about 8:1 to about 1:8, from about 7:1 to about 1:7, from about 6:1 to about 1:6, from about 5:1 to about 1:5, from about 4:1 to about 1:4, from about 3:1 to about 1:3, from about 2:1 to about 1:2 or about 1:1. In certain embodiments, the alcohol-based solvent system comprises an alcohol and a second component at a v/v ratio from about 10:1 to about 1:1, e.g., from about 9:1 to about 1:1. In certain embodiments, the alcohol-based solvent system comprises an alcohol and a second component at a v/v ratio of about 9:1. In certain embodiments, the alcohol-based solvent system comprises an alcohol and a second component at a v/v ratio of about 1:1.

In certain embodiments, the solvent system can include an alcohol at about 99% v/v, at about 95% v/v, at about 90% v/v, at about 85% v/v, at about 80% v/v, at about 75% v/v, at about 70% v/v, at about 65% v/v, at about 60% v/v, at about 55% v/v, at about 50% v/v, at about 45% v/v, at about 40% v/v, at about 35% v/v, at about 30% v/v, at about 25% v/v, at about 20% v/v, at about 15% v/v, at about 10% v/v or at about 5% v/v.

In certain embodiments, the solvent system can include the second component (e.g., at least one solvent that is miscible with the alcohol present in the solvent system) at about 99% v/v, at about 95% v/v, at about 90% v/v, at about 85% v/v, at about 80% v/v, at about 75% v/v, at about 70% v/v, at about 65% v/v, at about 60% v/v, at about 55% v/v, at about 50% v/v, at about 45% v/v, at about 40% v/v, at about 35% v/v, at about 30% v/v, at about 25% v/v, at about 20% v/v, at about 15% v/v, at about 10% v/v or at about 5% v/v.

In certain embodiments, the solvent system includes an ether-based solvent and an alcohol at a v/v ratio of about 1:1. In certain embodiments, the solvent system includes a hydrophobic ether-based solvent and an alcohol at a v/v ratio of about 1:1. In certain embodiments, the solvent system includes a cyclic compound (e.g., a cyclic compound having a 5- or 6-membered ring) and an alcohol at a v/v ratio of about 1:1. In certain embodiments, the solvent system includes a heterocyclic compound (e.g., a heterocyclic compound having a 5-membered ring) and an alcohol at a v/v ratio of about 1:1. In certain embodiments, the solvent system includes an alcohol and water at a v/v ratio of about 9:1. In certain embodiments, the solvent system is selected from the group consisting of 1:1 v/v of methyl-THF to EtOH, 1:1 v/v of cyclopentyl methyl ether to EtOH and 9:1 v/v EtOH to $H_2O$. In certain embodiments, the solvent system is 1:1 v/v of methyl-THF to EtOH. The use of 1:1 v/v of methyl-THF to EtOH as a solvent system for a HydroThane™ polyurethane produced successful dipping solutions after heating at 65° C. that had a long pot life. In certain embodiments, the solvent system is 1:1 v/v of cyclopentyl methyl ether to EtOH. The use of 1:1 v/v of cyclopentyl methyl ether to EtOH as a solvent system for a HydroThane™ polyurethane produced successful dipping solutions after heating at 65° C. that had a long pot life. In certain embodiments, the solvent system is 9:1 v/v EtOH to $H_2O$.

In certain embodiments, the solvent system can include an alcohol, a second component and water. For example, but not by way of limitation, the solvent system can include an ether-based solvent and an alcohol at a v/v ratio of about 1:1 and further includes water. In certain embodiments, the solvent system includes a hydrophobic ether-based solvent and an alcohol at a v/v ratio of about 1:1 and further includes water. In certain embodiments, the solvent system includes a cyclic compound (e.g., a cyclic compound having a 5-membered ring) and an alcohol at a v/v ratio of about 1:1 and further includes water. In certain embodiments, the solvent system includes a heterocyclic compound (e.g., a heterocyclic compound having a 5-membered ring) and an alcohol at a v/v ratio of about 1:1 and further includes water. In certain embodiments, the solvent system is 1:1 v/v of methyl-THF to EtOH and further includes water. In certain embodiments, the solvent system is 1:1 v/v of cyclopentyl methyl ether to EtOH and further includes water.

In certain embodiments, the solvent system can include water and 1,4-dioxane. The water and 1,4-dioxane can be used in any suitable v/v ratio, but in certain embodiments, a v/v ratio of water to 1,4-dioxane can be within a range of about 1:5 to about 1:15 (e.g., about 1:5, about 1:6, about 1:7, about 1:8, about 1:9, about 1:10, about 1:11, about 1:12, about 1:13, about 1:14, or about 1:15). In certain embodiments, the v/v ratio of water to 1,4-dioxane can be about 1:8 to about 1:10. In certain embodiments, the v/v ratio of water to 1,4-dioxane can be about 1:9.

In certain embodiments, the solvent system can include a sufficient amount of water to allow the one or more polymers, e.g., to dissolve. In certain embodiments, the second component can be water and the solvent system includes an alcohol and water. In certain embodiments, the alcohol-based solvent system can include an alcohol, a second component and water. In certain embodiments, the solvent system can include water at a range from about 0.1% v/v to about 20% v/v, e.g., from about from about 0.1% v/v to about 19% v/v, from about 0.1% v/v to about 18% v/v, from about 0.1% v/v to about 17% v/v, from about 0.1% v/v to about 16% v/v, from about 0.1% v/v to about 15% v/v, from about 0.1% v/v to about 14% v/v, from about 0.1% v/v to about 13% v/v, from about 0.1% v/v to about 12% v/v, from about 0.1% v/v to about 11% v/v, from about 0.1% v/v to about 9% v/v, from about 0.1% v/v to about 8% v/v, from about 0.1% v/v to about 7% v/v, from about 0.1% v/v to about 6% v/v, from about 0.1% v/v to about 5% v/v, from about 0.1% v/v to about 4% v/v, from about 0.1% v/v to about 3% v/v, from about 0.1% v/v to about 2% v/v, from about 0.1% v/v to about 1% v/v, from about 0.5% v/v to about 20% v/v, from about 1% v/v to about 20% v/v, from about 2% v/v to about 20% v/v, from about 3% v/v to about 20% v/v, from about 4% v/v to about 20% v/v, from about 5% v/v to about 20% v/v, from about 6% v/v to about 20% v/v, from about 7% v/v to about 20% v/v, from about 8% v/v to about 20% v/v, from about 9% v/v to about 20% v/v, from about 10% v/v to about 20% v/v, from about 11% v/v to about 20% v/v, from about 12% v/v to about 20% v/v, from about 13% v/v to about 20% v/v, from about 14% v/v to about 20% v/v, from about 15% v/v to about 20% v/v, from about 16% v/v to about 20% v/v, from about 17% v/v to about 20% v/v, from about 18% v/v to about 20% v/v, from about 19% v/v to about 20% v/v, from about 1% v/v to about 15% v/v, from about 1% v/v to about 10% v/v, from about 2% v/v to about 8% v/v, from about 4% v/v to about 6% v/v or from about 5% v/v to about 10% v/v. In certain embodiments, the solvent system can include water at a range from about 1% v/v to about 10% v/v.

In certain embodiments, the method of producing a membrane of the present disclosure further include heating the solvent solution and the polymer to dissolve the polymer. In certain embodiments, the heating temperature ranges from about 40° C. to about 150° C. For example, but not by way of limitation, the heating temperature ranges from about 45° C. to about 140° C., from about 45° C. to about 130° C., from about 45° C. to about 120° C., from about 45° C. to about 110° C., from about 45° C. to about 100° C., from about 45° C. to about 90° C., from about 45° C. to about 80° C., from about 50° C. to about 150° C., from about 60° C. to about 150° C., from about 70° C. to about 150° C., from about 80° C. to about 150° C., from about 90° C. to about 150° C., from about 100° C. to about 150° C., from about 110° C. to about 150° C., from about 120° C. to about 150° C., from about 130° C. to about 150° C., from about 140° C. to about 150° C., from about 50° C. to about 80° C., from about 55° C. to about 80° C., from about 60° C. to about 80° C., from about 65° C. to about 80° C., from about 40° C. to about 75° C., from about 40° C. to about 70° C., from about 50° C. to about 70° C. or from about 60° C. to about 70° C. In certain embodiments, the heating temperature ranges from about 50° C. to about 80° C. In certain embodiments, the heating temperature ranges from about 55° C. to about 75° C. In certain embodiments, the heating temperature ranges from about 60° C. to about 70° C.

In certain embodiments, the solvent system comprises the polymer at a concentration of about 10 mg/ml to about 200 mg/ml. For example, but not by way of limitation, solvent system comprises the polymer at a concentration of about 10 mg/ml to about 180 mg/ml, about 10 mg/ml to about 160 mg/ml, about 10 mg/ml to about 140 mg/ml, about 10 mg/ml to about 120 mg/ml, about 10 mg/ml to about 100 mg/ml, about 10 mg/ml to about 80 mg/ml, about 20 mg/ml to about 200 mg/ml, about 30 mg/ml to about 200 mg/ml, about 40 mg/ml to about 200 mg/ml, about 50 mg/ml to about 200 mg/ml, about 60 mg/ml to about 200 mg/ml, about 70 mg/ml to about 200 mg/ml, about 80 mg/ml to about 200 mg/ml, about 90 mg/ml to about 200 mg/ml, about 100 mg/ml to about 200 mg/ml, about 20 mg/ml to about 150 mg/ml, about 20 mg/ml to about 100 mg/ml, about 40 mg/ml to about 100 mg/ml, about 50 mg/ml to about 100 mg/ml, about 60 mg/ml to about 90 mg/ml or about 70 mg/ml to about 80 mg/ml. In certain embodiments, the solvent system comprises the polymer at a concentration of about 75 mg/ml.

In certain embodiments, the polymer-solvent solution can be further processed, e.g., after dissolving the polymer in solvent system, e.g., dissolving the polymer in solvent system by heating. For example, but not by way of limitation, the polymer-solvent solution can be further processed by centrifugation of the polymer-solvent solution. In certain embodiments, the polymer-solvent solution can be subsequently centrifuged, e.g., after dissolving the polymer in solvent system, e.g., dissolving the polymer in solvent system by heating. For example, but not by way of limitation, the polymer-solvent solution can be processed, e.g., centrifuged, to remove impurities. In certain embodiments, a polymer-solvent solution comprising a HydroThane™ or HydroMed™ polyurethane can be centrifuged, e.g., centrifuged to remove impurities. In certain embodiments, a polymer-solvent solution comprising a HydroThane™ polyurethane (e.g., HydroThane™ 25-80A) can be centrifuged, e.g., centrifuged to remove impurities. In certain embodiments, a polymer-solvent solution comprising a HydroMed™ polyurethane (e.g., HydroMed™ D1 or D6) can be centrifuged, e.g., centrifuged to remove impurities. In certain embodiments, the polymer-solvent solution can be centrifuged at a relative centrifugal force (rcf) from about 1,000 rcf to about 50,000 rcf, e.g., about 5,000 rcf to about 50,000 rcf, about 10,000 rcf to about 50,000 rcf, about 15,000 rcf to about 50,000 rcf, about 20,000 ref to about 50,000 rcf, about 25,000 ref to about 50,000 rcf, about 30,000 ref to about 50,000 ref, about 35,000 ref to about 50,000 ref, about 40,000 ref to about 50,000 ref, about 45,000 ref to about 50,000 ref, about 1,000 ref to about 45,000 ref, about 1,000 ref to about 40,000 ref, about 1,000 ref to about 35,000 ref, about 1,000 ref to about 30,000 ref, about 1,000 ref to about 25,000 ref, about 1,000 ref to about 20,000 ref, about 1,000 ref to about 15,000 ref, about 1,000 ref to about 10,000 ref, about 5,000 ref to about 20,000 ref, about 5,000 ref to about 15,000 ref, about 5,000 ref to about 10,000 ref, about 10,000 ref to about 30,000 ref, about 10,000 ref to about 25,000 ref, about 10,000 ref to about 20,000 ref or about 10,000 ref to about 15,000 ref. In certain embodiments, the polymer-solvent solution can be centrifuged for about 1 minute to about 60 minutes, e.g., from about 5 minutes to about 60 minutes, from about 10 minutes to about 60 minutes, about 1 minute to about 50 minutes, about 1 minute to about 40 minutes, about 1 minute to about 30 minutes, about 1 minute to about 20 minutes, about 1 minute to about 10 minutes, about 1 minute to about 5 minutes or about 5 minutes to about 20 minutes.

In certain embodiments, the polymer-solvent solution is processed, e.g., centrifuged, to substantially remove impurities from the solution. Non-limiting examples of impurities include wax and other additives. In certain embodiments, processing, e.g., centrifugation, of the polymer-solvent solution results in a solution that comprises impurities at an amount of less than about 10% w/v, less than about 9% w/v, less than about 8% w/v, less than about 7% w/v, less than about 6% w/v, less than about 5% w/v, less than about 4% w/v, less than about 3% w/v, less than about 2% w/v, less than about 1% w/v, less than about 0.9% w/v, less than about 0.8% w/v, less than about 0.7% w/v, less than about 0.6% w/v, less than about 0.5% w/v, less than about 0.4% w/v, less than about 0.3% w/v, less than about 0.2% w/v or less than about 0.1% w/v. In certain embodiments, processing, e.g., centrifugation, of the polymer-solvent solution results in a solution that comprises impurities at an amount of less than about 1% w/v. In certain embodiments, processing, e.g., centrifugation, of the polymer-solvent solution results in a solution that comprises impurities at an amount of less than about 0.5% w/v. In certain embodiments, processing, e.g., centrifugation, of the polymer-solvent solution results in a solution that comprises impurities at an amount of less than about 0.1% w/v. In certain embodiments, processing, e.g., centrifugation, of the polymer-solvent solution results in a homogenous solution to be applied to the working electrode.

In certain embodiments, the dip coating process can include depositing multiple layers. In certain embodiments, a single layer deposited by a single dip in the polymer-solvent solution can also be used to produce functional sensors. Alternatively, the membrane can be produced by a multiple dipping process. In certain embodiments, the dip-coating process can include (1) dipping the sensor tail into the membrane solution and (2) drying the membrane solution on the sensor tail. In certain embodiments, the membrane is dried at room temperature. In certain embodiments, steps (1) and (2) can be repeated until the membrane has the desired thickness. For example, but not by way of limitation, this dipping process can be repeated at least two times, at least three times, at least four time or at least five times. In certain embodiments, the membrane can be further heat treated (e.g., after drying at room temperature) to increase sensor stability and/or performance.

In certain embodiments, the membranes disclosed herein can be applied directly onto the sensing layer without a cross-linking step, e.g., as required for membranes that comprise polyvinylpyridine-based polymers. Not including a cross-linking step allows the use of a simple dip-coating process for applying a membrane disclosed herein to an analyte sensor.

In certain embodiments, the method can include generating a second working electrode, e.g., by screen printing, e.g., on the same substrate that has the first working electrode. In certain embodiments, the method can further include adding a composition comprising an enzyme system, e.g., a second enzyme system, onto a surface of the second working electrode to generate a second analyte-responsive active area on the second working electrode. In certain embodiments, a membrane of the present disclosure overcoats the second analyte-responsive active area.

In certain embodiments, a method for forming a mass transport limiting membrane on an analyte sensor that includes: (i) generating a first working electrode, e.g., on a substrate, (ii) adding a composition comprising one or more enzymes onto a surface of the working electrode to generate an analyte-responsive active area on the working electrode, (iii) generating a polymer-solvent solution comprising a polyurethane (e.g., at a concentration of about 50 mg/ml to about 100 mg/ml) and at least one solvent (e.g., an alcohol), and (iv) applying the polymer-solvent solution to the first working electrode (e.g., by dip coating). In certain embodiments, a method for forming a mass transport limiting membrane on an analyte sensor that includes: (i) generating a first working electrode, e.g., on a substrate, (ii) generating a polymer-solvent solution comprising a polyurethane (e.g., at a concentration of about 50 mg/ml to about 100 mg/ml) and at least one solvent (e.g., an alcohol), and (iii) applying the polymer-solvent solution to the first working electrode (e.g., by dip coating). In certain embodiments, the polyurethane is a polyurethane of the HydroThane™ and/or HydroMed™ series. In certain embodiments, the polyurethane is HydroMed™ D1 or HydroMed™ D6. In certain embodiments, the polyurethane is HydroThane™ 25-80A. In certain embodiments, generating a polymer-solvent solution comprising a polyurethane and at least one solvent includes combining the polyurethane and the at least one solvent, heating the resulting solution to dissolve the polyurethane in the solvent and processing, e.g., centrifuging, the solution to remove impurities, e.g., waxes, to generate a homogenous solution. In certain embodiments, the resulting homogenous solution can be applied to an analyte sensor, e.g., a working electrode of an analyte sensor, using a dip coating process.

In certain embodiments, the method can include adding a first layer comprising a polyurethane or a copolymer thereof on top of the cured enzyme composition or working electrode, e.g., by dip coating. In certain embodiments, the method can include adding a layer comprising a second polymer on top of the first layer comprising a polyurethane or a copolymer thereof, e.g., by dip coating. In certain embodiments, the method can include adding a second layer comprising a polyurethane or a copolymer thereof on top of the second polymer layer, e.g., by dip coating, to generate a trilayered membrane composition.

In certain embodiments, the present disclosure provides a method for forming a mass transport limiting membrane by dip coating that includes providing an analyte sensor comprising: a sensor tail comprising at least a first working electrode and a second working electrode that are spaced apart from one another along a length of the sensor tail; and a first active area disposed upon a surface of the first working electrode and a second active area disposed upon a surface of the second working electrode, the first active area and the second active area being responsive to different analytes; and depositing a mass transport limiting membrane upon the first active area and the second active area by sequential dip coating operations; wherein the mass transport limiting membrane comprises a bilayer membrane portion overcoating the first active area and a homogeneous membrane portion overcoating the second active area. In certain embodiments, the method includes performing a first dip coating operation that deposits a first membrane polymer upon the first active area and a second dip coating operation that deposits a second membrane polymer upon both the first active area and the second active area to define the bilayer membrane portion upon the first active area and the homogeneous membrane portion upon the second active area, the first membrane polymer and the second membrane polymer differing from one another. In certain embodiments, the dip-coated bilayer membrane portion and the dip-coated homogeneous membrane portion are contiguous with one another.

The present disclosure is further illustrated by the following embodiments.

(1) An analyte sensor comprising a working electrode, a sensing layer disposed on at least a portion of the working electrode, and a hydrophilic polyurethane membrane overcoating at least the sensing layer, wherein the hydrophilic polyurethane is aliphatic, aromatic, or both aliphatic and aromatic.

(2) The analyte sensor of (1), wherein the hydrophilic polyurethane comprises an aliphatic hydrophilic polyurethane comprising a reaction product of an aliphatic organic diisocyanate and a diol.

(3) The analyte sensor of (2), wherein the aliphatic organic diisocyanate is selected from the group consisting of isophorone diisocyanate (IPDI), 1,4-cyclohexyl diisocyanate (CHDI), decane-1,10-diisocyanate, lysine diisocyanate (LDI), 1,4-butane diisocyanate (BDI), 1,5-pentanediisocyanate (PDI), hydrogenated xylene diisocyanate (HXDI), 2,2,4-trimethylhexamethylene diisocyanate (TMDI), hexamethylene diisocyanate (HDI), dicyclohexylmethane-4,4'-diisocyanate ($H_{12}$MDI), 1,3-bis(isocyanatemethyl) cyclohexane (BIMC), biuret, and combinations thereof.

(4) The analyte sensor of any one of (1)-(3), wherein the hydrophilic polyurethane comprises an aromatic hydrophilic polyurethane comprising a reaction product of an aromatic organic diisocyanate and a diol.

(5) The analyte sensor of (4), wherein the aromatic organic diisocyanate is selected from the group consisting of methylene diphenyl diisocyanate (MDI), toluene diisocyanate (TDI), o-toluidine diisocyanate (TODI), 4,4'-diphenylmethane diisocyanate, p-phenylene diisocyanate (PPDI), xylene diisocyanate, hexamethylene diisocyanate, toluene diisocyanate, 1,5-naphthalene diisocyanate (NDI), polymeric MDI, and combinations thereof.

(6) The analyte sensor of any one of (2)-(5), wherein the diol is selected from the group consisting of a polyether polyol, polylactide diol, polyglycolide diol, poly(lactide-b-glycolide), poly(lactide-co-caprolactone) diol, poly(hexamethylene carbonate) diol, polycarbonate diol, poly(ethylene terephthalate diol), poly(ethylene adipate) diol, poly(butylene adipate) diol, fatty acid-based linear diol, castor oil-based diol, soybean oil-based diol, ethylene glycol, diethylene glycol, propylene glycol, dipropylene glycol, 1,4-butanediol (BDO), 1,6-hexanediol (HDO), 1,3-butanediol, 2-methyl-1,3-propanediol, 1,5-pentanediol, neopentylglycol, 1,4-cyclohexanedimethanol (CHDM), 2,2-bis[4-(2-hydroxyethoxy) phenyl]propane (HEPP), hexamethylenediol, heptanediol, nonanediol, dodecanediol, 3-methyl-1,5-pentanediol, glycerine, sorbitol, sucrose, xylitol, pentaerythritol, ethylenediamine, butanediamine, hexamethylenediamine, hydroxyethyl resorcinol (HER), poly(tetramethylene ether) glycol (PTMG), poly(polytetrahydrofuran carbonate) diol, bis(2-hydroxyethyl)terephthalate (BHET), and a combination thereof.

(7) The analyte sensor of (6), wherein the polyether polyol is a hydroxyl-terminated polyether polyol derived from a diol or polyol having a total of from 2 to 15 carbon atoms.

(8) The analyte sensor of (6) or (7), wherein the polyether polyol is selected from the group consisting of polycaprolactone diol, poly(hydroxybutyrate) diol, poly(butyleneglycol) diol, polypropylene oxide diol, poly(ethylene glycol diol), poly(tetramethylene oxide diol), and a combination thereof.

(9) The analyte sensor of any (2)-(8), wherein the polyurethane comprises a reaction product of a diisocyanate, a diol, and a chain extender.

(10) The analyte sensor of (9), wherein the chain extender comprises a diol or polyol, each comprising 2 to 20 carbon atoms.

(11) The analyte sensor of (9) or (10), wherein the chain extender is selected from the group consisting of ethylene glycol, diethylene glycol, propylene glycol, dipropylene glycol, 1,4-butanediol (BDO), 1,6-hexanediol (HDO), 1,3-butanediol, 2-methyl-1,3-propanediol, 1,5-pentanediol, neopentylglycol, 1,4-cyclohexanedimethanol (CHDM), 2,2-bis[4-(2-hydroxyethoxy) phenyl]propane (HEPP), hexamethylenediol, heptanediol, nonanediol, dodecanediol, 3-methyl-1,5-pentanediol, glycerine, sorbitol, sucrose, xylitol, pentaerythritol, ethylenediamine, butanediamine, hexamethylenediamine, hydroxyethyl resorcinol (HER), poly(tetramethylene ether) glycol (PTMG), poly(polytetrahydrofuran carbonate) diol, bis(2-hydroxyethyl) terephthalate (BHET), and combinations thereof.

(12) The analyte sensor of any one of (1)-(11), wherein the hydrophilic polyurethane is a thermoplastic polyurethane elastomer.

(13) The analyte sensor of any one of (1)-(12), wherein the hydrophilic polyurethane has a Shore A hardness of at least about 60A.

(14) The analyte sensor of any one of (1)-(13), wherein the hydrophilic polyurethane has a Shore A hardness of at most about 90A.

(15) The analyte sensor of any one of (1)-(14), wherein the hydrophilic polyurethane is capable of absorbing about 5%-25% by weight of water.

(16) The analyte sensor of any one of (1)-(15), wherein the hydrophilic polyurethane membrane limits the transport of mass to the sensing layer.

(17) The analyte sensor of any one of (1)-(16), wherein the hydrophilic polyurethane membrane is not crosslinked.

(18) The analyte sensor of any one of (1)-(17), wherein the analyte sensor provides consistent analyte measurements over a temperature range of about 22-42° C.

(19) The analyte sensor of any one of (1)-(18), further comprising a reference electrode, a counter electrode, or both a reference electrode and a counter electrode.

(20) The analyte sensor of any one of (1)-(19), further comprising a sensor housing.

(21) The analyte sensor of any one of (1)-(20), further comprising a sensor tail configured for implantation into a tissue, wherein the working electrode is disposed on the sensor tail.

(22) The analyte sensor of any one of (1)-(21), further comprising at least one insulation layer.

(23) The analyte sensor of any one of (1)-(22), further comprising a substrate, wherein the working electrode is disposed on the substrate.

(24) The analyte sensor of any one of (1)-(23), wherein the hydrophilic polyurethane membrane overcoats at least the sensing layer and working electrode.

(25) The analyte sensor of any one of (1)-(23), wherein the hydrophilic polyurethane membrane overcoats the analyte sensor in its entirety.

(26) The analyte sensor of any one of (1)-(25), wherein the sensing layer comprises an analyte responsive enzyme and a redox mediator.

(27) The analyte sensor of (26), wherein the redox mediator comprises a polymer and an electron transfer agent.

(28) The analyte sensor of (27), wherein the polymer comprises a poly(vinylpyridine), poly(thiophene), poly(aniline), poly(pyrrole), or poly(acetylene) backbone.

(29) The analyte sensor of (27) or (28), wherein the polymer comprises a polymer or copolymer repeat unit comprising at least one pendant pyridinyl group, imidazolyl group, or both a pyridinyl and imidazolyl group.

(30) The analyte sensor of any one of (27)-(29), wherein the electron transfer agent comprises a transition metal complex.

(31) The analyte sensor of (30), wherein the transition metal complex comprises osmium, ruthenium, iron, cobalt, vanadium, or a combination thereof.

(32) The analyte sensor of (30) or (31), wherein the transition metal complex is an osmium transition metal complex comprising one or more ligands, wherein at least one ligand comprises a nitrogen-containing heterocycle.

(33) The analyte sensor of any one of (26)-(32), wherein the redox mediator comprises an osmium complex bonded to a poly(vinylpyridine)-based polymer.

(34) The analyte sensor of any one of (26)-(33), wherein the redox mediator further comprises a cross linking agent.

(35) The analyte sensor of (34), wherein the cross linking agent is a polyepoxide, cyanuric chloride, N-hydroxysuccinimide, an imidoester, epichlorohydrin, or a combination thereof.

(36) The analyte sensor of (34) or (35), wherein the cross linking agent is a polyethylene glycol diglycidylether (PEGDGE).

(37) The analyte sensor of any one of (26)-(36), wherein the analyte responsive enzyme is attached to the redox mediator.

(38) The analyte sensor of any one of (1)-(37), wherein the sensing layer is continuous on the working electrode.

(39) The analyte sensor of any one of (1)-(37), wherein the sensing layer is discontinuous on the working electrode.

(40) A method of forming an analyte sensor comprising providing a working electrode, disposing a sensing layer on at least a portion of the working electrode, and coating at least the sensing layer with a hydrophilic polyurethane membrane, wherein the hydrophilic polyurethane is aliphatic, aromatic, or both aliphatic and aromatic.

(41) The method of (40), wherein coating comprises dipping the analyte sensor comprising the sensing layer into a solution comprising the hydrophilic polyurethane and at least one solvent to provide a dipped analyte sensor.

(42) The method of (41), further comprising heating the dipped analyte sensor to dry and/or condition the hydrophilic polyurethane membrane.

(43) The method of (41) or (42), wherein the solvent comprises 2-methyl-tetrahydrofuran, ethanol, 1,4-dioxane, water, or mixtures thereof.

(44) The method of any one of (41)-(43), wherein the solution is formed by combining the hydrophilic polyurethane and solvent until the polyurethane absorbs the solvent and forms a polyurethane-solvent mixture, heating the polyurethane-solvent mixture until the polyurethane is dissolved in the solvent, and optionally removing any solids that form.

(45) An analyte sensor comprising: (i) a sensor tail comprising a first working electrode configured for detecting an analyte; and (ii) a mass transport limiting membrane permeable to the analyte that overcoats at least a portion of the working electrode, wherein the mass transport limiting membrane comprises a polyurethane or a copolymer comprising a polyurethane.

(46) The analyte sensor of (45), wherein the polyurethane is capable of absorbing from about 5% to about 95% of its weight in water.

(47) The analyte sensor of (45) or (46), wherein the polyurethane has a hardness from about 70 to about 93 Shore A.

(48) The analyte sensor of any one of (45)-(47), wherein the mass transport limiting membrane consists of a single polyurethane polymer or a single copolymer comprising a polyurethane.

(49) The analyte sensor of any one of (45)-(48), wherein the copolymer comprises a polyurethane and a second polymer.

(50) The analyte sensor of any one of (45)-(47), wherein the mass transport limiting membrane comprises a blend of the polyurethane and a second polymer.

(51) The analyte sensor of (49) or (50), wherein the second polymer is a hydrophilic polymer.

(52) The analyte sensor of (51), wherein the hydrophilic polymer is selected from the group consisting of a polyether, a polyester, a polyalkene, a polyamine, a polyalkylene oxide, a polyalkylene glycol, a polyacrylate, a polymethacrylate, a thiolene polymer, alginate, chitosan, polyvinylpyrrolidone, polyvinyl alcohol, polyvinyl acetate, polysorbate, a hydrophilic polyurethane, a polyvinylpyridine-based polymer and a pluronic.

(53) The analyte sensor of (52), wherein the polyvinylpyridine-based polymer is a polyvinylpyridine polymer, a poly(4-vinylpyridine-co-styrene) polymer and/or a poly(4-vinylpyridine-co-styrene) copolymer derivatized with propylsulfonate and poly(ethyleneoxide) moieties.

(54) The analyte sensor of any one of (45)-(53) further comprising an analyte-responsive active area disposed upon the first working electrode for detecting the analyte.

(55) The analyte sensor of (54), wherein the analyte-responsive active area comprises one or more enzymes responsive to the analyte.

(56) The analyte sensor of (55), wherein the analyte-responsive active area further comprises one or more of the following: an electron transfer agent, a stabilizer and a coenzyme.

(57) The analyte sensor of any one of (45)-(56), wherein the analyte is selected from the group consisting of glucose, glutamate, creatinine, alcohol, sarcosine, creatine, ketones, lactate and a combination thereof.

(58) The analyte sensor of any one of (54)-(57), wherein the one or more enzymes comprises: (a) glucose oxidase or glucose dehydrogenase for detecting glucose; (b) glutamate oxidase or glutamate dehydrogenase for detecting glutamate; (c) lactate dehydrogenase or lactate oxidase for detecting lactate; (d) β-hydroxybutyrate dehydrogenase for detecting ketones; (e) alcohol dehydrogenase for detecting alcohol; or (f) amidohydrolase, creatine amidinohydrolase and sarcosine oxidase for detecting creatinine.

(59) The analyte sensor of any one of (45)-(53), wherein the analyte is directly oxidized at the first working electrode.

(60) The analyte sensor of (59), wherein the analyte is ascorbate.

(61) The analyte sensor of any one of (45)-(60), further comprising: (iii) a second working electrode configured for detecting a second analyte or for detecting a background signal, wherein a second portion of the mass transport limiting membrane overcoats the second working electrode and/or a second mass transport limiting membrane overcoats the second working electrode.

(62) A method for detecting an analyte comprising: (i) providing an analyte sensor comprising: (a) a sensor tail comprising a first working electrode configured for detecting a first analyte; and (b) a mass transport limiting membrane permeable to the analyte that overcoats at least a portion of the working electrode, wherein the mass transport limiting membrane comprises a polyurethane or a copolymer comprising a polyurethane; (ii) applying a potential to the first working electrode; (iii) obtaining a first signal from the first working electrode, the first signal being proportional to a concentration of the first analyte in a fluid contacting the first working electrode; and (iv) correlating the first signal to the concentration of the first analyte in the fluid.

(63) The method of (62), wherein the polyurethane is capable of absorbing from about 5% to about 95% of its weight in water.

(64) The method of (62) or (63), wherein the polyurethane has a hardness from about 70 to about 93 Shore A.

(65) The method of any one of (62)-(64), wherein the mass transport limiting membrane consists of a single polyurethane polymer or a single copolymer comprising a polyurethane.

(66) The method of any one of (62)-(65), wherein the copolymer comprises a polyurethane and a second polymer.

(67) The method of any one of (62)-(64), wherein the mass transport limiting membrane comprises a blend of the polyurethane and a second polymer.

(68) The method of (66) or (67), wherein the second polymer is a hydrophilic polymer.

(69) The method of (68), wherein the hydrophilic polymer is selected from the group consisting of a polyether, a polyester, a polyalkene, a polyamine, a polyalkylene oxide, a polyalkylene glycol, a polyacrylate, a polymethacrylate, a thiolene polymer, alginate, chitosan, polyvinylpyrrolidone, polyvinyl alcohol, polyvinyl acetate, polysorbate, a hydrophilic polyurethane, a polyvinylpyridine-based polymer and a pluronic.

(70) The method of (69), wherein the polyvinylpyridine-based polymer is a polyvinylpyridine polymer, a poly(4-vinylpyridine-co-styrene) polymer and/or a poly(4-vinylpyridine-co-styrene) copolymer derivatized with propylsulfonate and poly(ethyleneoxide) moieties.

(71) The method of any one of (62)-(70), wherein the sensor tail further comprises an analyte-responsive active area disposed upon the first working electrode for detecting the analyte.

(72) The method of (71), wherein the analyte-responsive active area comprises one or more enzymes responsive to the analyte.

(73) The method of (72), wherein the analyte-responsive active area further comprises one or more of the following: an electron transfer agent, a stabilizer and a coenzyme.

(74) The method of any one of (62)-(73), wherein the analyte is selected from the group consisting of glucose, glutamate, creatinine, alcohol, sarcosine, creatine, ketones, lactate and a combination thereof.

(75) The method of any one of (72)-(74), wherein the one or more enzymes comprises: (a) glucose oxidase or glucose dehydrogenase for detecting glucose; (b) glutamate oxidase or glutamate dehydrogenase for detecting glutamate; (c) lactate dehydrogenase or lactate oxidase for detecting lactate; (d) β-hydroxybutyrate dehydrogenase for detecting ketones; (e) alcohol dehydrogenase for detecting alcohol; or (f) amidohydrolase, creatine amidinohydrolase and sarcosine oxidase for detecting creatinine.

(76) The method of any one of (62)-(70), wherein the analyte is directly oxidized at the first working electrode.

(77) The method of (76), wherein the analyte is ascorbate.

(78) The method of any one of (62)-(77), wherein the analyte sensor further comprises: (c) a second working electrode configured for detecting a second analyte differing from the first analyte or for detecting a background signal; wherein a second portion of the mass transport limiting membrane overcoats the second working electrode and/or a second mass transport limiting membrane overcoats the second working electrode.

(79) The method of (78), wherein the background signal can be subtracted from the first signal obtained from the first working electrode to obtain the concentration of the first analyte in the fluid.

(80) A method of manufacturing an analyte sensor, the method comprising: (i) providing a working electrode configured for detecting an analyte; and (ii) dip-coating the working electrode in a solution comprising a polyurethane or a copolymer comprising a polyurethane and a solvent system.

(81) The method of (80), wherein the solution is centrifuged prior to dip-coating the working electrode in the solution.

(82) The method of (81), wherein the solution after centrifugation comprises impurities at an amount of less than about 5% w/v, less than about 4% w/v, less than about 3% w/v, less than about 2% w/v, less than about 1% w/v, less than about 0.9% w/v, less than about 0.8% w/v, less than about 0.7% w/v, less than about 0.6% w/v, less than about 0.5% w/v, less than about 0.4% w/v, less than about 0.3% w/v, less than about 0.2% w/v or less than about 0.1% w/v.

(83) The method of any one of (80)-(82), wherein the solvent system comprises alcohol.

(84) The method of any one of (80)-(83), wherein the solvent system further comprises a second component.

(85) The method of (84), wherein the second component comprises a solvent that is miscible with the alcohol of the solvent.

(86) The method of (85), wherein the second component comprises water.

(87) The method of (85), wherein the second component comprises a cyclic compound.

(88) The method of (87), wherein the cyclic compound is methyl-tetrahydrofuran or cyclopentyl methyl ether.

(89) The method of any one of (84)-(88), wherein the solvent system comprises a ratio of the alcohol solvent to the second component of about 1:1 to about 9:1.

(90) The method of any one of (83)-(89), wherein the alcohol is ethanol.

(91) The method of any one of (80)-(90), wherein the polyurethane or the copolymer comprising a polyurethane is present in the solution at a concentration of about 50 mg/ml to about 100 mg/ml.

(92) The method of any one of (80)-(91), wherein the solution consists of a single polyurethane polymer or a single copolymer comprising a polyurethane.

(93) The method of any one of (80)-(92), wherein the method further comprises depositing a composition comprising an enzyme onto a surface of the working electrode to generate at least one active area on the working electrode prior to dip-coating the working electrode.

(94) The method of (93), wherein the at least one active area further comprises one or more of the following: an electron transfer agent, a stabilizer and a coenzyme.

(95) The method of any one of (80)-(94), wherein the analyte is selected from the group consisting of glucose, glutamate, creatinine, alcohol, sarcosine, creatine, ketones, lactate, ascorbate and a combination thereof.

(96) An analyte sensor generated by the method of any one of (80)-(95).

(97) A method for detecting an analyte: (i) providing an analyte sensor generated by the method of any one of (80)-(95); (ii) applying a potential to the first working electrode; (iii) obtaining a first signal from the first working electrode, the first signal being proportional to a concentration of the first analyte in a fluid contacting the first working electrode; and (iv) correlating the first signal to the concentration of the first analyte in the fluid.

(98) The method of (97), wherein the analyte sensor further comprises a second working electrode configured for detecting a second analyte differing from the first analyte or for detecting a background signal.

(99) The analyte sensor of any one of (45)-(61), wherein at least 95% w/w or more, at least 96% w/w or more, at least 97% w/w or more, at least 98% w/w or more, at least 99% w/w or more, at least 99.1% w/w or more, at least 99.2% w/w or more, at least 99.3% w/w or more, at least 99.4% w/w or more, at least 99.5% w/w or more, at least 99.6% w/w or more, at least 99.7% w/w or more, at least 99.8% w/w or more or at least 99.9% w/w or more of the mass transport limiting membrane comprises the polyurethane polymer or the copolymer comprising a polyurethane.

EXAMPLES

The example presented below is provided for the purpose of illustration only and the embodiments described herein should in no way be construed as being limited to this example. Rather, the embodiments should be construed to encompass any and all variations which become evident as a result of the teaching provided herein.

Example 1

Glucose was used as a model for these examples, but the principle can be applied to many analytes of interest, as described herein. An analyte sensor comprising a Gly-3 crosslinked 10Q5-01 (crosslinked poly(4-vinylpyridine)-based membrane) was used as a control. Inventive analyte sensors were formed using two different polyurethanes with similar water absorbance capacities (about 25 wt %) and hardnesses (about 80 Shore A). One polyurethane was aliphatic (HYDROTHANE™ AL25-80A (AdvanSource Biomaterial, Wilmington, MA)), and the other polyurethane was aromatic (HYDROTHANE™ AR25-80A (AdvanSource Biomaterial, Wilmington, MA)). All sensors were made with the same sensing layer composition that was deposited multiple times on a substrate, which was then cut to form a single sensor.

Sensors were dipped immediately after the final mixing step. Approximately 4 mm depth of a sensor tail was dipped into the polymer solution using a 1 mm/sec entry and exit speed from the dipping bath solution. Four layers were dipped with five minute wait times in between each dip. Sensors were stored overnight at room temperature in desiccant vials before testing.

Hydrophilic Aromatic Polyurethane Membrane

The AR25-80A resin was dissolved at 50 mg/ml in a 9:1 mixture of 1,4-dioxane to water overnight on a roller mixer at room temperature. The solution was transferred to a sealed vial and placed in a 65° C. oven for 2 hours. Next, the vial was returned to the roller mixer for an additional 1 hour mixing at room temperature. Approximately 10 ml of polymer solution was generated and used for dipping sensor membranes.

Sensors were dipped immediately after the final mixing step. Approximately 4 mm depth of a sensor tail was dipped into the polymer solution. Using a 1 mm/sec entry and exit speed from the dipping bath solution, two layers were dipped. Next, using a 3 mm/sec entry and exit speed from the dipping bath solution, four layers were dipped to provide a total of 6 layers. Five minute dry time between all dips was performed. Sensors were stored overnight at room temperature in desiccant vials before testing.

Testing

Sensors (n=8 for each type of sensor for 24 total sensors) were tested in 100 mM PBS (pH=7.4) in a 10 mM glucose solution using standard amperometry at +40 mV vs Ag/AgCl. Sensor output currents were allowed to stabilize at 33° C. and then subjected to the following dynamic temperature profile: 33° C.→22° C.→27° C.→32° C.→37° C.→42° C.→37° C.→32° C.→27° C.→22° C.→33° C. Temperature steps were invoked every 2 hours and were done so with a jacketed beaker and programmable water bath. Time and current were recorded at a 5 minute data acquisition (DAQ) rate using a multichannel potentiostat.

Figure 7:
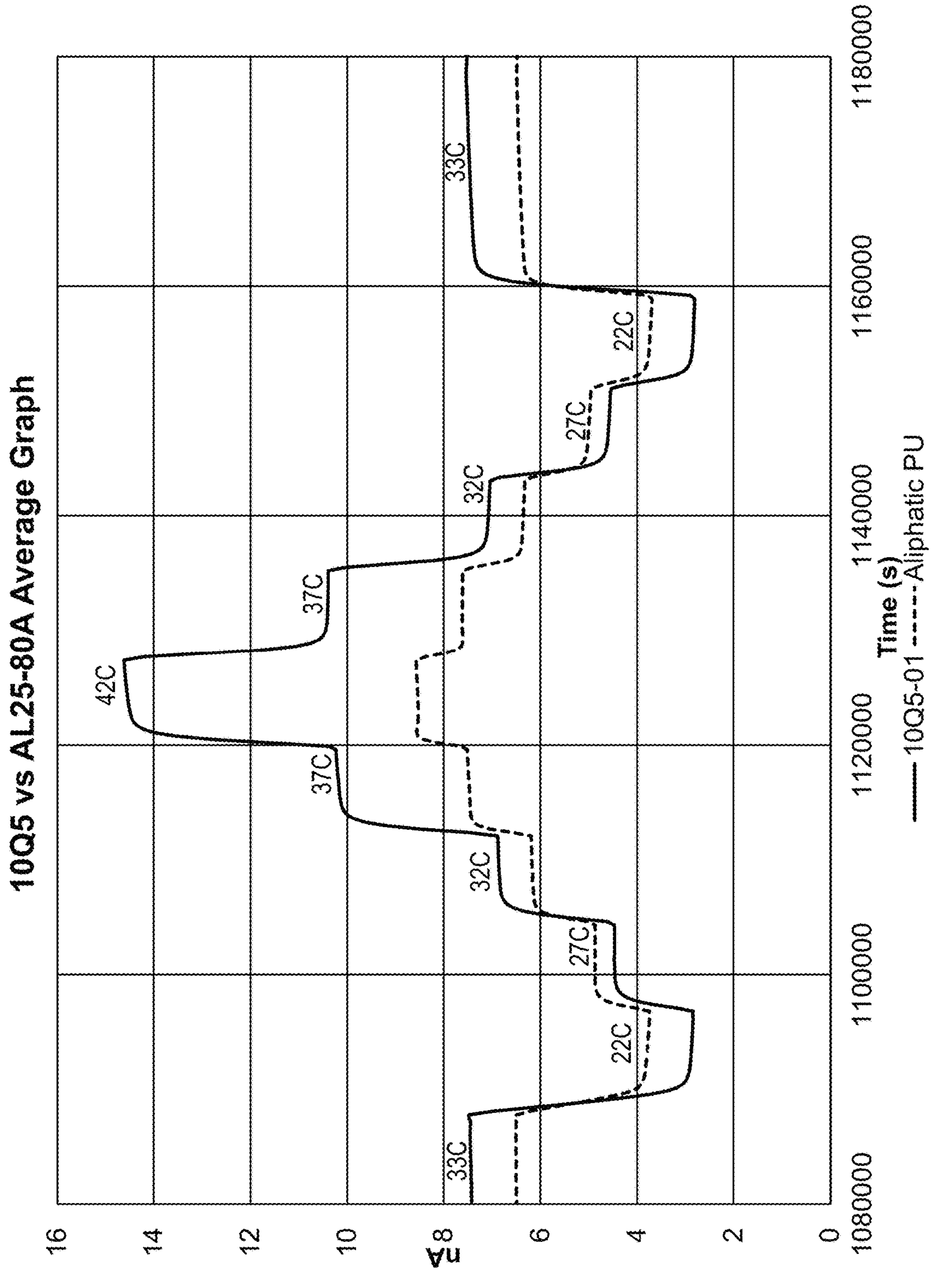
FIG. 7 shows a sensor current (nA) versus time (seconds) plot of an exemplary analyte sensor of the present disclosure comprising a hydrophilic aliphatic polyurethane membrane (bottom dotted line) compared to an analyte sensor comprising a 10Q5-01 (crosslinked poly(4-vinylpyridine)) membrane as a control (top solid line).

The graph in FIG. 7 shows the average results when the analyte sensor comprising an aliphatic polyurethane membrane was compared to an analyte sensor comprising a crosslinked 10Q5-01 membrane. The 10Q5-01 sensors demonstrated an exponentially increasing current with temperature; whereas the polyurethane sensors exhibited a more linear increase. Table 1 shows the percent increase per degree throughout the temperature ranges. The 10Q5-01 sensor values were calculated using the compounded interest (exponential) formula, and the polyurethane sensors utilized a linear formula.

TABLE 1

| | % Increase per Degree | | | | | | | | | |
|---|---|---|---|---|---|---|---|---|---|---|
| | 33 to 22° C. | 22 to 27° C. | 27 to 32° C. | 32 to 37° C. | 37 to 42° C. | 42 to 37° C. | 37 to 32° C. | 32 to 27° C. | 27 to 22° C. | 22 to 33° C. |
| 10Q5-01 | −8.39% | 10.22% | 8.27% | 8.29% | 7.40% | −6.59% | −7.49% | −8.34% | −9.25% | 9.29% |
| Aliphatic Polyurethane | −3.86% | 6.75% | 4.72% | 4.29% | 2.81% | −2.23% | −3.37% | −4.30% | −5.16% | 6.76% |

Hydrophilic Aliphatic Polyurethane Membrane

The AL25-80A resin was dissolved at 75 mg/ml in a 1:1 mixture of ethanol to 2-methyl-tetrahydrofuran overnight on a roller mixer at room temperature. The solution was transferred to a sealed vial and placed in a 65° C. oven for 2 hours. Next, the vial was returned to the roller mixer for an additional 1 hour mixing at room temperature. Approximately 10 ml of polymer solution was generated and used for dipping sensor membranes.

As seen in FIG. 7 and Table 1, the effect of temperature (the magnitude of the % current change per degree) was significantly reduced in the analyte sensor comprising a hydrophilic aliphatic polyurethane membrane (average % increase per degree: 4.43%) as compared with the analyte sensor comprising a 10Q5-01 membrane (average % increase per degree: 8.35%) throughout all ranges tested. On average, the average temperature effect for the inventive analyte sensor was reduced by about 50% compared to an analyte sensor comprising a crosslinked poly(4-vinylpyridine)-based membrane.

Figure 8:
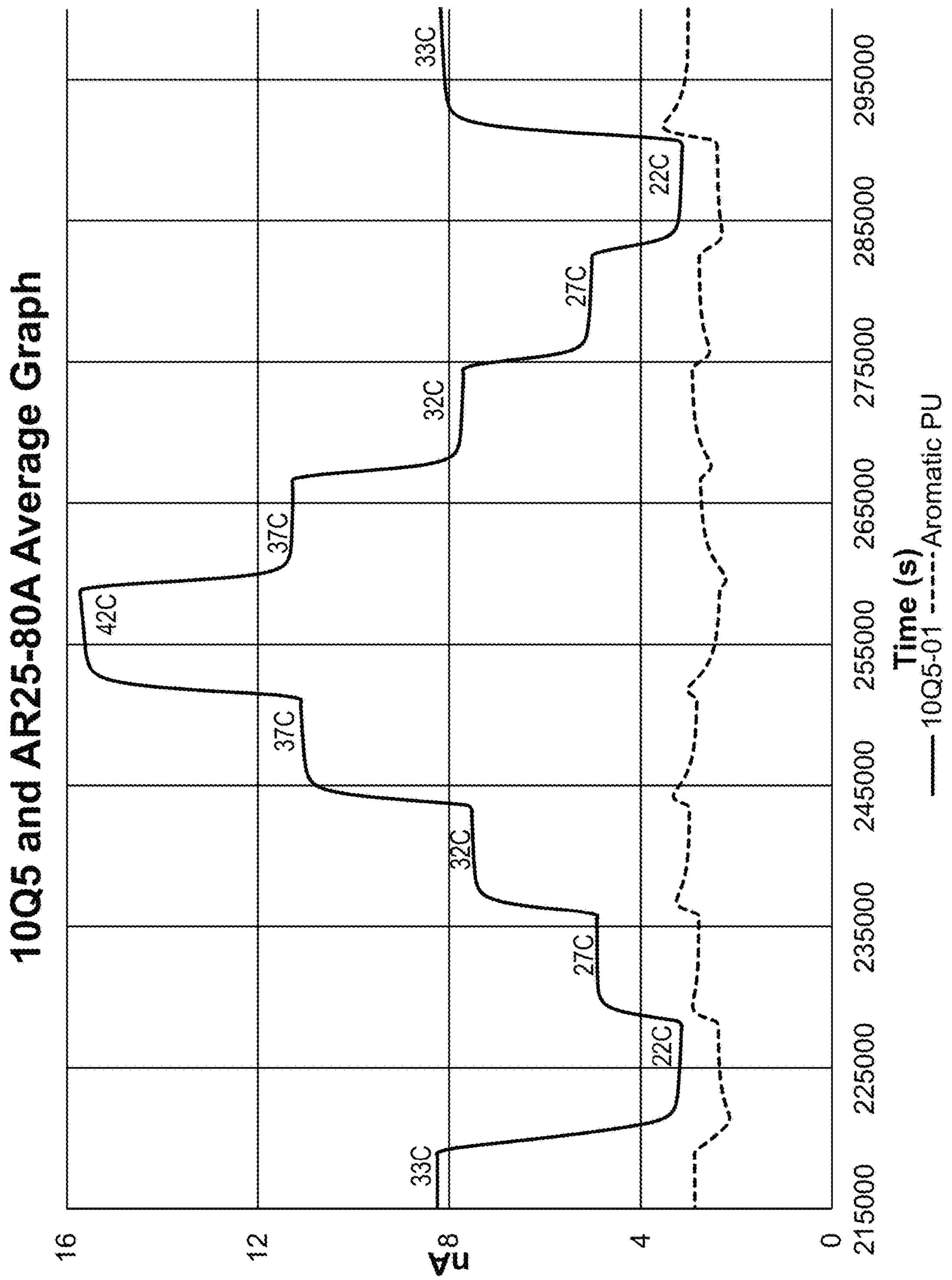
FIG. 8 shows a sensor current (nA) versus time (seconds) plot of an exemplary analyte sensor of the present disclosure comprising a hydrophilic aromatic polyurethane membrane (bottom dotted line) compared to an analyte sensor comprising a 10Q5-01 (crosslinked poly(4-vinylpyridine)) membrane as a control (top solid line).

The graph in FIG. 8 shows the average results when the analyte sensor comprising an aromatic polyurethane membrane was compared to an analyte sensor comprising a crosslinked 10Q5-01 membrane. The 10Q5-01 sensors demonstrated an exponentially increasing current with temperature; whereas, the polyurethane sensors exhibited a more linear increase. Table 2 shows the percent increase per degree throughout the temperature ranges. The 10Q5-01 sensor values were calculated using the compounded interest (exponential) formula, and the polyurethane sensors utilized a linear formula.

TABLE 2

| | % Increase per Degree | | | | | | | | | |
|---|---|---|---|---|---|---|---|---|---|---|
| | 33 to 22° C. | 22 to 27° C. | 27 to 32° C. | 32 to 37° C. | 37 to 42° C. | 42 to 37° C. | 37 to 32° C. | 32 to 27° C. | 27 to 22° C. | 22 to 33° C. |
| 10Q5-01 | −8.20% | 8.86% | 9.16% | 7.84% | 7.14% | −6.38% | −7.36% | −8.21% | −9.05% | 9.08% |
| Aromatic Polyurethane | −1.37% | 2.86% | 1.70% | −1.30% | −3.47% | 3.53% | 1.25% | −1.00% | −2.67% | 2.33% |

As seen in FIG. 8 and Table 2, the effect of temperature (the magnitude of the % current change per degree) was significantly reduced in the analyte sensor comprising a hydrophilic aliphatic polyurethane membrane (average % increase per degree: 2.15%) as compared with the analyte sensor comprising a 10Q5-01 membrane (average % increase per degree: 8.13%) throughout all ranges tested. On average, the average temperature effect for the inventive analyte sensor was reduced by about 75% compared to an analyte sensor comprising a crosslinked poly(4-vinylpyridine)-based membrane. Noteworthy is the further reduction by the aromatic polyurethane over that the aliphatic polyurethane.

Example 2

This example provides glucose sensors, which have mass limiting membranes comprising ether-based polyurethanes.

An analyte sensor tail having a working electrode with an active area including glucose oxidase, a reference electrode and a counter electrode was dipped in a solution of the polyurethane polymer HydroMed™ D6. The polymer was dissolved in either 1:1 EtOH to THE v/v or 9:1 EtOH to water v/v. The sensor tails were dipped in a 75 mg/ml solution with a 1 mm/sec bath entry and exit speed, then dried in ambient conditions (temperature: 68-72° F. (20-22.2° C.) and relative humidity (RH): 50-70%) for 10 minutes and the process was repeated for a total of 5 dips for the 1:1 EtOH to THE v/v solution or 4 dips for the 9:1 EtOH to water v/v solution. The resulting analyte sensors were tested in 100 mM PBS at 33° C. with 50, 100 and 200 μM glucose added. Chronoamperometric measurements showing performance of these sensors are shown in FIG. 9. Particularly, FIG. 9 shows the signal output over 12 hours at varying concentrations of glucose.

Figure 10:
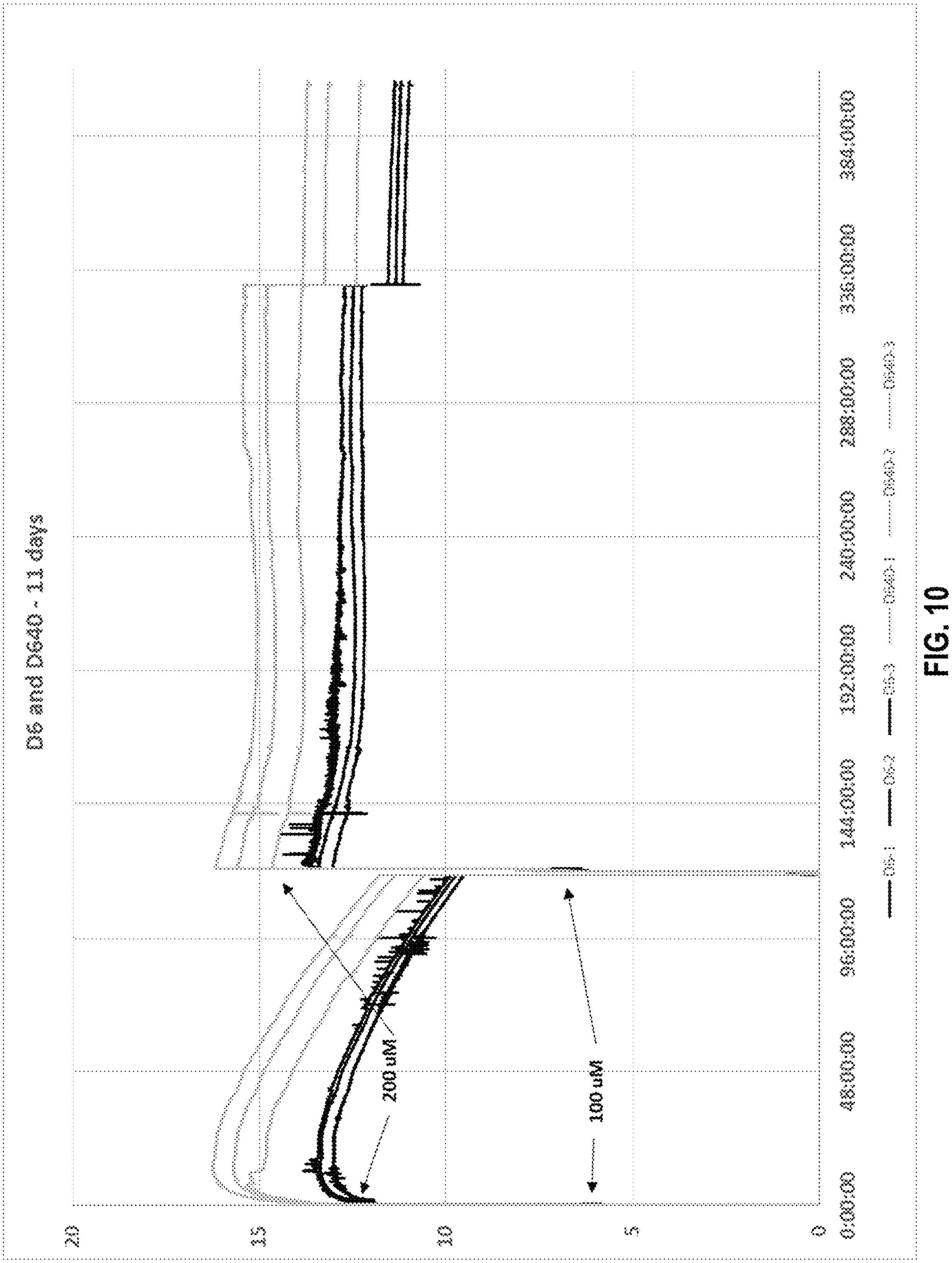
FIG. 10 shows a chronoamperometry of nA vs time for a glucose sensor according to certain other embodiments of the present disclosure.

Similarly, an analyte sensor tail having a working electrode with an active area including glucose oxidase, a reference electrode and a counter electrode was dipped in a solution of the polyurethane polymer HydroMed™ D640, which had been dissolved in 9:1 EtOH to water v/v. The dipping process was the same as above for the HydroMed® D6 polymer. The resulting analyte sensors were tested in 100 mM PBS at 33° C. with 200 μM glucose added. FIG. 10 shows chronoamperometry of nA vs time for the glucose sensor coated with HydroMed™ D640 and the glucose sensor coated with HydroMed™ D6. Initial loss in signal is attributed to glucose loss due to bacteria growth, recalibration at day 5 shows that the signal is maintained and continued in a stable manner out to day 11.

Example 3

This example provides a creatinine sensor, which has a mass limiting membrane comprising a PEG-based polyurethane. The polyurethane had a 25 wt % water absorption capacity and 80A durometer.

An analyte sensor tail having working electrode with an active area including sarcosine oxidase, creatine amidohydrolase and creatinine amidohydrolase, a reference electrode and a counter electrode was dipped in a 75 mg/ml solution of the polyurethane polymer HydroThane™ 25-80A, which had been dissolved in 1:1 EtOH to THF v/v and dip-coated onto the analyte sensor tail. The solution was generated by heat treating the polymer at 85° C. overnight to dry out completely prior to dissolving. Dissolving was assisted by heating to 65° C. in an oven for an hour after a day of agitation a roller mixer, followed by returning the solution to the roller to complete dissolving. The solution was then centrifuged at 13,751 rcf for 10 minutes at 20° C. to remove any impurities. Dip-coating was performed with the 75 mg/ml solution at room temperature with 5 mm/s entry and exit speeds at ambient conditions for a total of 5 dips. Sensors were dried overnight in air and then aged for 2 days at 45° C. to further condition the membrane and sensing layer.

Figure 11:
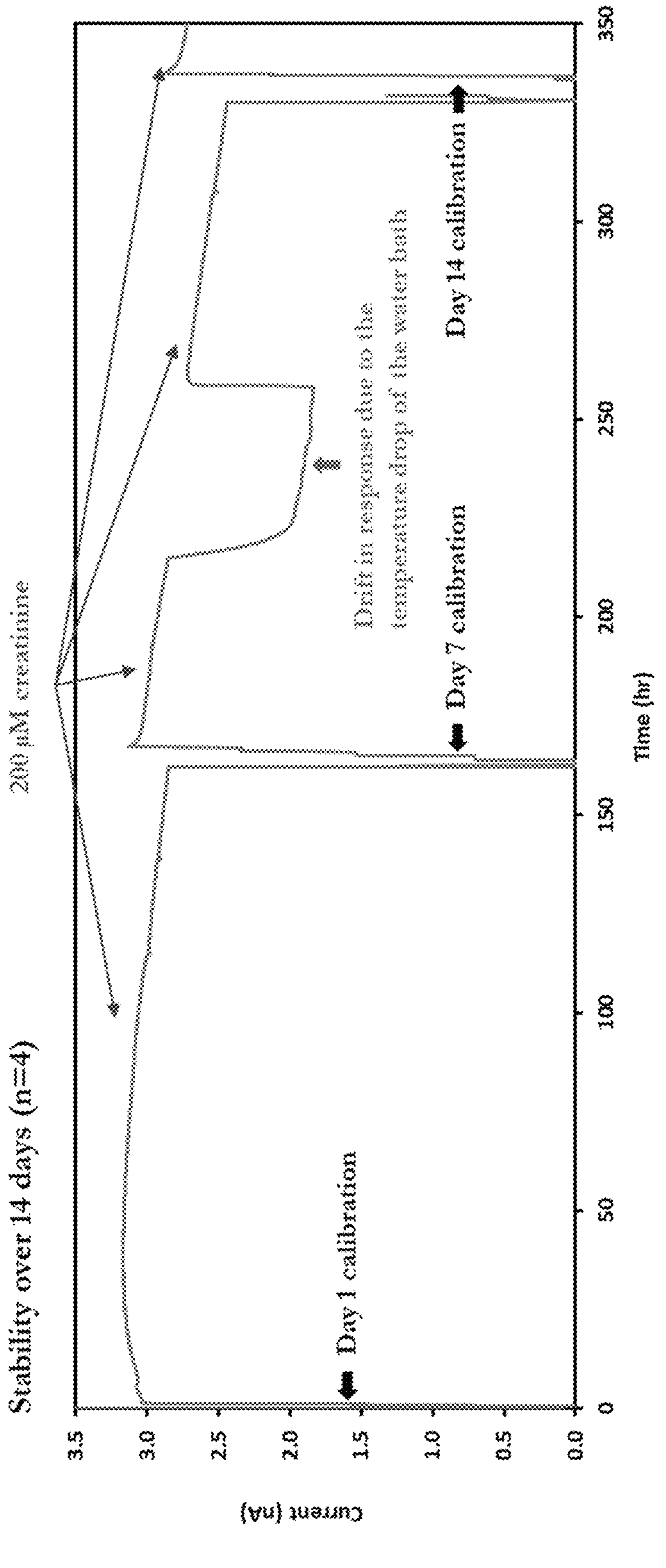
FIG. 11 shows a chronoamperometry of nA vs time for stability of creatinine sensors according to certain embodiments of the present disclosure.

The resulting analyte sensors were tested in 100 mM PBS w/3 mM KCl at 33° C. FIG. 11 provides chronoamperometry of nA vs time for stability of said sensors. Loss in signal during stability is largely attributed to creatinine loss due to bacteria growth, recalibration at days 7 and 14 showed that the signal is maintained and continued in stable manner to at least day 14. FIGS. 12A-12C provide calibration data on days 1, 7, and 14, respectively. Furthermore, as shown in FIG. 12D, sensitivity of said sensors increased by 5% and 7% on days 7 and 14, respectively, as compared to day 1.

Example 4

This example provides an ascorbate sensor, which has a mass limiting membrane comprising a PEG-based polyurethane. The polyurethane had a 25 wt % water absorption capacity and 80A durometer. The ascorbate sensor does not include an enzyme-based sensing layer but demonstrates ascorbate detection through direct electrochemistry with the working electrode of the sensor.

An analyte sensor tail having a working electrode, a reference electrode and a counter electrode was dipped in a 60 mg/mL solution of the polyurethane polymer HydroThane®™ 25-80A, which had been dissolved in 1:1 EtOH to THE v/v. The solution was centrifuged at 13,751 rcf for 10 minutes at 20° C. to remove impurities. The resulting purified solution was dip-coated onto the analyte sensor tail to generate a diffusion-limiting membrane. Dip-coating was performed at room temperature with 5 mm/s entry and exit speeds.

The resulting sensors were tested in 100 mM PBS at 33° C. followed by the addition of 2 mg/dL ascorbate. FIGS. 13A-13D show sensor signal over time during addition of 2 mg/dL ascorbate and corresponding quantification of ascorbate response for calibrations on days 1 and 14, demonstrating sensor functionality and stability.

Example 5

The present example provides a glutamate sensor, which has a mass limiting membrane comprising an ether-based polyurethane.

An analyte sensor tail having working electrode with an enzyme system including glutamate oxidase, a reference electrode and a counter electrode was dipped in a solution of the polyurethane polymer HydroMed™ D1, which had been dissolved in 9:1 EtOH to water v/v, and dip-coated onto the analyte sensor tail. Dip-coating was performed with a 75 mg/ml solution at room temperature with 1 mm/s entry and exit speeds at 25-35% RH for a total of 3 dips, with 5 minutes of air-drying between each dip. Glutamate testing was carried out in 100 mM phosphate buffered saline solution (pH 7.4) at 33° C. The response of this sensor is shown in FIGS. 14-16, which provide chronoamperometric current response vs time curves of the coated glutamate sensor to increasing glutamate concentrations ranging from 10 to 200 μM recorded on days 1, 7, and 15. FIGS. 14-16 demonstrate the calibration curves obtained on Days 1, 7, and 15 and show that sensitivity was largely maintained over 15 days with 8% loss versus the first sensitivity value recorded, as shown in FIG. 17.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, the Examiner is also reminded that any disclaimer made in the instant application should not be read into or against the parent application.

What is claimed is:

1. A creatinine sensor comprising
- a working electrode,
- a sensing layer for detecting creatinine disposed on at least a portion of the working electrode, and
- a hydrophilic polyurethane membrane overcoating at least the sensing layer, wherein the hydrophilic polyurethane is aliphatic, aromatic, or both aliphatic and aromatic,
- wherein the hydrophilic polyurethane membrane is a single copolymer comprising a polyurethane and a second polymer,
- wherein the second polymer is a hydrophilic polymer, and
- wherein the sensor is configured to be partially inserted into a user's skin such that a distal portion of the sensor is in contact with an interstitial fluid to detect creatinine in vivo.

2. The sensor of claim 1, wherein the hydrophilic polyurethane comprises an aliphatic hydrophilic polyurethane comprising a reaction product of an aliphatic organic diisocyanate and a diol.

3. The sensor of claim 2, wherein the aliphatic organic diisocyanate is selected from the group consisting of isophorone diisocyanate (IPDI), 1,4-cyclohexyl diisocyanate (CHDI), decane-1,10-diisocyanate, lysine diisocyanate (LDI), 1,4-butane diisocyanate (BDI), 1,5-pentanediisocyanate (PDI), hydrogenated xylene diisocyanate (HXDI), 2,2,4-trimethylhexamethylene diisocyanate (TMDI), hexamethylene diisocyanate (HDI), dicyclohexylmethane-4,4'-diisocyanate ($H_{12}$MDI), 1,3-bis(isocyanatemethyl) cyclohexane (BIMC), biuret, and combinations thereof.

4. The sensor of claim 1, wherein the hydrophilic polyurethane comprises an aromatic hydrophilic polyurethane comprising a reaction product of an aromatic organic diisocyanate and a diol.

5. The sensor of claim 4, wherein the aromatic organic diisocyanate is selected from the group consisting of methylene diphenyl diisocyanate (MDI), toluene diisocyanate (TDI), o-toluidine diisocyanate (TODI), 4,4'-diphenylmethane diisocyanate, p-phenylene diisocyanate (PPDI), xylene diisocyanate, hexamethylene diisocyanate, toluene diisocyanate, 1,5-naphthalene diisocyanate (NDI), polymeric MDI, and combinations thereof.

6. The sensor of claim 2, wherein the diol is selected from the group consisting of a polyether polyol, polylactide diol, polyglycolide diol, poly(lactide-b-glycolide), poly(lactide-co-caprolactone) diol, poly(hexamethylene carbonate) diol, polycarbonate diol, poly(ethylene terephthalate diol), poly (ethylene adipate) diol, poly(butylene adipate) diol, fatty acid-based linear diol, castor oil-based diol, soybean oil-based diol, ethylene glycol, diethylene glycol, propylene glycol, dipropylene glycol, 1,4-butanediol (BDO), 1,6-hexanediol (HDO), 1,3-butanediol, 2-methyl-1,3-propanediol, 1,5-pentanediol, neopentylglycol, 1,4-cyclohexanedimethanol (CHDM), 2,2-bis[4-(2-hydroxyethoxy) phenyl] propane (HEPP), hexamethylenediol, heptanediol, nonanediol, dodecanediol, 3-methyl-1,5-pentanediol, glycerine, sorbitol, sucrose, xylitol, pentaerythritol, ethylenediamine, butanediamine, hexamethylenediamine, hydroxyethyl resorcinol (HER), poly(tetramethylene ether) glycol (PTMG), poly(polytetrahydrofuran carbonate) diol, bis(2-hydroxyethyl) terephthalate (BHET), and a combination thereof.

7. The sensor of claim 6, wherein the diol is a polyether polyol, and the polyether polyol is a hydroxyl-terminated polyether polyol derived from a diol or polyol having a total of from 2 to 15 carbon atoms.

8. The analyte sensor of claim 6, wherein the diol is a polyether polyol, and the polyether polyol is selected from the group consisting of polycaprolactone diol, poly(hydroxybutyrate) diol, poly(butyleneglycol) diol, polypropylene oxide diol, poly(ethylene glycol diol), poly(tetramethylene oxide diol), and a combination thereof.

9. The sensor of claim 2, wherein the polyurethane comprises a reaction product of a diisocyanate, a diol, and a chain extender.

10. The sensor of claim 9, wherein the chain extender comprises a diol or polyol, each comprising 2 to 20 carbon atoms.

11. The sensor of claim 9, wherein the chain extender is selected from the group consisting of ethylene glycol, diethylene glycol, propylene glycol, dipropylene glycol, 1,4-butanediol (BDO), 1,6-hexanediol (HDO), 1,3-butanediol, 2-methyl-1,3-propanediol, 1,5-pentanediol, neopentylglycol, 1,4-cyclohexanedimethanol (CHDM), 2,2-bis[4-(2-hydroxyethoxy) phenyl]propane (HEPP), hexamethylenediol, heptanediol, nonanediol, dodecanediol, 3-methyl-1,5-pentanediol, glycerine, sorbitol, sucrose, xylitol, pentaerythritol, ethylenediamine, butanediamine, hexamethylenediamine, hydroxyethyl resorcinol (HER), poly(tetramethylene ether) glycol (PTMG), poly(polytetrahydrofuran carbonate) diol, bis(2-hydroxyethyl)terephthalate (BHET), and combinations thereof.

12. The sensor of claim 1, wherein the hydrophilic polyurethane is a thermoplastic polyurethane elastomer.

13. The sensor of claim 1, wherein the hydrophilic polyurethane has a Shore A hardness of about 60A.

14. The sensor of claim 1, wherein the hydrophilic polyurethane has a Shore A hardness of at most about 93A.

15. The sensor of claim 1, wherein the hydrophilic polyurethane is capable of absorbing about 5%-25% by weight of water.

16. The sensor of claim 1, wherein the hydrophilic polyurethane membrane limits the transport of mass to the sensing layer.

17. The sensor of claim 1, wherein the hydrophilic polyurethane membrane is not crosslinked.

18. The sensor of claim 1, wherein the sensor provides consistent creatinine measurements over a temperature range of about 22-42° C.

19. The sensor of claim 1, wherein the hydrophilic polymer is selected from the group consisting of a polyether, a polyester, a polyalkene, a polyamine, a polyalkylene oxide, a polyalkylene glycol, a polyacrylate, a polymethacrylate, a thiolene polymer, alginate, chitosan, polyvinylpyrrolidone, polyvinyl alcohol, polyvinyl acetate, polysorbate, a hydrophilic polyurethane, a polyvinylpyridine-based polymer and a pluronic.

20. The sensor of claim 19, wherein the hydrophilic polymer is a polyvinylpyridine-based polymer, and the polyvinylpyridine-based polymer is a polyvinylpyridine polymer, a poly(4-vinylpyridine-co-styrene) polymer and/or a poly(4-vinylpyridine-co-styrene) copolymer derivatized with propylsulfonate and poly(ethyleneoxide) moieties.

21. The analyte sensor of claim 1, wherein the hydrophilic polyurethane membrane overcoats at least the sensing layer and working electrode.

22. The sensor of claim 1, wherein the hydrophilic polyurethane membrane overcoats the sensor in its entirety.

23. The sensor of claim 1, wherein the sensing layer comprises i) one or more enzymes for detecting creatinine, and ii) a redox mediator.

24. The sensor of claim 23, wherein the redox mediator comprises a polymer and an electron transfer agent.

25. The sensor of claim 24, wherein the electron transfer agent comprises a transition metal complex.

26. The sensor of claim 23, wherein the redox mediator comprises an osmium complex bonded to a poly(vinylpyridine)-based polymer.

27. The sensor of claim 23, wherein the one or more enzymes for detecting creatinine comprises creatinine amidohydrolase, creatine amidinohydrolase, and sarcosine oxidase.

28. A method for detecting creatinine comprising:

applying a potential to the working electrode of the sensor of claim 1;

obtaining a signal from the working electrode, the signal being proportional to a concentration of creatinine in a fluid contacting the working electrode; and correlating the signal to the concentration of creatinine in the fluid.

* * * * *